US009466015B2

(12) United States Patent
Marr

(10) Patent No.: US 9,466,015 B2
(45) Date of Patent: Oct. 11, 2016

(54) ASYNCHRONOUS GROUP PROCESSING USING Z-BANDING

(71) Applicant: CANON KABUSHIKI KAISHA, Tokyo (JP)

(72) Inventor: Gregory John Marr, Hillsborough (AU)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/578,128

(22) Filed: Dec. 19, 2014

(65) Prior Publication Data

US 2015/0178603 A1 Jun. 25, 2015

(30) Foreign Application Priority Data

Dec. 24, 2013 (AU) ................................ 2013276977

(51) Int. Cl.
*G06K 15/02* (2006.01)
*G06F 3/12* (2006.01)

(52) U.S. Cl.
CPC ....... *G06K 15/1857* (2013.01); *G06K 15/1849* (2013.01)

(58) Field of Classification Search
None
See application file for complete search history.

(56) References Cited

U.S. PATENT DOCUMENTS

| | | | | |
|---|---|---|---|---|
| 5,602,976 A * | 2/1997 | Cooper | ................... | G06K 15/00 358/1.15 |
| 5,652,711 A * | 7/1997 | Vennekens | ................... | 358/1.17 |
| 6,239,829 B1 * | 5/2001 | Curry | ............................. | 347/251 |
| 6,459,502 B1 * | 10/2002 | Takamatsu et al. | ........... | 358/1.9 |
| 6,466,229 B1 * | 10/2002 | Nagao | ............................. | 345/621 |
| 6,471,423 B1 * | 10/2002 | Yamada | ........................... | 400/76 |
| 7,861,156 B2 | 12/2010 | Wood et al. | | |
| 8,334,989 B2 | 12/2012 | Ishikawa | | |
| 2003/0214660 A1 * | 11/2003 | Plass | ...................... | G06K 15/00 358/1.9 |
| 2007/0070403 A1 * | 3/2007 | Toda et al. | .................... | 358/1.15 |
| 2007/0271288 A1 * | 11/2007 | Martin et al. | ................. | 707/101 |
| 2008/0291496 A1 * | 11/2008 | Hara | ...................... | G06K 15/02 358/1.16 |
| 2010/0103452 A1 * | 4/2010 | Choi et al. | .................... | 358/1.15 |
| 2011/0235080 A1 * | 9/2011 | Satou | ................. | G06K 15/1857 358/1.13 |
| 2011/0267645 A1 * | 11/2011 | Miyazaki | .............. | G06F 3/1211 358/1.15 |
| 2012/0147387 A1 * | 6/2012 | Morrison et al. | ............. | 358/1.1 |
| 2013/0088732 A1 * | 4/2013 | Matsuda | ........... | G06K 15/1849 358/1.9 |
| 2013/0155456 A1 * | 6/2013 | Morrison | .............. | G06F 3/1296 358/1.15 |
| 2014/0152700 A1 * | 6/2014 | Koziarz | ................ | G06F 3/1215 345/636 |
| 2015/0170010 A1 * | 6/2015 | Koziarz | ............. | G06K 15/1855 358/1.18 |

* cited by examiner

*Primary Examiner* — Beniyam Menberu
(74) *Attorney, Agent, or Firm* — Canon USA, Inc., IP Division

(57) ABSTRACT

Methods, apparatus, and computer readable media are provided for generating an intermediate representation of a page description. The page description comprises graphic commands updating a graphics state. From graphic commands, a first sequence of graphic commands is determined. A graphics state is associated with at least one subsequent second graphic command being invariant under first sequence of graphic commands. A first display list representation is generated using first sequence of graphic commands. A second display list representation is generated using second graphic command concurrently with generating first display list representation. The second display list representation is generated independently from first sequence of graphic commands. The intermediate representation of the page description is generated using first display list representation and second display list representation. At least one portion in intermediate representation is affected by first sequence of graphic commands and second graphic command.

21 Claims, 41 Drawing Sheets

```
1  %PDF-1.4
2
3  1 0 obj
4     << /Type /Catalog
5        /Pages 2 0 R
6     >>
7  endobj
8
9  2 0 obj
10    << /Type /Pages
11       /Count 1
12       /Kids [3 0 R]
13    >>
14 endobj
15
16 3 0 obj
17    << /Type /Page
18       /Parent 2 0 R
19       /Resources
20          << /Xobject << /X01 5 0 R >>
21       >>
22       /MediaBox [0 0 596.25 843]
23       /Contents 4 0 R
24    >>
25 endobj
26
```

```
27 4 0 obj << /Length 0 >>
28 stream
29 q
30    340.5 0 0 339.75 127.5 369.75 cm
31    /X01 Do
32 Q
33 0 g
34 <path data> f*
35 1 g 0 G 0.24 w 1 J 1 j
36 <path data> b*
37 1 0 0 rg
38 <path data> b*
39 0 1 0 rg
40 <path data> b*
41 0 0 1 rg
42 <path data> b*
43 1 1 0 rg
44 <path data> b*
45 endstream
46 endobj
47
48 5 0 obj
49    << /Type /XObject
50       /Subtype /Form
51       /BBox [0 0 1 1]
52       /Matrix [1 0 0 1 0 0]
53    >>
54 stream
55 0.9 g
56 <path data> f
57 <path data> f
58 <path data> f
59 <path data> f
60 <path data> f
61 <path data> f
62 <path data> f
63 <path data> f
64 endstream
65 endobj
66
67 trailer << /Root 1 0 R >>
68 %%EOF
```

2800

ASYNCHRONOUS GROUP PROCESSING USING Z-BANDING

REFERENCE TO RELATED PATENT APPLICATION(S)

This application claims the benefit under 35 U.S.C. §119 of the filing date of Australian Patent Application No. 2013276977, filed Dec. 24, 2013, hereby incorporated by reference in its entirety as if fully set forth herein.

TECHNICAL FIELD

The invention relates the field of computer graphics, and in particular, to parallel processing of a page description.

BACKGROUND

In many printing systems, a page to be printed is described using a page description language ("PDL"), such as Adobe® Portable Document Format ("PDF"). A page description may be supplemented by a print job description, which specifies the desired output of the printing system. A print job description may include options for each page to be printed such as page layout, paper selection, duplexing, and other finishing options.

One aspect of a printing system is to convert the page description into pixel values according to the relevant options in the job description ("rasterisation"). Then, the pixel values can be sent to a printer engine for output according to the job description. The rasterisation process is typically performed using a central processing unit ("CPU").

Many modern CPUs contain multiple cores that can execute instructions in parallel. Advantageously printing systems use parallel processing, or multi-threading, to improve the performance of the rasterisation process, thereby improving the overall throughput of the printing system. In such multi-threaded systems, tasks must be identified where most of the execution of that task is independent of other tasks. Tasks can be executed by sending a request to the operating system to create a new thread, or by submitting the task to a thread pool to be scheduled for execution when a thread is available.

The execution times of various task types are important to the overall performance of the system. If tasks are too large, the system may not perform optimally if there are insufficient tasks for the available processor cores. If tasks are too small, synchronisation overhead may degrade the performance of the system.

One approach to multi-threaded printing systems is to process each printed page as a separate task. This is a relatively simple approach for PDLs that are page-independent, such as Adobe PDF. Tasks are created for each page and assigned a page sequence number. Tasks can then independently produce pixel values for the assigned page into a page-specific output buffer. The only significant synchronisation that is required is to wait for the pages to finish in sequence.

Some PDLs, such as ADOBE® POSTSCRIPT®, are not page-independent, i.e. pages must be processed in sequence. Methods exist for pre-processing such documents to produce page-independent chunks. While relatively simple to implement, page-parallel rasterisation does have drawbacks. In particular, a significant drawback is that memory requirements increase linearly with the number of pages begin processed in parallel, and adding more memory increases the cost of the system. Furthermore, the memory bandwidth and some CPU caches are shared between all cores, potentially becoming bottlenecks within the system.

To overcome the shortcomings of page-parallel processing, printing systems may use multi-threading to improve the performance within a single page. Two key advantages to within-page-parallelisation exist. Firstly, the memory requirements are closer to that of single-threaded systems, thereby alleviating the memory-related drawbacks of page-parallel systems. Secondly, by improving the performance within a single page, the time to spool the first page is significantly reduced, thereby reducing the idle time of the printer engine and reducing the total time to print a document.

Most PDLs are designed to be processed so that graphic objects are produced in sequence from the bottom-most object to the top-most object, i.e., in what is commonly referred to as z-order. Furthermore, most PDLs contain a graphics state, which is updated as the sequence of graphic objects is produced. Generally, producing graphic objects out-of-order is difficult to do, since a graphic object may depend on previous graphics state commands. Therefore, most within-page-parallel systems process the sequence of objects in the PDL file using a master thread. The master thread processes a page description sequentially to produce tasks that can independently process the graphic objects. The output from these tasks is usually an intermediate representation. The outputs of the tasks are then combined in a final step to produce the pixels for the page.

While within-page-parallelisation controlled by the master-thread provides many benefits over page-parallel processing, a key assumption is that the master thread can generate enough tasks to fully utilise the available cores. Since the master thread is sequential due to the nature of the page description language, the master thread often becomes a bottleneck in the system, and other cores are under-utilised.

Furthermore, the current technological trend for CPUs is an increasing number of cores in a CPU. As new models of CPUs become available with more cores, the bottleneck created by the master thread becomes even more significant, and the under-utilisation of the processor is higher. Therefore, a need exists to reduce the amount of sequential processing performed by the master thread, to achieve a higher processor utilisation.

SUMMARY

In accordance with an aspect of the invention, there is provided a method of generating an intermediate representation of a page description. The page description comprises graphic commands updating a graphics state. The method comprises: determining, from the plurality of graphic commands, a first sequence of graphic commands, a graphics state associated with at least one subsequent second graphic command being invariant under the first sequence of graphic commands; generating a first display list representation using the first sequence of graphic commands; generating a second display list representation using the second graphic command concurrently with generating the first display list representation, the second display list representation being generated independently from the first sequence of graphic commands; and generating the intermediate representation of the page description using the first display list representation and the second display list representation, at least one portion in the intermediate representation being affected by the first sequence of graphic commands and the second graphic command.

An object associated with the second graphic command may overlay at least one other object associated with a graphic command from the first sequence of graphic commands.

Generating the intermediate representation may comprise combining a first intermediate representation corresponding to the first display list representation and the second intermediate representation corresponding to the second display list representation.

The first sequence of graphic commands may be classified as a group in the page description.

The method may comprise rendering the generated intermediate representation of the page description to form an image.

The method may comprise concurrently generating first and second intermediate representations.

The first sequence of graphic commands may comprise first and second subsequences, wherein:
a graphics state at the commencement of the second subsequence is independent from graphic commands in the second subsequence,
display list representations are concurrently derived from first and second subsequences, respectively, and
intermediate representations generated from the first subsequence, the second subsequence, and the second sequence are combined in order of the corresponding graphic commands in the page description.

The method may comprise merging the first and second intermediate representations, the intermediate representation of the page description being generated using the first and second intermediate representations.

The method may be performed in a multi-threaded computing environment.

The method may be performed using a computing device having a processor with multiple computing cores.

The intermediate representation may comprise a fillmap in a page description language.

In accordance with another aspect of the invention, there is provided a method of generating an intermediate representation of a page description. The page description comprises a plurality of graphic commands. The method comprises: identifying a graphic command in the page description isolating a plurality of background graphic commands, a graphics state associated with at least one foreground graphic command being invariant under the isolated background graphic commands; generating a foreground display list representation concurrently with generating a background display list representation, the display list representations being generated using the associated graphic commands, the foreground display list representation being independent from the isolated background sequence of graphic commands; and generating the intermediate representation for the page description using the background display list representation and the foreground display list representation.

The isolated graphic commands may comprise at least one graphic command for a group in the page description. The group may be a transparency group.

The method may comprise, in response to identifying the graphic command, establishing a separate stream for receiving the isolated objects, so that the isolated background objects are processed simultaneously with following foreground objects.

Generating the foreground display list representation may comprise applying a foreground graphic command independently from an isolated background graphic command.

Generating the intermediate representation for the page description may comprise combining a background intermediate representation associated with the background display list representation and a foreground display list representation associated with the foreground display list representation.

In accordance with yet another aspect of the invention, there are provided apparatuses for generating an intermediate representation of a page description. The page description comprises graphic commands. The apparatus comprises: a memory for storing data and instructions for a central processing unit; and a central processing unit coupled to the memory, the central processing unit performing the methods according to the foregoing aspects dependent upon the instructions and the data to generate the intermediate representation.

In accordance with yet another aspect of the invention, there are provided non-transitory computer readable media having computer programs recorded thereon for execution by a computer to perform the methods of generating an intermediate representation of a page description according to the foregoing aspects.

BRIEF DESCRIPTION OF THE DRAWINGS

At least one embodiment of the invention are described hereinafter with reference to the drawings, in which.

DETAILED DESCRIPTION INCLUDING BEST MODE

Figure 1:
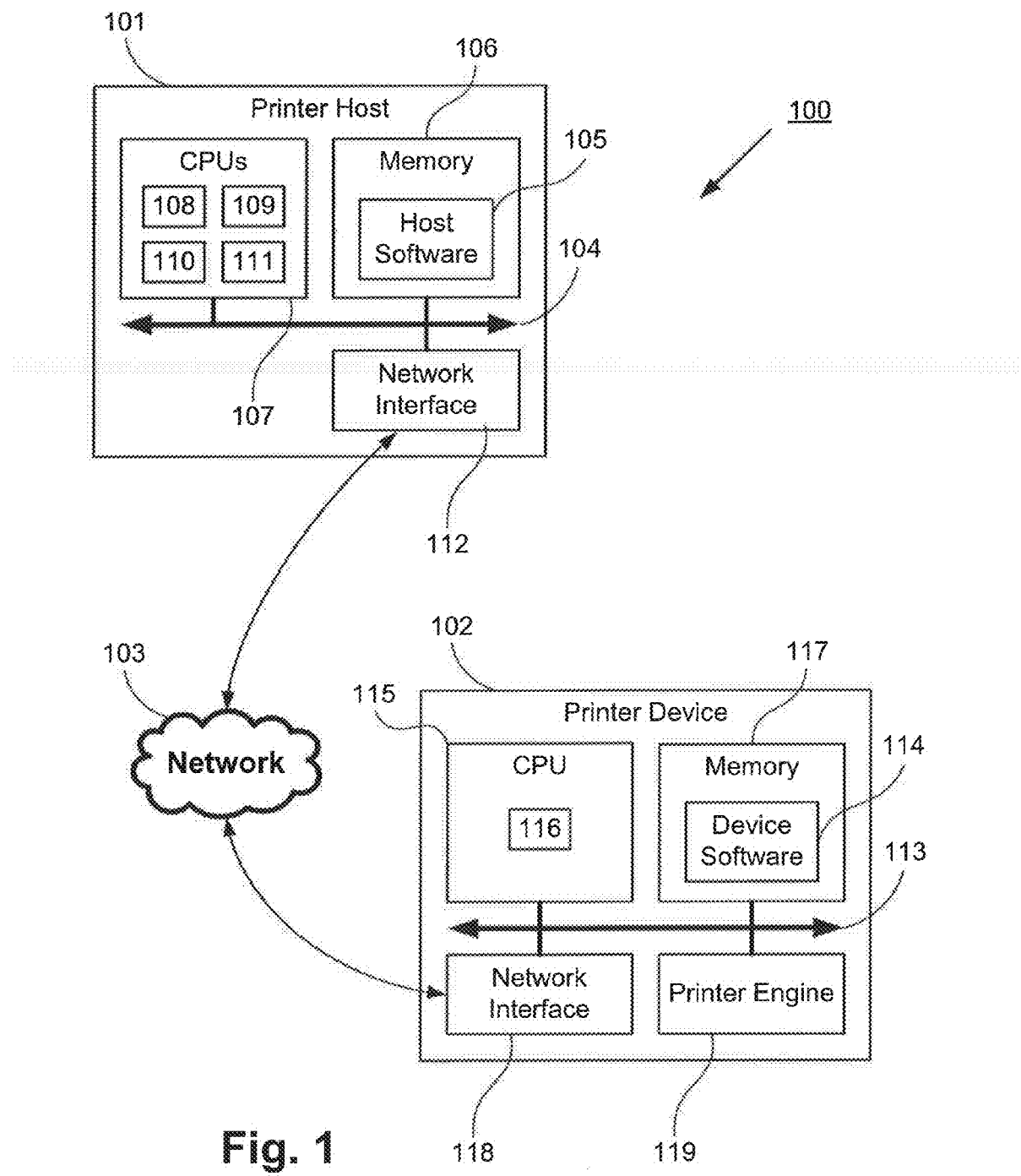
FIG. 1 is a schematic block diagram showing the architecture of a printing system.

Methods, apparatuses, and computer readable media for generating an intermediate representation of a page description are disclosed hereinafter. The page description comprises graphic commands updating a graphics state. In the following description, numerous specific details, including particular page description languages, object types, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

Figure 32A:
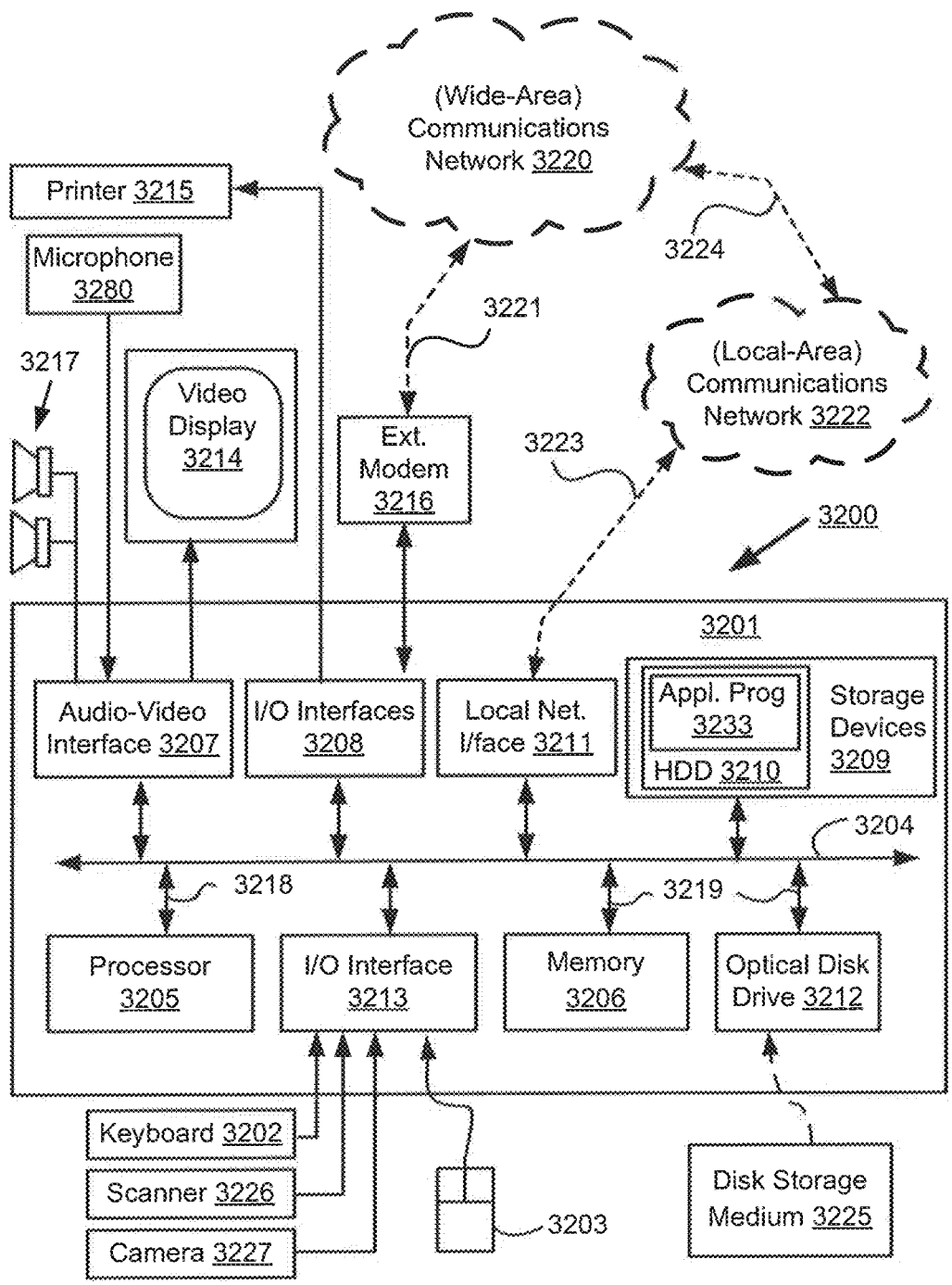
FIGS. 32A and 32B form a schematic block diagram of a general purpose computer system upon which arrangements described can be practiced.
Figure 32B:
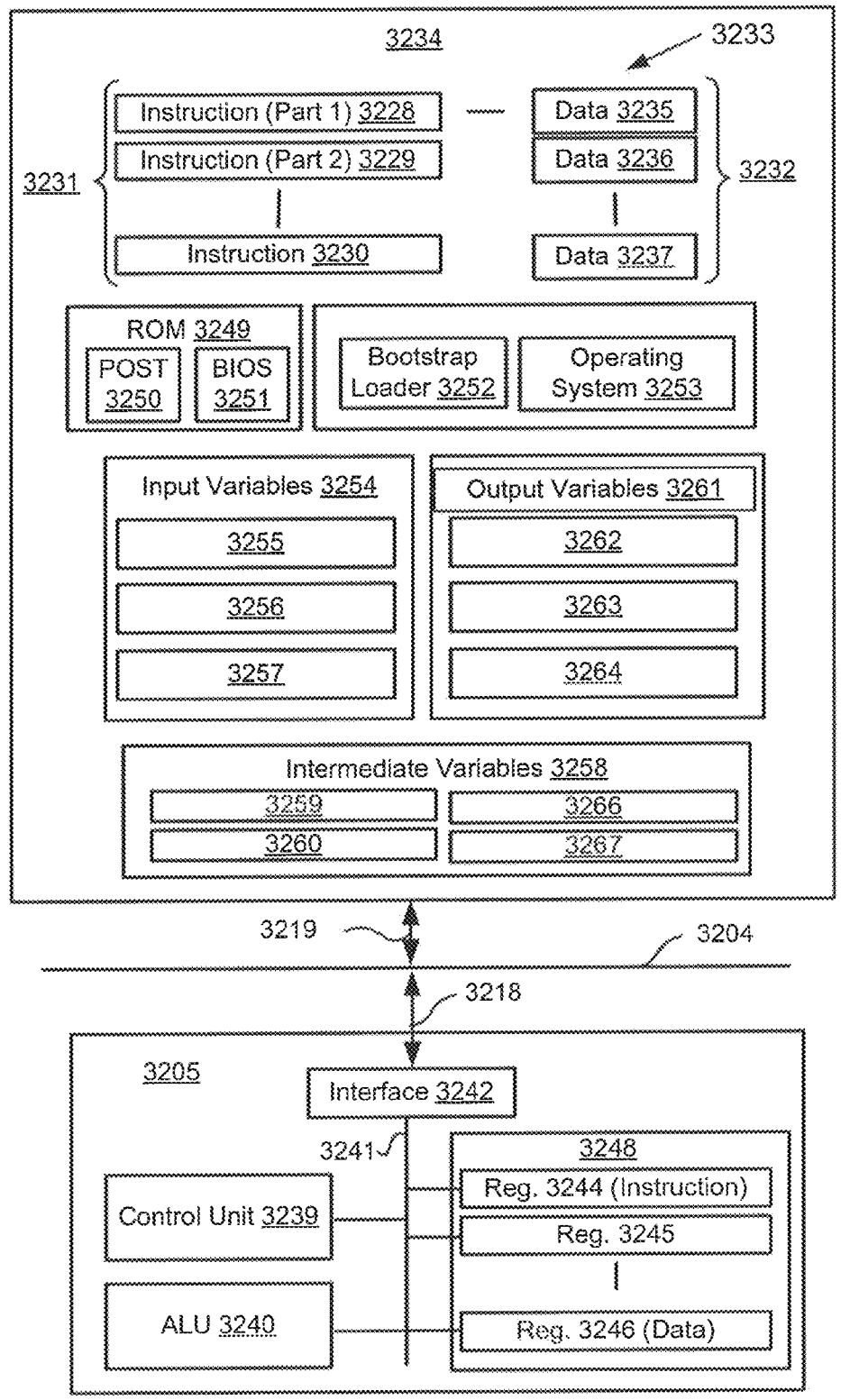

FIGS. 32A and 32B depict a general-purpose computer system 3200, upon which the various arrangements described can be practiced.

As depicted in FIG. 32A, the computer system 3200 includes: a computer module 3201; input devices such as a keyboard 3202, a mouse pointer device 3203, a scanner 3226, a camera 3227, and a microphone 3280; and output devices including a printer 3215, a display device 3214 and loudspeakers 3217. An external Modulator-Demodulator (Modem) transceiver device 3216 may be used by the computer module 3201 for communicating to and from a communications network 3220 via a connection 3221. The communications network 3220 may be a wide-area network (WAN), such as the Internet, a cellular telecommunications network, or a private WAN. Where the connection 3221 is a telephone line, the modem 3216 may be a traditional "dial-up" modem. Alternatively, where the connection 3221 is a high capacity (e.g., cable) connection, the modem 3216 may be a broadband modem. A wireless modem may also be used for wireless connection to the communications network 3220.

The computer module 3201 typically includes at least one processor unit 3205, and a memory unit 3206. For example, the memory unit 3206 may have semiconductor random access memory (RAM) and semiconductor read only memory (ROM). The computer module 3201 also includes an number of input/output (I/O) interfaces including: an audio-video interface 3207 that couples to the video display 3214, loudspeakers 3217 and microphone 3280; an I/O interface 3213 that couples to the keyboard 3202, mouse 3203, scanner 3226, camera 3227 and optionally a joystick or other human interface device (not illustrated); and an interface 3208 for the external modem 3216 and printer 3215. In some implementations, the modem 3216 may be incorporated within the computer module 3201, for example within the interface 3208. The computer module 3201 also has a local network interface 3211, which permits coupling of the computer system 3200 via a connection 3223 to a local-area communications network 3222, known as a Local Area Network (LAN). As illustrated in FIG. 32A, the local communications network 3222 may also couple to the wide network 3220 via a connection 3224, which would typically include a so-called "firewall" device or device of similar functionality. The local network interface 3211 may comprise an Ethernet circuit card, a Bluetooth® wireless arrangement or an IEEE 802.11 wireless arrangement; however, numerous other types of interfaces may be practiced for the interface 3211.

The I/O interfaces 3208 and 3213 may afford either or both of serial and parallel connectivity, the former typically being implemented according to the Universal Serial Bus (USB) standards and having corresponding USB connectors (not illustrated). Storage devices 3209 are provided and typically include a hard disk drive (HDD) 3210. Other storage devices such as a floppy disk drive and a magnetic tape drive (not illustrated) may also be used. An optical disk drive 3212 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 3200.

The components 3205 to 3213 of the computer module 3201 typically communicate via an interconnected bus 3204 and in a manner that results in a conventional mode of operation of the computer system 3200 known to those in the relevant art. For example, the processor 3205 is coupled to the system bus 3204 using a connection 3218. Likewise, the memory 3206 and optical disk drive 3212 are coupled to the system bus 3204 by connections 3219. Examples of computers on which the described arrangements can be practised include IBM-PC's and compatibles, Sun Sparcstations, Apple Mac™ or a like computer systems.

The method of generating an intermediate representation of a page description may be implemented using the computer system 3200 wherein the processes of FIGS. 1-31A, to be described, may be implemented as one or more software application programs 3233 executable within the computer system 3200. In particular, the steps of the method of generating an intermediate representation of a page description are effected by instructions 3231 (see FIG. 32B) in the software 3233 that are carried out within the computer system 3200. The software instructions 3231 may be formed as one or more code modules, each for performing one or more particular tasks. The software may also be divided into two separate parts, in which a first part and the corresponding code modules performs the methods of generating an intermediate representation of a page description and a second part and the corresponding code modules manage a user interface between the first part and the user.

The software 3233 is typically stored in the HDD 3210 or the memory 3206. The software is loaded into the computer system 3200 from a computer readable medium, and executed by the computer system 3200. Thus, for example, the software 3233 may be stored on an optically readable disk storage medium (e.g., CD-ROM) 3225 that is read by the optical disk drive 3212. A computer readable medium having such software or computer program recorded on it is a computer program product. The use of the computer program product in the computer system 3200 preferably effects an apparatus for generating an intermediate representation of a page description.

In some instances, the application programs 3233 may be supplied to the user encoded on one or more CD-ROMs 3225 and read via the corresponding drive 3212, or alternatively may be read by the user from the networks 3220 or 3222. Still further, the software can also be loaded into the computer system 3200 from other computer readable media. Computer readable storage media refers to any non-transitory tangible storage medium that provides recorded instructions and/or data to the computer system 3200 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 3201. Examples of transitory or non-tangible computer readable transmission media that may also participate in the provision of software, application programs, instructions and/or data to the computer module 3201 include radio or infra-red transmission channels as well as a network connection to another computer or networked device, and the Internet or Intranets including e-mail transmissions and information recorded on Websites and the like.

The second part of the application programs 3233 and the corresponding code modules mentioned above may be executed to implement one or more graphical user interfaces (GUIs) to be rendered or otherwise represented upon the display 3214. Through manipulation of typically the keyboard 3202 and the mouse 3203, a user of the computer system 3200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 3217 and user voice commands input via the microphone 3280.

FIG. 32B is a detailed schematic block diagram of the processor 3205 and a "memory" 3234. The memory 3234 represents a logical aggregation of all the memory modules (including the HDD 3209 and semiconductor memory 3206) that can be accessed by the computer module 3201 in FIG. 32A.

When the computer module 3201 is initially powered up, a power-on self-test (POST) program 3250 executes. The POST program 3250 is typically stored in a ROM 3249 of the semiconductor memory 3206 of FIG. 32A. A hardware device such as the ROM 3249 storing software is sometimes referred to as firmware. The POST program 3250 examines hardware within the computer module 3201 to ensure proper functioning and typically checks the processor 3205, the memory 3234 (3209, 3206), and a basic input-output systems software (BIOS) module 3251, also typically stored in the ROM 3249, for correct operation. Once the POST program 3250 has run successfully, the BIOS 3251 activates the hard disk drive 3210 of FIG. 32A. Activation of the hard disk drive 3210 causes a bootstrap loader program 3252 that is resident on the hard disk drive 3210 to execute via the processor 3205. This loads an operating system 3253 into the RAM memory 3206, upon which the operating system 3253 commences operation. The operating system 3253 is a system level application, executable by the processor 3205, to fulfil various high level functions, including processor management, memory management, device management, storage management, software application interface, and generic user interface.

The operating system 3253 manages the memory 3234 (3209, 3206) to ensure that each process or application running on the computer module 3201 has sufficient memory in which to execute without colliding with memory allocated to another process. Furthermore, the different types of memory available in the system 3200 of FIG. 32A must be used properly so that each process can run effectively. Accordingly, the aggregated memory 3234 is not intended to illustrate how particular segments of memory are allocated (unless otherwise stated), but rather to provide a general view of the memory accessible by the computer system 3200 and how such is used.

As shown in FIG. 32B, the processor 3205 includes a number of functional modules including a control unit 3239, an arithmetic logic unit (ALU) 3240, and a local or internal memory 3248, sometimes called a cache memory. The cache memory 3248 typically includes a number of storage registers 3244-3246 in a register section. One or more internal busses 3241 functionally interconnect these functional modules. The processor 3205 typically also has one or more interfaces 3242 for communicating with external devices via the system bus 3204, using a connection 3218. The memory 3234 is coupled to the bus 3204 using a connection 3219.

The application program 3233 includes a sequence of instructions 3231 that may include conditional branch and loop instructions. The program 3233 may also include data 3232 which is used in execution of the program 3233. The instructions 3231 and the data 3232 are stored in memory locations 3228, 3229, 3230 and 3235, 3236, 3237, respectively. Depending upon the relative size of the instructions 3231 and the memory locations 3228-3230, a particular instruction may be stored in a single memory location as depicted by the instruction shown in the memory location 3230. Alternately, an instruction may be segmented into a number of parts each of which is stored in a separate memory location, as depicted by the instruction segments shown in the memory locations 3228 and 3229.

In general, the processor 3205 is given a set of instructions which are executed therein. The processor 1105 waits for a subsequent input, to which the processor 3205 reacts to by executing another set of instructions. Each input may be provided from one or more of a number of sources, including data generated by one or more of the input devices 3202, 3203, data received from an external source across one of the networks 3220, 3202, data retrieved from one of the storage devices 3206, 3209 or data retrieved from a storage medium 3225 inserted into the corresponding reader 3212, all depicted in FIG. 32A. The execution of a set of the instructions may in some cases result in output of data. Execution may also involve storing data or variables to the memory 3234.

The disclosed arrangements for generating an intermediate representation of a page description use input variables 3254, which are stored in the memory 3234 in corresponding memory locations 3255, 3256, 3257. The arrangements produce output variables 3261, which are stored in the memory 3234 in corresponding memory locations 3262, 3263, 3264. Intermediate variables 3258 may be stored in memory locations 3259, 3260, 3266 and 3267.

Referring to the processor 3205 of FIG. 32B, the registers 3244, 3245, 3246, the arithmetic logic unit (ALU) 3240, and the control unit 3239 work together to perform sequences of micro-operations needed to perform "fetch, decode, and execute" cycles for every instruction in the instruction set making up the program 3233. Each fetch, decode, and execute cycle comprises:

(i) a fetch operation, which fetches or reads an instruction 3231 from a memory location 3228, 3229, 3230;

(ii) a decode operation in which the control unit 3239 determines which instruction has been fetched; and (iii) an execute operation in which the control unit 3239 and/or the ALU 3240 execute the instruction.

Thereafter, a further fetch, decode, and execute cycle for the next instruction may be executed. Similarly, a store cycle may be performed by which the control unit 3239 stores or writes a value to a memory location 3232.

Each step or sub-process in the processes of FIGS. 2, 6, 11-18, 20, 21, 23, and 24 is associated with one or more segments of the program 3233 and is performed by the register section 3244, 3245, 3247, the ALU 3240, and the control unit 3239 in the processor 3205 working together to perform the fetch, decode, and execute cycles for every instruction in the instruction set for the noted segments of the program 3233.

The method of generating an intermediate representation of a page description may alternatively be implemented in dedicated hardware such as one or more integrated circuits performing the functions or sub functions of generating an intermediate representation of a page description. Such dedicated hardware may include graphic processors, digital signal processors, or one or more microprocessors and associated memories.

Context

Print rendering systems are normally provided with a source document in a page description language ("PDL") such as ADOBE® PDF. In some cases the source document, or page description, may be provided directly by the user, or more commonly, provided to a printer driver by the host operating system when the user instructs an application to print a document.

A simple print rendering system can process graphic commands from the page description to produce graphic objects and then render the graphic objects directly into a full-page frame-buffer. A typical method for performing this is known as the Painter's Algorithm. Alternatively, the graphic objects can be converted into an intermediate representation using an intermediate format and the intermediate data can be rendered. The preferred embodiment described hereinafter uses a specific intermediate format, which is referred to as a "canvas".

FIG. 1 illustrates a print rendering system 100. A printer host 101 comprises host software 105 being stored in memory 106. The host software 105 is executed on a processor 107. The processor contains multiple cores 108, 109, 110, 111, which are capable of executing instructions simultaneously. Additionally the printer host 101 contains a network interface 112, which is or can be connected to an external network 103. The host processor 107, memory 106 and network interface 112 are connected to a local bus 104.

The printer device 102 comprises device software 114 being stored in memory 117. The device software 114 is executed on a processor 115. In this case the processor 115 only contains a single core 116 on which the device software 114 can be executed. The printer device 102 also contains a network interface 118, which is also connected to the external network 103, thus allowing communication between the printer host 101 and the printer device 102. The printer engine 119 is used to produce the physical output on a print medium. The device processor 115, memory 1117, network interface 118 and printer engine 119 are all connected to a local bus 113.

Figure 2:
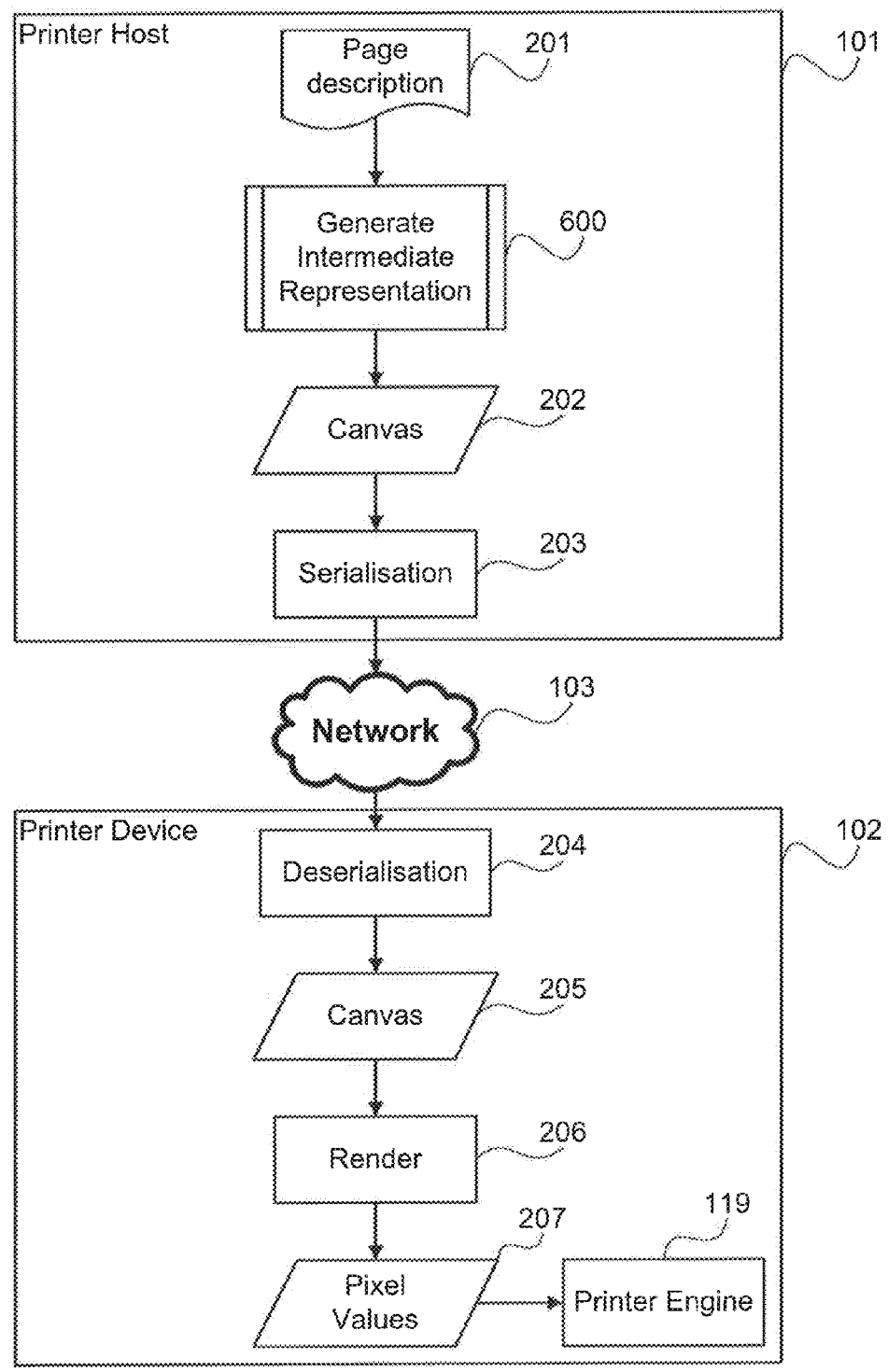
FIG. 2 is a schematic block diagram showing the processes and data that execute on the printing system from FIG. 1.

FIG. 2 shows a process of converting a page description 201 into pixel values 207, where the process is carried out using the printer host 101 and printer device 102 of FIG. 1. The printer host 101 receives a page description 201, which is processed 600 by generating an intermediate representation to produce a canvas 202. The canvas 202 is stored in the printer host memory 106. The serialisation process 203 reads the canvas 202 from memory 106 and, using the network interface 112, sends the serialised canvas across the network 103 to the printer device 102.

The printer device 102, using the network interface 118 in FIG. 1, receives the serialised canvas. The deserialisation process 204 reconstructs and stores the canvas 205 in the printer memory 117. The reconstructed canvas 205 contains the same data as the canvas 202 that was generated on the printer host 101. The printer device 102 then executes a rendering process 206 on the printer processor 115, shown in FIG. 1. The rendering process 206 reads the canvas 205 from the memory 117 and generates pixel values 207. The pixel values 207 are used by the printer engine 119 to form an image on the output medium.

An example of a page using the canvas format is described with reference to FIGS. 3 to 5.

Figure 3:
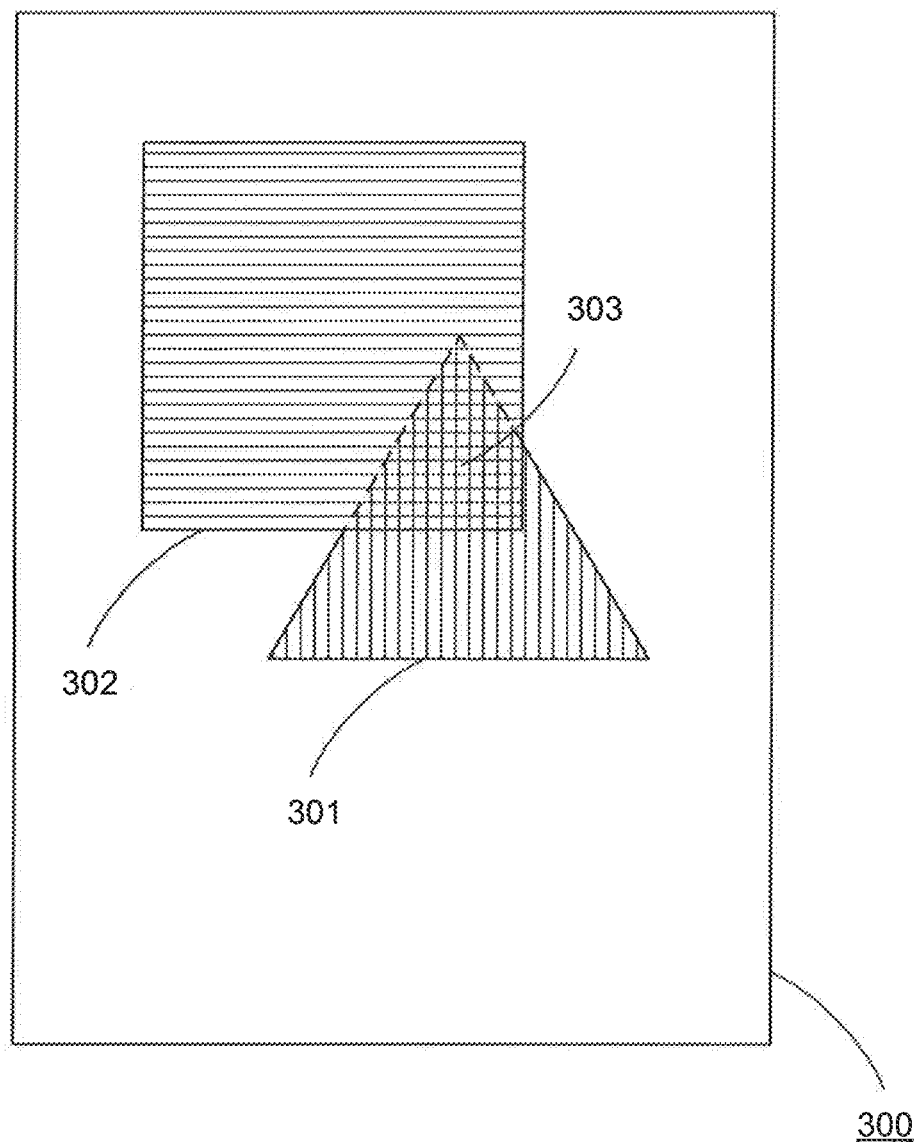
FIG. 3 is a diagram of an example page to be printed.
Figure 4:
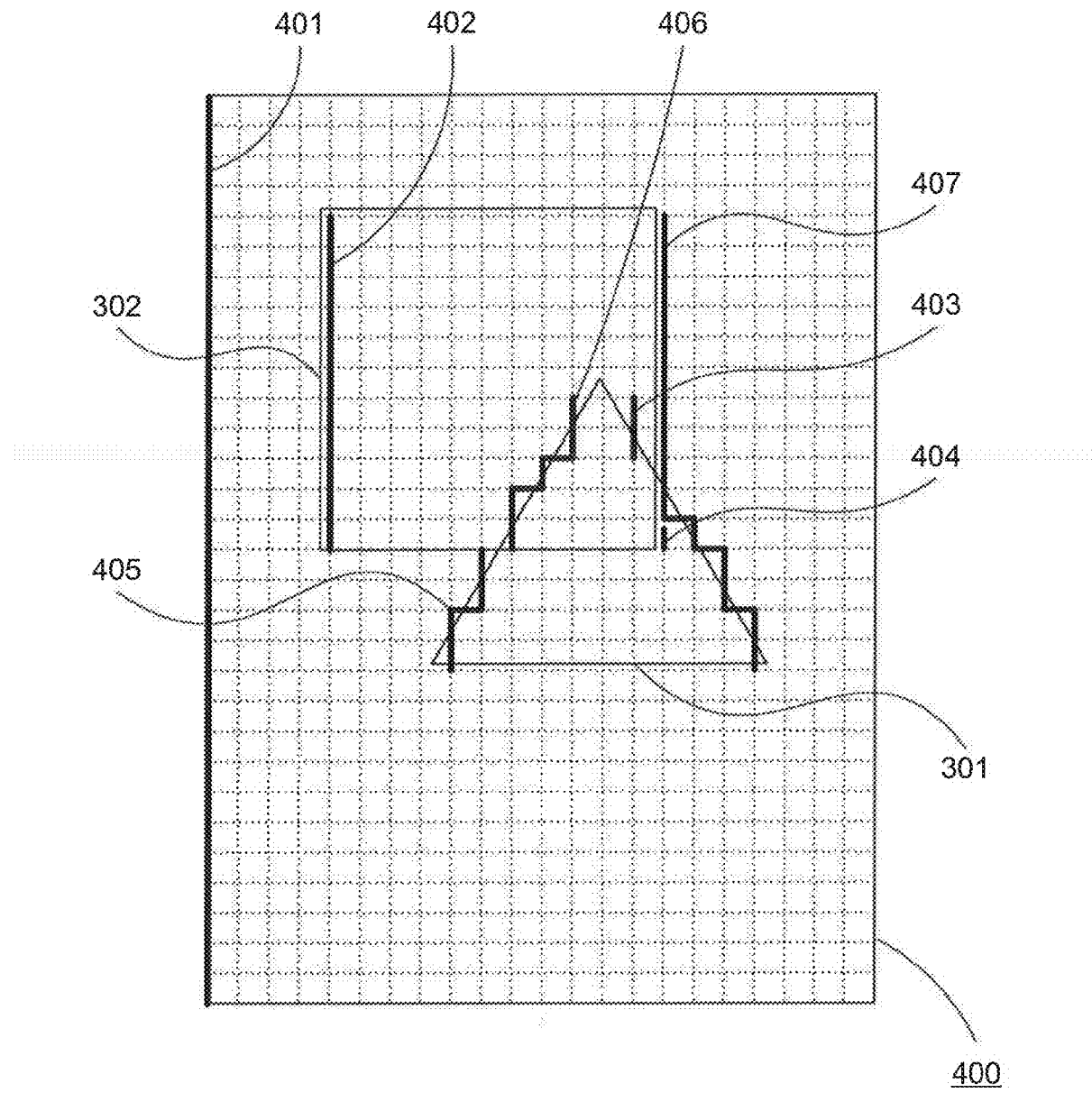
FIG. 4 is a schematic diagram showing pixel aligned fillmap edges for the page shown in FIG. 3.

A canvas describes the contents of a single page in a print document, such as the page 300 illustrated in FIG. 3. The page 300 shown in FIG. 3 contains a triangle 301, which is partially covered by a square 302. The shape and colour of the area of overlap 303 is determined by both the triangle 301 and square 302 objects.

Firstly, the regions of the page 300 need to be described in a format that is efficient for rendering. One such format is illustrated in FIG. 4 showing triangle object 301 and square object 302. This format is referred to as a fillmap 400. In a fillmap 400, the page 300 is divided into non-overlapping regions, including background regions. Each region of a fillmap 400 is an area containing a particular combination of contributing PDL objects. The extent of the each region is described by edges that are aligned with the print engine's pixel grid. The pixels immediately to the right of an edge are contained in the region defined by that edge. For example, in FIG. 4, edges 401 and 407 describe background regions. Edges 402 and 403 describe areas where the only contributing object is the square 302. Similarly, edges 404 and 405 define areas that only contain the triangle 301. Finally, edge 406 defines the area where the square overlaps the triangle 303.

Figure 5:
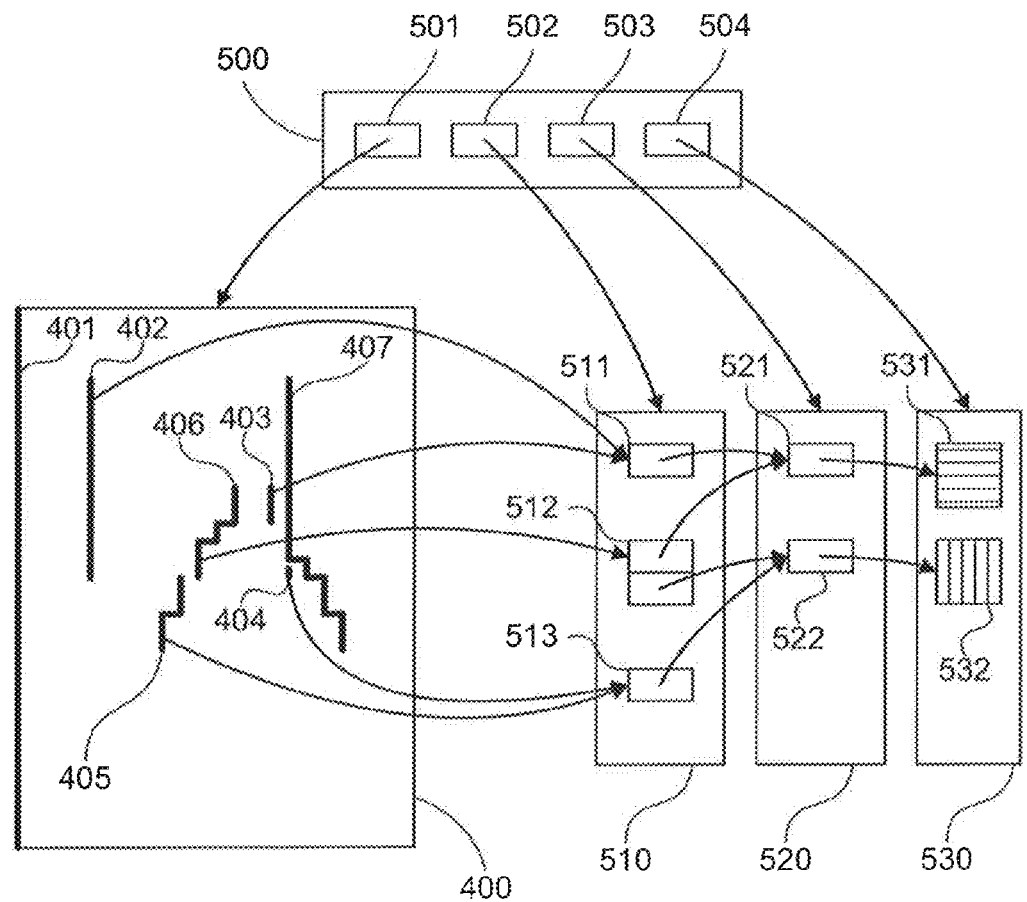
FIG. 5 is a schematic block diagram showing a complete canvas representation of the page shown in FIG. 3 using the fillmap representation from FIG. 4.

A canvas 500 is shown in FIG. 5, which contains a reference 501 to the fillmap 400 for the example page 300. Additionally, the canvas 500 contains a reference 502 to a compositing stack store 510, containing a set of compositing stacks. A compositing stack describes the colour of a region in terms of the objects that contribute to that region. For example, the regions defined by edges 402 and 403 reference a compositing stack 511 that describes the colour of the square 302 object. Similarly, edges 404 and 405 reference a compositing stack 513 that describes the colour of the triangle 301 object. Finally, the edge 406 references a compositing stack 512 that describes the colour of the area of overlap. The edges 401 and 407 do not reference compositing stacks, since these edges 401, 407 refer to background regions.

A compositing stack is an ordered set of level appearances, each of which corresponds to an object that contributes to the region's appearance. A level appearance describes how an object combines with the object's background colour to produce a new resultant colour. Level appearances are explained in more detail hereinafter. In the example shown in FIG. 5, the first compositing stack 511 references the first level appearance 521 representing the square 302 object. The second compositing stack 512 contains two references, the top-most referring to the level appearance 521 representing the square 302, and the bottom-most referring to the level appearance 522 in store 520 representing the triangle 301. Finally, the third compositing stack 513 only contains a single reference to the level appearance 522 representing the triangle 301. The set of level appearances 521, 522 are contained in a level appearance store 520, which in turn is referenced 503 by the canvas 500.

As previously explained, a level appearance describes how an object combines with its background colour to produce a new resultant colour. The colour of an object is described by one or more fills. A fill can be a flat colour, which is constant across the entire object, or a gradient or image, where the colour is location-dependent. The level appearance contains a compositing operator and refers to a number of fills that are appropriate for the given operator. Most compositing operators, such as NORMAL, combine two operands. In this case, the first operand is the background colour, and the second operand is a fill referenced by the level appearance. Some three-operand and four-operand compositing operators reference two or three fills respectively. In FIG. 5, the level appearance 522 representing the triangle 301 may specify the NORMAL compositing operator (not shown), and a reference to a flat fill 532 containing the colour of the triangle 301. The level appearance 521 representing the square 302 may specify the MULTIPLY compositing operator (not shown), and a reference to a flat fill 531 containing the colour of the square 302. The set of fills 531, 532 are stored in a fill store 530 in the memory 106, which in turn is referenced 504 by the canvas 500.

Overview

A significant problem of within-page-parallel printing systems is that the master thread is quite often the bottleneck of the system. Furthermore, generating graphic objects out of sequence, including subsequences, is difficult, due to the sequential nature of PDL graphic command processing, and in particular, graphics state commands, which update the graphics state on which graphic objects depend.

However, some aspects of a PDL can produce predictable graphics states for future objects. One such example is XObjects, or groups, in PDF. Prior to processing a group, a copy of the graphics state is pushed onto a graphics state stack. Graphics state commands within the group make changes to the graphics state, but they only modify the graphics state on the top of the stack. The graphic commands associated with the group are then processed using the master thread. Once the group processing finishes, the top-most state is popped off the stack, thereby restoring the original graphics state prior to processing the sequence of graphic commands associated with the group. Processing continues with the graphic commands after the group using the restored graphics state.

Now, since the graphic commands associated with a group are stored as a separate stream in a PDF file, the master thread has easy access to both the sequence, including subsequences, of graphic commands associated with the group, and the graphic commands that follow the group (in the content stream that instantiated the group). Also, the graphics state for the graphic commands that follow the group are known, since the graphics state is identical to the graphics state prior to starting the group. Therefore, the graphic commands associated with the group and the graphic commands that follow the group can be processed in parallel. Particularly advantageous, fillmaps are used as an intermediate representation, since fillmaps allow the graphic objects generated by the graphic commands that follow the group to be processed into a fillmap representation independently of the graphic commands associated with group. Even though the graphic objects may be processed out-of-order, the output is still correct as compositing does not occur until after the fillmaps have been merged, whilst providing greater parallelisation and improving overall system performance.

Embodiment 1

Figure 6:
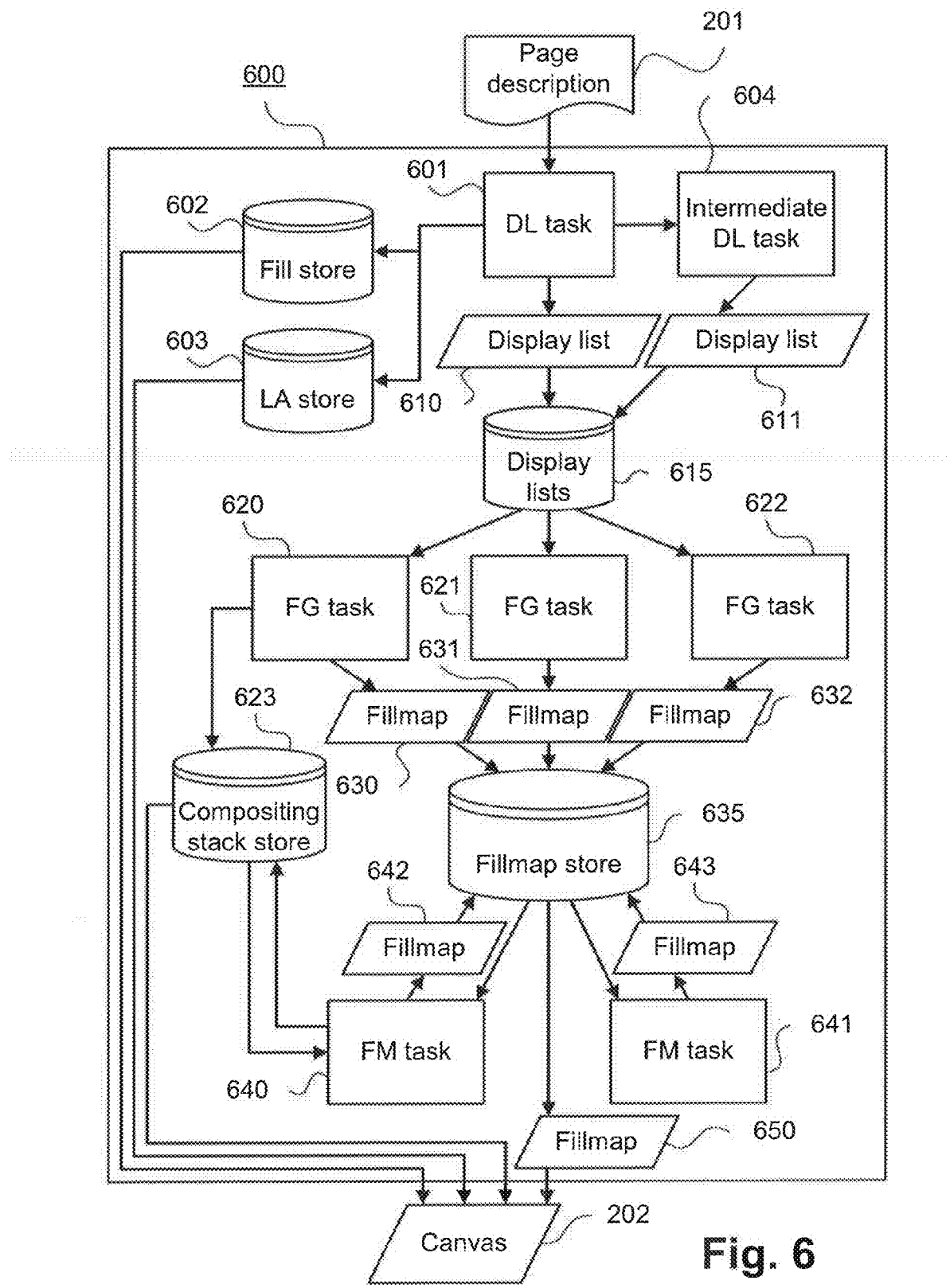
FIG. 6 is a schematic block diagram illustrating a process of generating an intermediate representation of a page description in a multi-threading environment is where tasks may be executed asynchronously to generate the intermediate representation, as required by FIG. 2.

FIG. 6: Multi-Threading Overview

The process 600 of generating a canvas 202 on a multi-processor printer host 101 is described in more detail with reference to FIG. 6. The process 600 creates a canvas 202, which is an intermediate representation of the page description 201 being printed.

The process 600 receives a page description 201 in the form of a PDL. A display list generation task ("DL task") 601 interprets the page description 201 in a manner specific to the type of PDL. For example, a page description in the form of Adobe® PDF requires different interpreting steps to those of a page description in the form of Hewlett-Packard® PCL. However, no matter the form of a page description, the DL task 601 produces a sequence, including subsequences, of graphic objects in an order known in the art as z-order.

The DL task 601 interprets graphic objects from the page description 201, and produces z-band display lists (e.g. 610), where the display list may be stored in memory 106, as depicted in FIG. 6 as Display lists 615. Each display list (e.g. 610) contains a sequence of graphic objects with consecutive z-order, sorted by the first scan lines on which the graphic objects appear. The DL task 601 creates fills and level appearances, which are stored in memory 106, as depicted in FIG. 6 as the fill store 602 and level appearance store 603 respectively. The fills and level appearances are referenced from the z-band display lists. An example of splitting the graphic objects of a page description 201 into one or more z-band display lists is described hereinafter with reference to FIG. 7.

Generally, the DL task 601 generates graphical objects in z-order. This is because most page descriptions are a sequence of graphic commands, some of which update a graphics state. When a graphic command produces a graphic object, the properties of the graphic object usually depend on the graphics state at the time the graphic object is produced. Therefore, the graphic commands must be processed in order so that the correct graphics state is known when a graphic object is produced. However, graphic commands that produce a known graphics state can be determined. For example, at the conclusion of a group in PDF, the graphics state is restored to the graphics state when the group was invoked. Therefore, the DL task 601 can identify a sequence of graphic commands (e.g. the commands associated with the group) whereby the graphics state for the following command (i.e. the first command after the group has finished) is known in advance (i.e. the graphics state that was in place prior to the group starting). When the DL task 601 is able to identify such a sequence of graphic commands in the page description 201, such as when a group is encountered, a new task is created, which is called an Intermediate DL task (e.g. 604). The new Intermediate (or group) DL task 604 processes the above mentioned group sequence of graphic commands, such as the commands associated with a group. While the Intermediate DL task 604 processes the above mentioned group sequence of graphic commands, the DL task 601 can then skip the processing of the group sequence of graphical commands, since the graphics state for the graphic commands that follow the group sequence of graphic commands is invariant under such a group sequence of graphic commands. The group sequence of graphics commands is isolated from the graphic commands following the group sequence of graphic commands. Note that the Intermediate DL task 604 can be executed concurrently while the DL task 601 continues processing graphic commands that appear in the page description 201 after the group sequence of graphic commands. The process executed by the DL task 601 is described hereinafter with reference to FIG. 11, and the process executed by the Intermediate DL task 604 is described hereinafter with reference to FIG. 16.

The Intermediate DL task 604 creates a separate sequence of z-band display lists (e.g. 611), which are also stored in the display list store 615. These z-band display lists (e.g. 611) are processed into fillmap representation (e.g. 632) by FG tasks (e.g. 622). Generally, the z-order of a fillmap is determined by the sequence in which the corresponding z-band display list is generated by the DL task 601 or an Intermediate DL task (e.g. 604). When an Intermediate DL task (e.g. 604) is created to enable parallel display list generation, the fillmaps (e.g. 632) that result from these display lists require a tree structure to maintain the correct z-ordering of fillmaps. The z-order is defined by a pre-order traversal of the tree, whereby the first fillmap corresponding to the group sequence of graphic commands has the highest priority (i.e. is traversed first), and the first fillmap corresponding to graphical commands that follow the group sequence of graphical commands has the lowest priority (i.e. is traversed second).

For each z-band display list (e.g. 610), a corresponding fillmap generation task ("FG task") (e.g. task 620) is created. In the example shown in FIG. 6, the DL task 601 has split the graphic objects of the page description 201 into three z-band display lists. Therefore, three FG tasks 620, 621 and 622 are created. Each FG task (e.g. tasks 620-622) receives a z-band display list and converts that z-band display list to a z-band fillmap (e.g. 630-632). The z-band fillmaps (e.g. 630-632) are temporarily stored in the memory 106 as depicted in FIG. 6 as Fillmap store 635. For example, FG task 620 receives a z-band display list produced by the DL task 601 and produces a z-band fillmap representing the same sequence of graphic objects. The FG task 620 generates compositing stacks that are referenced by the z-band fillmap 630. These compositing stacks are stored in a compositing stack store 623, which is stored in memory 106. The fillmap generation process executed by an FG task (e.g. task 620) is described in more detail hereinafter with reference to FIG. 19.

The z-band fillmaps (e.g. 630-632) generated by the FG tasks (e.g. tasks 620-622) represent intermediate representations of z-bands of the page description 201. In order to produce a single fillmap that can be referenced by the canvas 202 that represents an intermediate representation of the page description 201, one or more fillmap merge tasks ("FM task") (e.g. tasks 640-641) are required. Each FM task (e.g. tasks 640-641) typically receives two or more z-band fillmaps (e.g. 630-632) and merges them into a single fillmap, which is another z-band fillmap (e.g. 642-643). This merged z-band fillmap is then stored back into memory 106, as depicted in FIG. 6 as Fillmap store 635 in anticipation of additional fillmap merging. If there are no more z-band fillmaps left to merge, the final merge produces the final fillmap 650, which can then be referenced by the canvas 202 as a representation of the page description 201.

As another example, suppose the FM task 640 merges the z-band fillmaps 630 and 631 produced by FG tasks 620 and 621 respectively, to produce another z-band fillmap 642. FM task 641 then merges the z-band fillmap 642 produced by FM task 640 with the z-band fillmap 632 produced by FG task 622. As there are only three z-band display lists produced by the DL task 601, in this example FM task 641 produces a z-band fillmap 643 which is actually the same as the final fillmap 650 for the page description 201. The fillmap merge process 2200 executed by FM tasks (e.g. tasks 640-641) are described in more detail hereinafter with reference to FIG. 22. As described earlier with reference to FIG. 1, the host software 105, and therefore the process 600 of generating an intermediate representation are executed by a multi-core processor 107. The tasks of the process 600 of generating an intermediate representation (e.g. tasks 601, 604, 620-622 and 640-641) are therefore executed in parallel by the processor cores 108-111 of the multi-core processor 107. While many of the tasks are able to execute in parallel, there are some dependencies between the tasks that must be satisfied. For example, because the page description 201 is interpreted in z-order, the DL task 601 is executed sequentially, with the exception of sequences of graphic commands in which an Intermediate DL task 604 can be used as previously explained. FG tasks are able to execute in parallel with all other tasks, but require a display list to have been produced by the DL task or an Intermediate DL task. Similarly, FM tasks are able to execute in parallel with all other tasks, but require two or more z-band fillmaps to have been already produced by FG tasks or other FM tasks, for the page description 201.

The canvas 202 output by the process 600 of generating an intermediate representation contains a reference to the final fillmap 650 and references to the fill store 602, the level appearance store 603, and the compositing stack store 623.

FIG. 7: Z-Banding Example

Figure 7A:
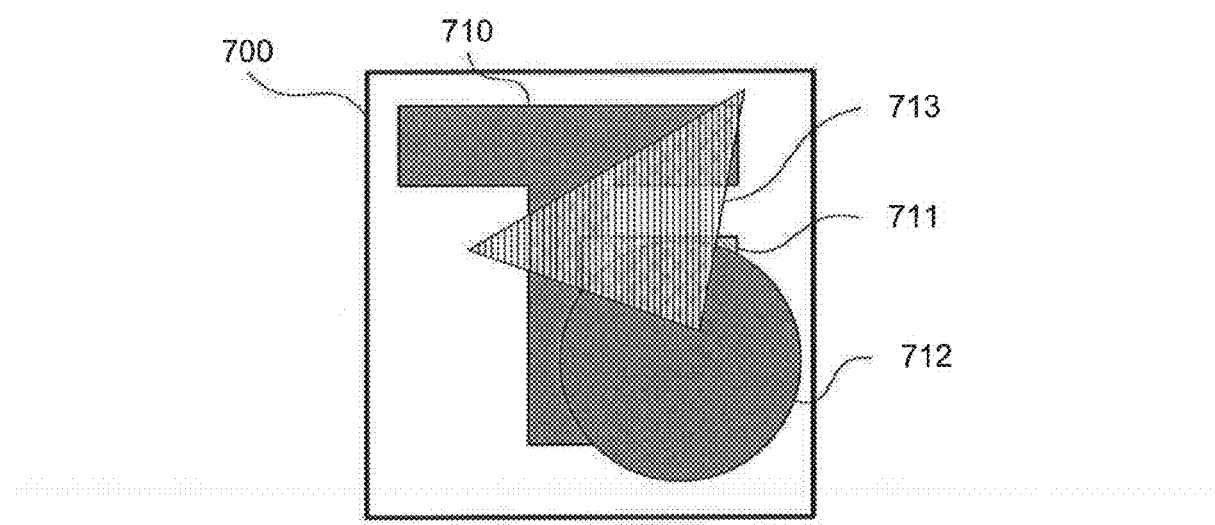
FIGS. 7A-7B are block diagrams used in an example of fillmap generation tasks splitting a page of graphic objects into z-bands that can be executed in parallel.
Figure 7B:
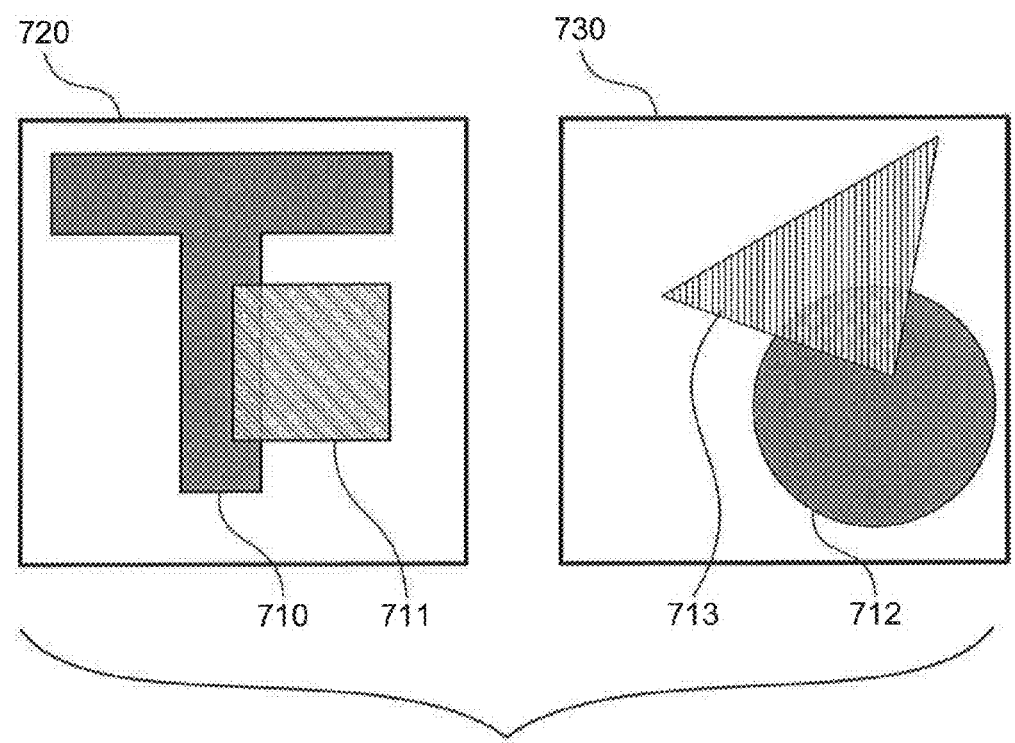

As described hereinbefore with reference to FIG. 6, in order to allow fillmap generation to execute in parallel on a multi-core processor, fillmap generation can be split into a number of independent FG tasks, each of which processes a z-band display list of graphic objects to produce a z-band fillmap. Sequences of graphic objects with consecutive z orders are called z-bands. Each z-band display list is converted into a single fillmap representation by an FG task. The size of a z-band can be pre-set to some number of graphic objects, or determined during execution according to some criteria such as the complexity of an FG task needed to convert the graphic objects in the z-band to a fillmap. Additionally, a new z-band is started when an Intermediate DL task is created, as explained hereinbefore with reference to FIG. 6. Referring now to FIGS. 7A and 7B, the process of splitting a page of graphic objects into z-bands is described.

FIG. 7A shows a page 700 with four graphic objects, 710-713. Graphic object 710 has the smallest z-order, followed by graphic object 711 which has the next highest z-order, followed by graphic object 712, followed by graphic object 713 which has the highest z-order of all graphic objects 710-713. Graphic objects 710-713 of the page 700 are split into two z-band display lists 720 and 730 as shown in FIG. 7B. The first z-band display list 720 contains the two graphic objects with smallest z-orders, being graphic object 710 and graphic object 711. The second z-band display list 730 contains the two graphic objects with largest z-orders, being graphic object 712 and graphic object 713. As described hereinbefore with reference to FIG. 6, in one implementation these two z-band display lists are processed by two FG tasks either sequentially or in parallel, to produce two z-band fillmaps. The produced z-band fillmaps are then merged (by an FM task) to produce a final fillmap for the page 700. In general, the number of fillmaps for a page varies depending on the page being rendered. The advantage of splitting a page of graphic objects into z-bands is that z-bands are processed by multiple FG tasks that are able to be executed in parallel. In this way, a printer host takes advantage of multi-processor and multi-core systems, thereby advantageously speeding up the printer host processes.

Figure 8:
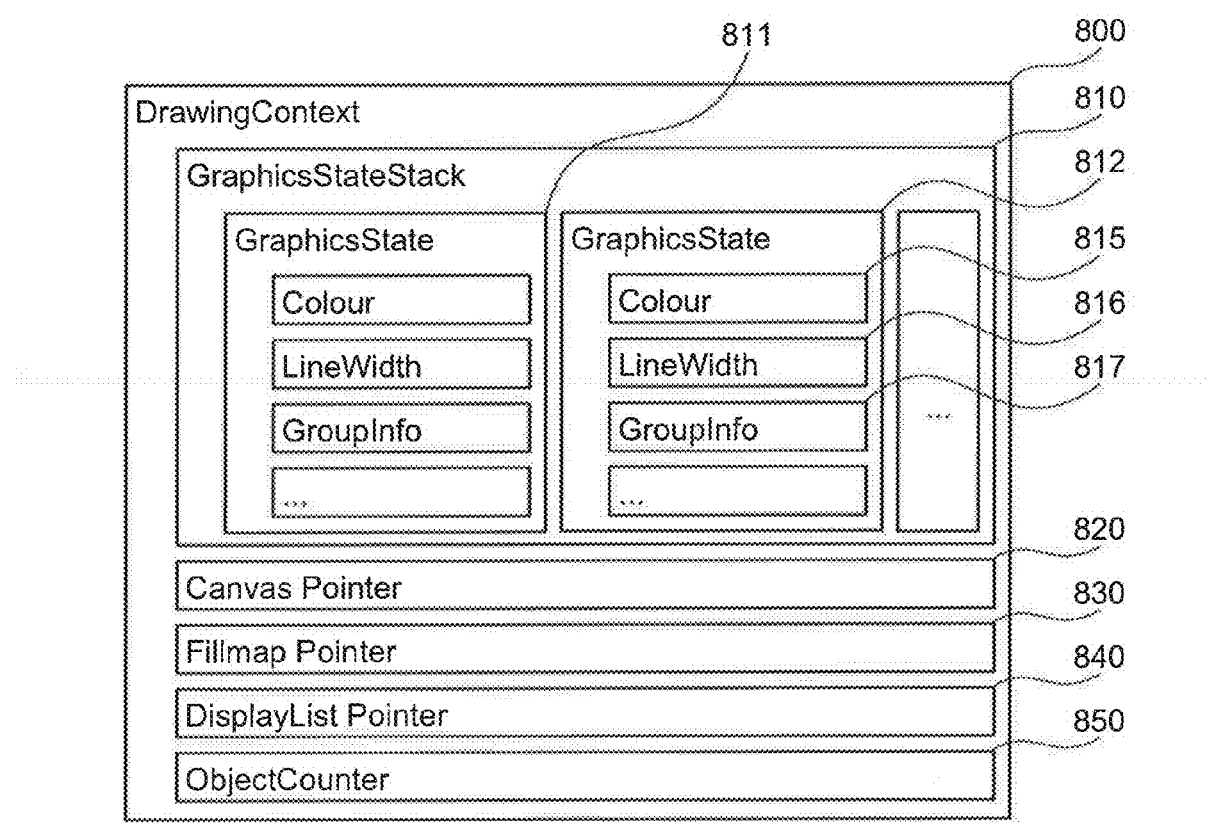
FIG. 8 is a schematic block diagram of a drawing context data structure used for recording graphic objects.
Figure 9:
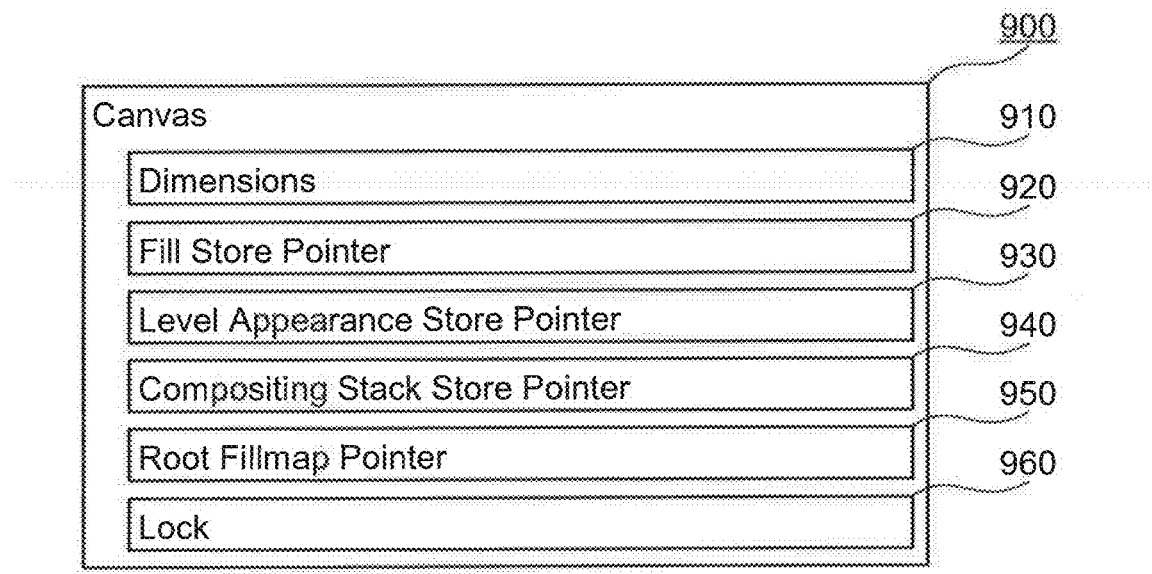
FIG. 9 is a schematic block diagram of a canvas data structure for describing graphic objects in an intermediate representation of a page.
Figure 10:
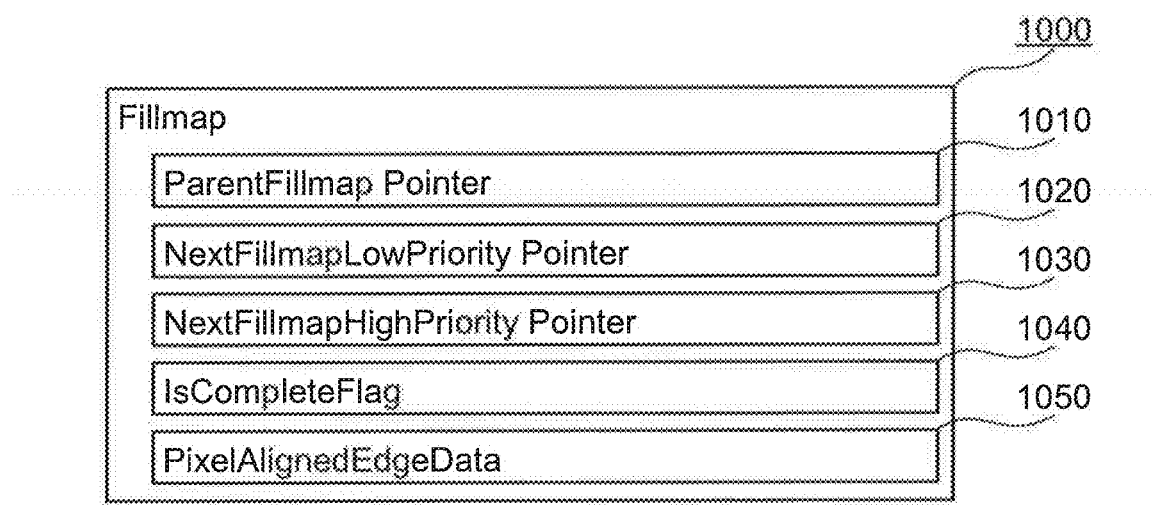
FIG. 10 is a schematic block diagram of a fillmap data structure used to describe pixel aligned edge data in the intermediate representation of a page shown in FIG. 9.

FIG. 8-10: Data Structures

FIG. 8 is a block diagram of a drawing context 800 data structure. A drawing context 800 is an intermediate data structure used within a single thread to accept graphic commands in sequence, such as those generated by processing a page description. The drawing context 800 is not used in a canvas, but is used in the process of generating a canvas, which is described in detail hereinafter. The drawing context 800 contains a graphics state stack 810 with individual graphics states (two are shown 811 and 812). An individual graphics state, such as 812, contains many variables, some of which are used to describe graphic object properties, such as a colour 815, line width 816, information about any active compositing groups 817. Most PDLs include commands to modify the values of various variables in the top-most graphics state within the graphics state stack. A "push" operation inserts a new copy of the current graphics state onto the top of the graphics state stack, and a "pop" operation removes the top-most graphics state from the graphics state stack. The values in the top-most graphics state may be used when generating graphic objects. The drawing context 800 also includes a reference to a canvas 820 data structure, which is described with reference to FIG. 9. The canvas 900 referenced by the drawing context 800 is the intermediate representation of the page 202. A canvas may be shared between many drawing contexts, so access to the canvas must be thread-safe. The fillmap pointer 830 in the drawing context 800 refers to one of the fillmaps in the canvas referenced by the canvas pointer 820, and is unique amongst all the drawing contexts that reference the same canvas 820. The display list pointer 840 in the drawing context 800 refers to a display list. A display list is used to accumulate a sequence of graphic objects before conversion to a fillmap format. The display list typically describes the edges of objects using lines and Bezier curves. Finally, the object counter 850 is used to count the number of objects that have been added to the display list referenced by the display list pointer 840.

A canvas data structure 900 is shown in FIG. 9. The canvas, as previously described with the example in FIG. 5, represents a page to be printed. The canvas contains data such as the dimensions of the page 910, and pointers to a fill store 920, level appearance store 930 and a compositing stack store 940 as described hereinbefore using the example in FIG. 5. The canvas 900 also contains a pointer to the lowest z-order fillmap 950 and a Lock member 960. The data structure for a fillmap 1000 referenced 950 by the canvas is shown in FIG. 10.

A fillmap data structure 1000 is now described with reference to FIG. 10. In the preferred embodiment, a sequence of fillmaps is represented by a tree. The fillmap 1000 contains pointers to the parent fillmap 1010 and two child fillmaps 1020 and 1030. The sequence is defined by a pre-order traversal of the tree, starting with the root fillmap referenced 950 by the canvas data structure 900, and following the high priority fillmap pointer 1030 prior to the low priority fillmap pointer 1020. The IsCompleteFlag 1040 is used to indicate when processing for this fillmap has been completed (i.e. the FG task for this fillmap has completed). The flag 1040 is initialised to FALSE, and later set to TRUE when the fillmap has been completely generated. Finally, the fillmap data structure 1000 contains pixel aligned edge data 1050, such as that for the example shown in FIG. 4.

An example of the use of the above mentioned data structures is provided hereinafter with reference to FIGS. 25-31, and in particular, the data structures are shown in FIGS. 30A-30F.

Figure 11:
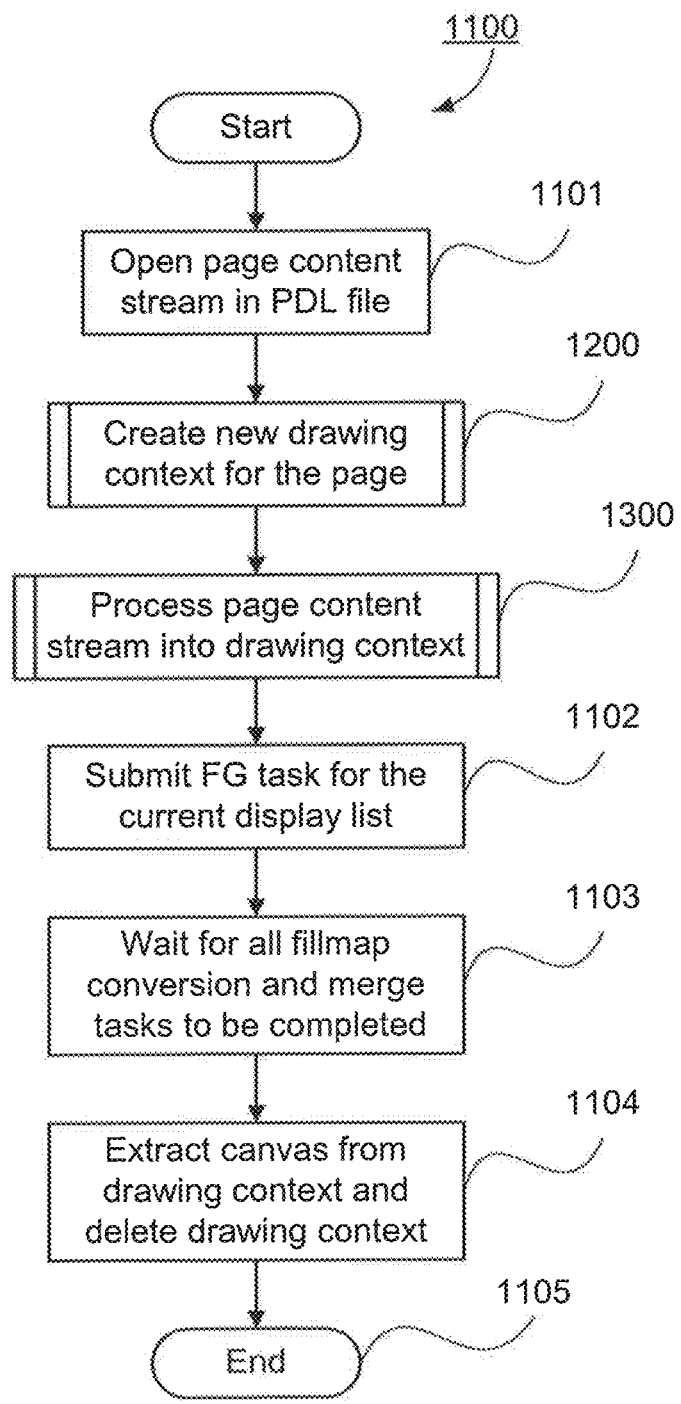
FIG. 11 is a schematic flow diagram illustrating a method of generating an intermediate representation of a page from a page description.

FIG. 11: Page Description to Canvas

The process 1100 of converting a page description into a canvas is shown in FIG. 11. This is the process 1100 that is executed by the DL task 601 as illustrated in FIG. 6, is executed on the printer host 101, by receiving a page description 201 and generating a canvas 202. In step 1101, the page content stream in the page description is opened. For example, in PDF, this involves opening and decompressing the stream referenced by the /Contents key in the page dictionary.

In the next step 1200, a new page drawing context 800 is created for the page. This is explained in more detail hereinafter with reference to FIG. 12. The page drawing context is used to process graphic objects from the page content stream opened in the previous step 1101. In the next step 1300, the page content stream is processed, using the page drawing context 800 to receive graphic objects. This process 1300 is explained in more detail hereinafter with reference to FIG. 13. In the next step 1102, a FG task is submitted for any graphic objects that remain in the current display list 840 in the page drawing context 800. Then, the process 1100 being executed by a DL task waits 1103 for any remaining FG and FM tasks to complete. That is, the process 1100 waits for all fillmap generation and fillmap merge tasks to be completed. Then, in step 1104 the canvas representation 202 of the page description 201 can be extracted from the page drawing context 800 using the canvas pointer 820, and the page drawing context 800 data structure can be deleted (destroyed). Processing ends in step 1105, and the canvas representation has been obtained.

Figure 12:
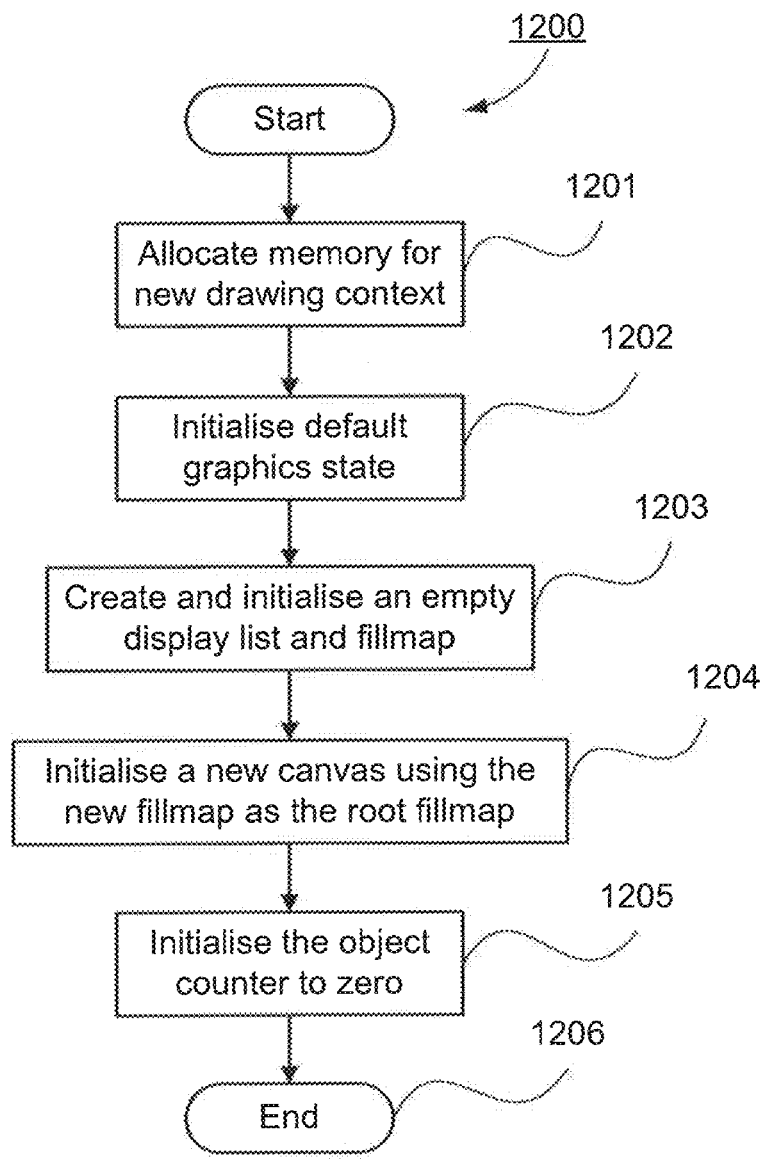
FIG. 12 is a schematic flow diagram illustrating a method of creating and initialising a drawing context, as required in FIG. 11.

FIG. 12: Drawing Context Creation

The process 1200 of creating a page drawing context 800 is explained in more detail, with reference to FIG. 12. In step 1201, memory is allocated for the drawing context 800 data structure. In step 1202, the default graphics state 810 is initialised. The default state is usually specified by the PDL specification. In step 1203, an empty display list (not shown) and fillmap 1000 are created and initialised. The empty display list and fillmap are then referenced (840 and 830 respectively) by the page drawing context 800 that was created in step 1201. Similarly, in step 1204, a new canvas 900 is created, initialised and referenced 820 from the page drawing context 800. In step 1204, the new fillmap 1000 is referenced from the canvas's 900 root fillmap pointer 950. In step 1205, the object counter 850 in the page drawing context 800 is initialised to zero. In step 1206, the process 1200 of creating a page drawing context 800 ends.

Figure 13:
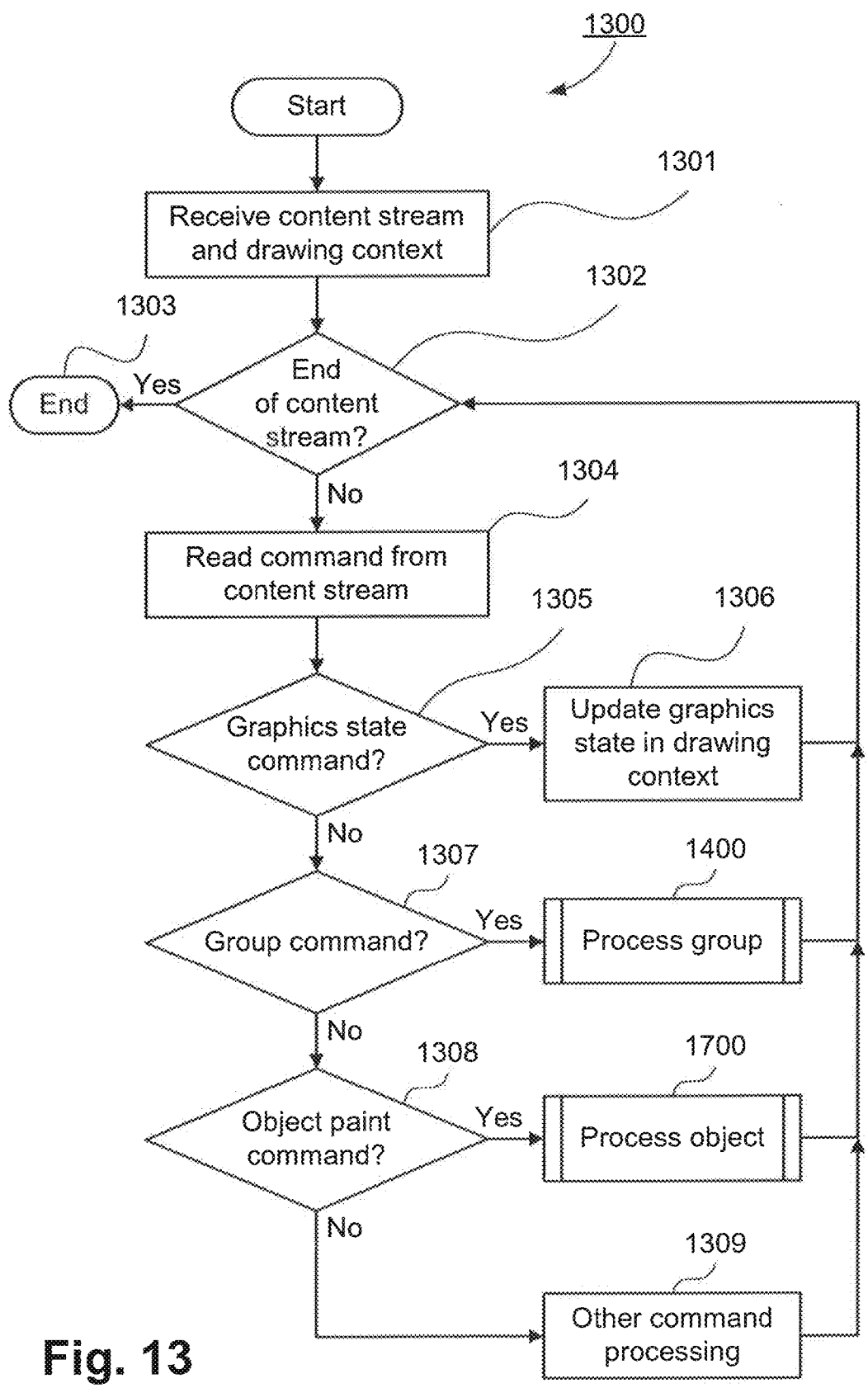
FIG. 13 is a schematic flow diagram illustrating a method of processing a content stream and storing the results in a drawing context, as required by FIG. 11 and FIG. 14.

FIG. 13: Content Stream to Drawing Context

The process 1300 of recording graphic objects from a content stream using a drawing context 800 is described in more detail with reference to FIG. 13. The process 1300 commences at step 1301.

In step 1301, the content stream and the current drawing context 1301 are received. The content stream is checked in decision step 1302 to determine if the end of the stream has been reached. If the end of the stream was reached (Yes), the process 1300 ends in step 1303. Otherwise, if in decision step 1302 the end of the content stream has not been reached (No), a graphic command is read in step 1304 from the content stream. In decision step 1305, the graphic command is checked to determine if the graphic command is a graphics state command. If the graphic command is a graphics state command (Yes), then the graphics state is updated according to the graphics state command in step 1306. For example, in PDF, the command "1.0 0.0 0.0 rg" sets the current fill colour to red in the DeviceRGB colour space. In this case, any following graphic objects that depend on the current fill colour are coloured red, until the next graphics state command that modifies the current fill colour is encountered. From step 1306, the process 1300 returns to decision 1302 to determine if the end of the content stream has been reached.

If the graphic command read in step 1304 is not a graphics state command, decision step 1305 returns false (No), and the graphic command is checked in decision step 1307 to determine if the graphic command is a group command. If the graphic command is a group command (Yes), processing continues at step 1400, and the group is processed depending on the PDL. Usually, a group is sequence of graphic commands stored separately in the page description 201. Some groups, such as transparency groups, have an effect on the compositing order of the graphical objects. Group processing 1400 is explained in more details hereinafter, with reference to FIG. 14. After processing 1400 the group, control flow returns to the decision 1302 to determine if the end of the content stream has been reached. In the preferred embodiment, with reference to FIG. 14, some groups are processed using an Intermediate DL task. In the case where a group is processed using an Intermediate DL task, the current drawing context is updated to refer to an empty post-group display list, which is used to receive the graphical objects resulting from the graphical commands that follow the group on returning to decision 1302. Note that the current process 1300 continues to process graphic commands that follow the group, while the intermediate DL task simultaneously processes graphic commands related to the group. The graphic commands that follow the group are independent of the sequence of graphic commands related to the group, since the graphics state after the group is invariant under the sequence of graphic commands related to the group. Therefore, the group sequence of graphics commands is isolated from the graphic commands that follow the group.

If the graphic command is not a group command (No) at decision step 1307, processing continues at decision step 1308. In step 1308, a check is made to determine if the graphic command paints a graphic object. If the command does paint a graphic object (Yes), the graphic object is then processed in step 1700 by adding the graphic object to the display list referenced by the current drawing context. This process 1700 is explained in more detail hereinafter, with reference to FIG. 17. After step 1700, control flow returns to the decision 1302 to determine if the end of the content stream has been reached.

If the graphic command is not an graphic object painting command (No) at decision 1308, the control flow progresses to the next step 1309, which processes other commands. Many PDLs, including PDF, contain graphic commands that are not relevant to printing (e.g. sounds or interactive features), control the visibility of other objects (e.g. marked content in PDF) or are extensions added in a newer version of the PDL (e.g. BX/EX compatibility sections in PDF). In step 1309, these other graphic commands are processed in accordance with the requirements of the PDL specification. The process 1300 then returns to decision 1302 to determine if the end of the content stream has been reached.

Figure 15:
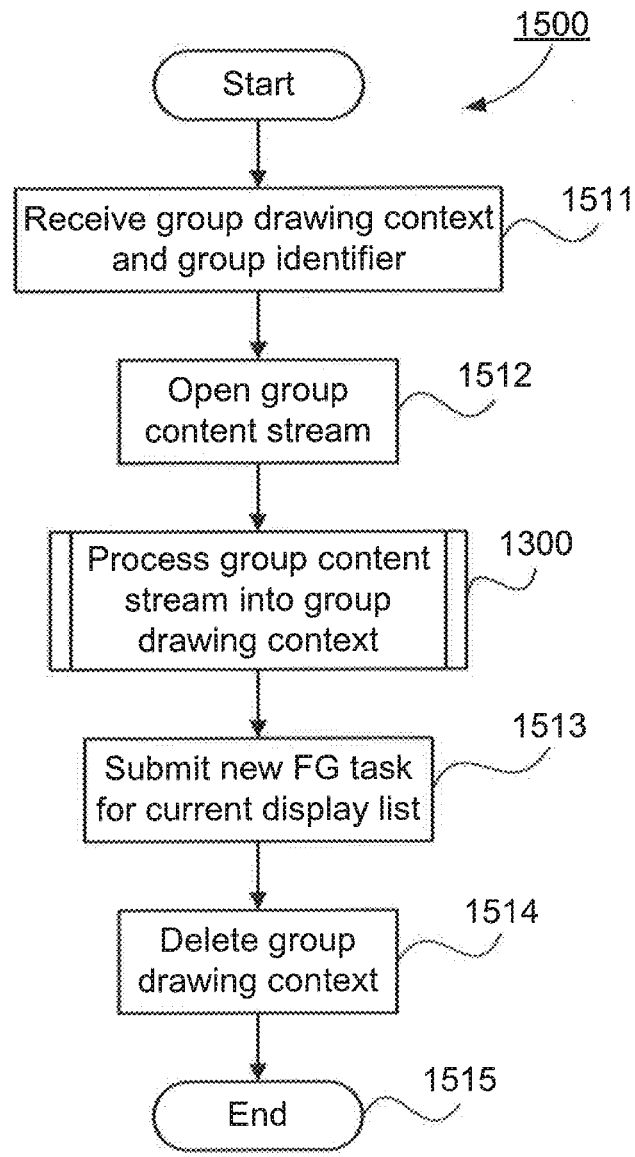
FIG. 15 is a schematic flow diagram illustrating a method of processing a group's content in a separate task.

While the above description has been in the context of processing a page content stream, the process 1300 is also used to process a group content stream, as explained in the description of FIG. 15.

Figure 14:
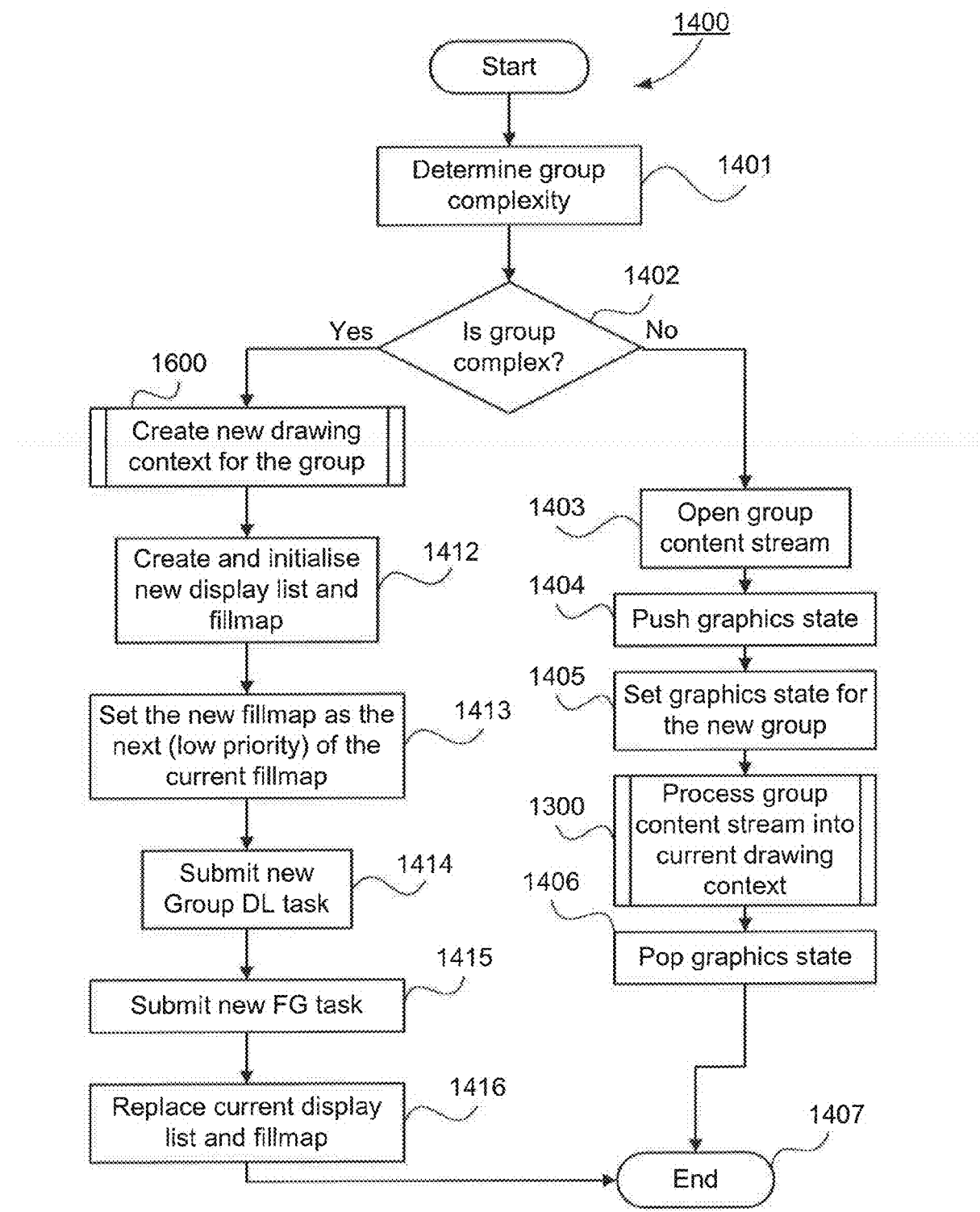
FIG. 14 is a schematic flow diagram illustrating a method of processing a group, as required by FIG. 13.

FIG. 14: Group Processing

With reference to FIG. 14 the group processing method 1400 used in FIG. 13 is described in more detail. In step 1401, the complexity of the group is determined. In PDF, a suitable test is to compare the length of the group content stream with a predetermined value. The length of a group content stream can be obtained or approximated using the value associated with the /Length key in the XObject dictionary. If the content stream is compressed, an estimated compression factor can be taken into account to approximate the uncompressed stream length. For example, if the length of the group content stream is greater than 4 KB, then the group is considered to be complex.

In decision step 1402, a check is made to determine if the group is complex. Depending on the result of the complexity test 1402, there are two options for processing the graphic commands associated with the group. If the group is not complex (No), the group is processed according to steps 1403, 1404, 1405, 1300, and 1406 described hereinafter, before processing ends at step 1407. In step 1403, the group content stream is opened in the page description 201. In step 1404, the graphics state in the current drawing context is pushed, which adds a copy of the current graphics state to the top of the graphics state stack. Any graphics state commands within the group only modify this copy of the graphics state, allowing the original graphics state to be restored once the group has finished. Graphic objects that are produced by graphic commands after the group has finished are not affected by the graphics state commands that occur within the group. In step 1405, the current graphics state for the new group is set. Note that the current graphics state is now the copy of the graphics state from the prior push operation 1404. This step 1405 depends on the PDL requirements. Some PDLs use the copied graphics state for the group. Others reset some variables in the graphics state to a default state. In PDF, the value of the graphics state variables depend on the type of group. For example, PDF transparency groups require that the compositing operator be set to NORMAL, and the current stroking and non-stroking alpha constants are reset to zero at the beginning of a group. In step 1300, the group content stream is processed into the current drawing context, as described hereinbefore with reference to FIG. 13. In step 1406, after the group has been processed, the graphics state that has been pushed in the prior step 1404 is popped 1406, reverting any graphics state changes that were made during group processing. The process then ends 1407 and the group has been processed using the current drawing context.

However, in the case where the group is determined to be complex (Yes) at decision step 1402, an alternative processing sequence is followed, which is described with references to steps 1600, and 1412-1416. In step 1600, a new group drawing context 800 is created for the group 1600. This process is shown in more detail in FIG. 16 and is described hereinafter. After the group drawing context has been created in step 1600, a new post-group display list and new post-group fillmap are created and initialised in step 1412. The new post-group display list and new post-group fillmap are used to process the graphical commands that follow the group. In step 1413, the new post-group fillmap is set as the next (low priority pointer) of the fillmap referenced by the current drawing context. In step 1600, a group fillmap created for the group content may be set as the next (high priority pointer) of the fillmap referenced by the current drawing context. Therefore, the group content has a higher priority than the content that follows the group, and therefore has a lower z-order than the content that follows the group. This relative ordering of fillmaps must be taken into account when identifying a sequence of fillmaps that can be merged. In step 1414, a new Intermediate DL task is submitted to process the group content stream, according to the process 1500 described with reference to FIG. 15, using the group drawing context that has been created in step 1600. In step 1415, a new FG task is submitted to convert the display list referenced by the current drawing context into the fillmap referenced by the current drawing context. The FG task executes the process 1800, which is explained hereinafter with reference to FIG. 18. In the preferred embodiment, the Intermediate DL task created in step 1414 and the FG task created in step 1415 are executed asynchronously with the rest of this process 1400. In 1416, the current display list and fillmap are replaced. That is, the current drawing context 800 is updated so that the display list pointer 840 and fillmap pointer 830 reference the new post-group display list and post-group fillmap created in step 1412. The process 1400 then ends at step 1407.

FIG. 15: Intermediate (Group) DL Task Process

The process 1500 that is executed by an Intermediate DL task is described in more detail with reference to FIG. 15. The process 1500 commences at step 1511. In step 1511, the process 1500 receives a group drawing context 800 and a group identifier. In step 1512, the group identifier is used to open the group content stream in the page description 201. In step 1300, the group content stream is processed into the group drawing context. The graphical commands associated with the group are then processed using the group drawing context 800, according to the process 1300 described hereinbefore with reference to FIG. 13. Once this process 1300 has finished, any remaining objects in the display list referenced (using the display list pointer 840) by the group drawing context must be converted into fillmap format. This is achieved in step 1513 by submitting a new FG task for the current display list. The FG task asynchronously executes the FG process 1800, which is described in more detail hereinafter. In step 1514, the group drawing context is deleted. The process 1500 ends at step 1515.

Figure 16:
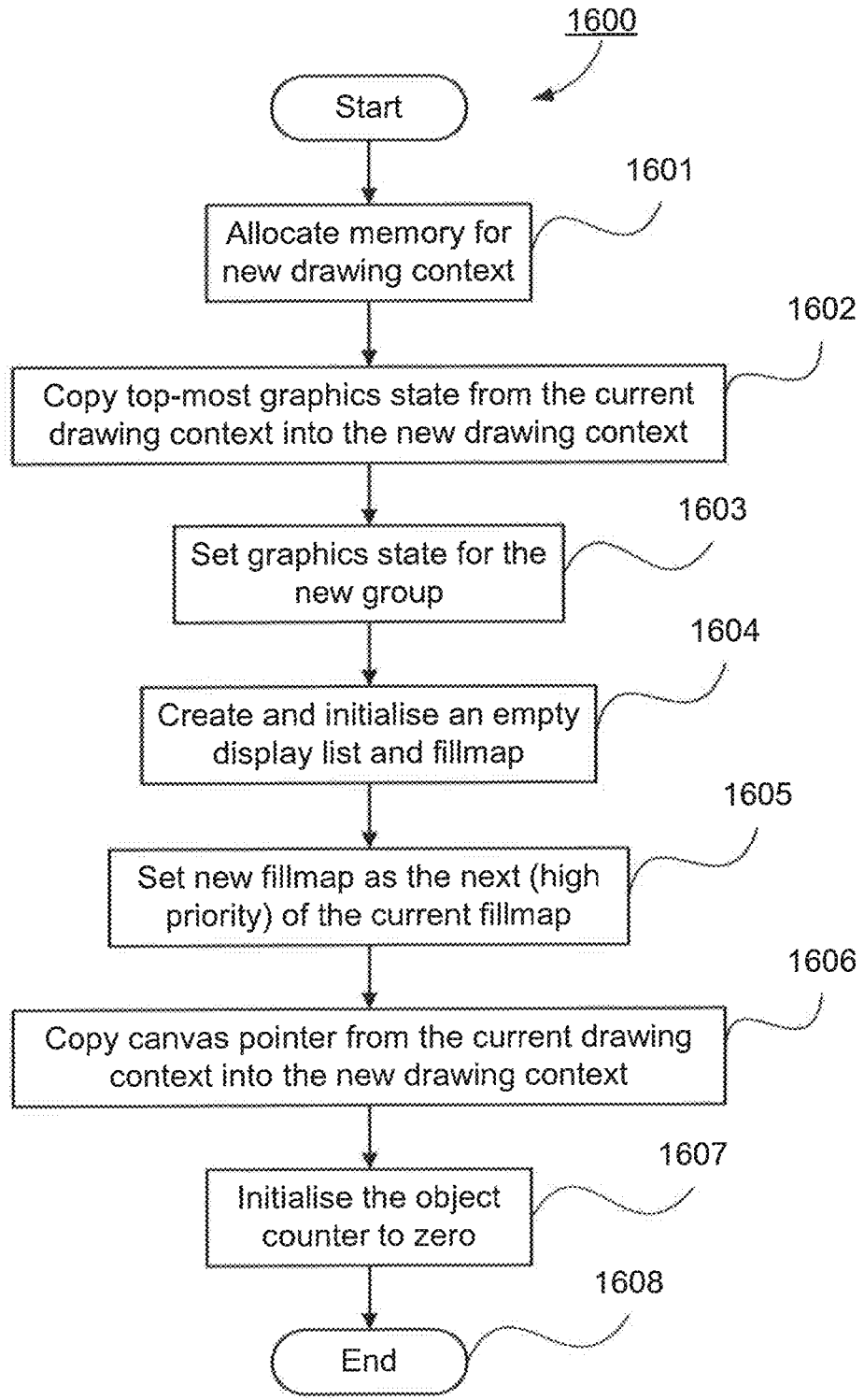
FIG. 16 is a schematic flow diagram illustrating a method of creating and initialising a drawing context that can be used to process a group, as required in FIG. 14.

FIG. 16: Group Drawing Context Creation

The process 1600 of creating and initialising a new group drawing context is explained in more detail with reference to FIG. 16. The process 1600 commences at step 1601. In step 1601, the process 1600 allocates memory for a new group drawing context data structure 800. In step 1602, the graphics state stack 810 in the group drawing context is initialised with a copy of the top-most graphics state (e.g. 811) in the current drawing context 800. This graphics state is used for processing the graphic commands associated with the group. In step 1603, the graphics state for the new group is set. The graphics state 811 is modified according to the requirements of the PDL when starting a group. In step 1604, a new empty group display list (not shown) and a new group fillmap 1000 are created and initialised. The group drawing context 800 allocated in step 1601 is initialised with the group display list and group fillmap 1000 created in step 1604. In step 1605, the new group fillmap 1000 is set as the next (high priority pointer) fillmap 1030 of the fillmap 1000 in the current drawing context 800. Conversely, the fillmap 1000 in the current drawing context 800 is set as the parent 1010 of the group fillmap 1000. In step 1606, the canvas pointer 820 is copied from the current drawing context 800 into the new group drawing context 800. In step 1607, the object counter 850 of the group drawing context is initialised to zero. The group drawing context 800 has now been created and the process 1600 ends at step 1608.

Figure 17:
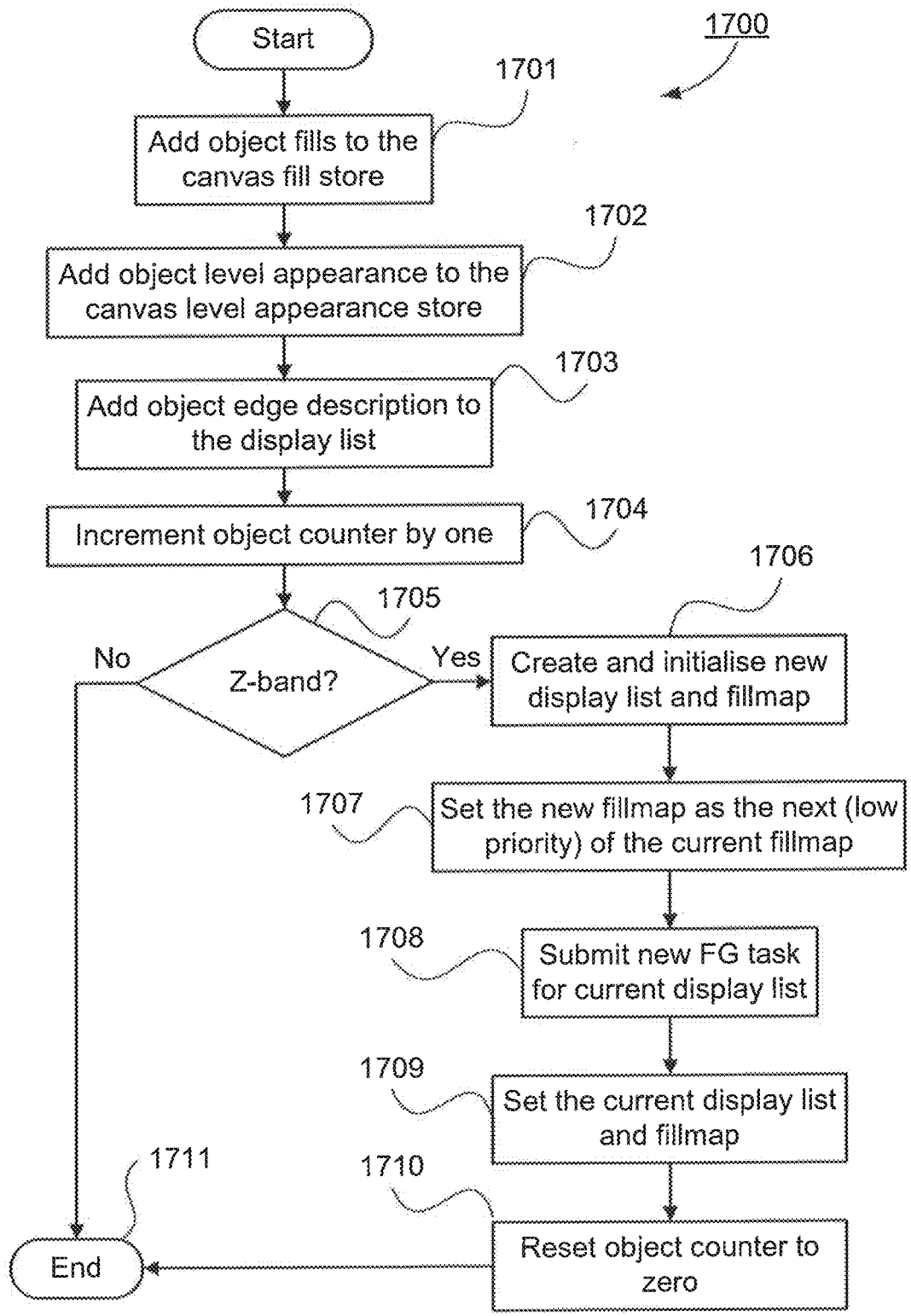
FIG. 17 is a schematic flow diagram illustrating a method of processing a graphic object, as required by FIG. 13, in which the graphic object is added to a display list in a current drawing context.

FIG. 17: Object Processing

The process 1700 of adding a graphic object to a display list in the current drawing context, as depicted in FIG. 13, is described in detail with reference to FIG. 17.

The process 1700 commences at step 1701. In 1701, any fills required for the object are created and added to the canvas fill store 920, the canvas being referenced 820 by the current drawing context. In step 1702, an object level appearance is created and added to the canvas level appearance store 930. The level appearance describes the properties of the graphical object. For example, the level appearance references any fills created in the step 1701, as well as a compositing operator, which describes how the fills are combined with the background to produce a resulting colour. Some PDLs, such as PDF, store a compositing operator in the graphics state (not shown). In this case, the compositing operator is copied from the graphics state in the current drawing context into the new level appearance. In other PDLs, the compositing operator may be specified with the graphic command.

In step 1703, an edge description of the graphic object is added to the display list referenced 840 by the current drawing context. The object in the display list stores the edge description, which typically comprises a series of co-ordinates describing lines and Bezier curves. Furthermore, the object contains a reference to the level appearance created in step 1702 and the z-order of the object relative to other objects in the display list referenced 840 by the current drawing context.

In step 1704, the object counter 850 in the current drawing context is incremented by one. The object counter 850 is used by the decision step 1705. In step 1705, a check is made to determine whether or not a z-band is appropriate. Z-banding is usually performed when the object counter 850 reaches a pre-determined threshold, such as 1000 objects. However, there are some other conditions when z-banding is performed, such as when a memory limit is reached. The most common case is not to z-band (No) at decision 1705, in which case the process of adding a graphic object to a display list ends in step 1711.

However, if decision 1705 determines that z-banding should occur (Yes), the process 1700 performs a number of steps 1706-1710. In step 1706, a new next z-band display list and the next z-band fillmap are created and initialised. The new z-band fillmap is set as the next fillmap (low priority pointer) 1020 of the fillmap referenced 830 in the current drawing context 800. In this case, the fillmap referenced 830 in the current drawing context has a NULL next (high priority) fillmap pointer 1030. In this case, the next z-band fillmap simply has a higher z-order than the fillmap referenced in the current drawing context. In step 1708, the display list referenced 840 in the current drawing context is converted into fillmap format by submitting a new FG task for the current display list. Note that the FG task submitted in this step 1708 is preferably performed asynchronously. In step 1709, the current display list and fillmap are set. The current drawing context is updated to reference the next z-band display list and next z-band fillmap created in step 1706. In step 1710, the object count 850 in the current drawing context 800 is reset to zero. The process 1700 then ends at step 1711.

Figure 18:
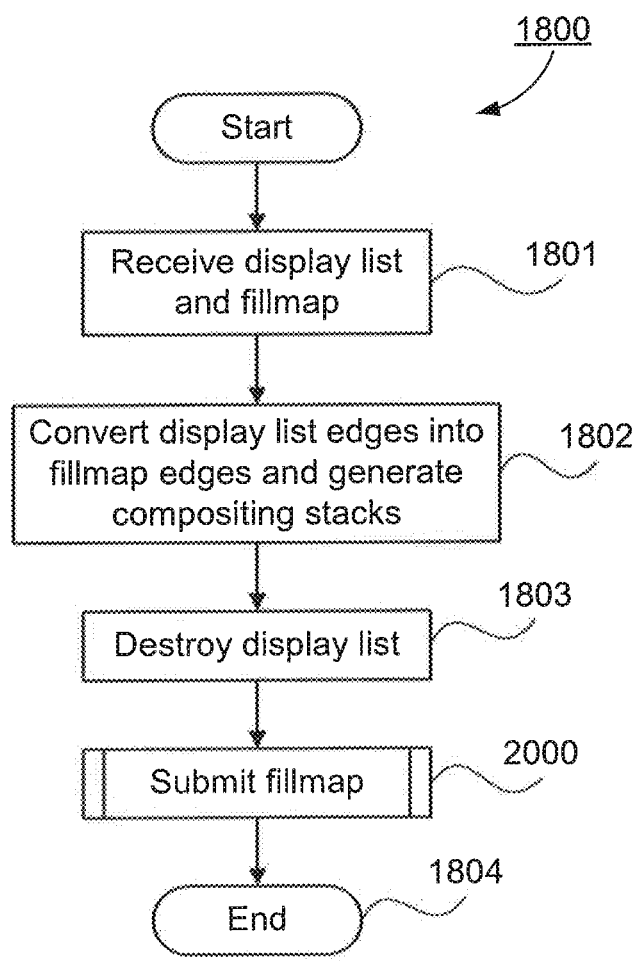
FIG. 18 is a schematic flow diagram illustrating a method of converting a display list into a fillmap that is executed by a fillmap generation task, as required in FIG. 11, FIG. 14 and FIG. 17.

FIG. 18: FG Task Process

FIG. 18 depicts the process 1800 of converting a z-band display list into fillmap format. The process 1800 commences at step 1801. In step 1801, a z-band display list describing graphic objects and an empty z-band fillmap are received. In step 1802, the graphic object edges that were stored in the z-band display list are processed by converting the display list edges into fillmap edges and generating compositing stacks. Converting the display list edges to pixel-aligned edges, is explained hereinafter using the example in FIG. 19A and FIG. 19B. The pixel-aligned edges are converted into fillmap edges by sorting in y-order, then in x-order, and then determining the active levels within each region, as is explained in more detail with the example in FIGS. 19B and 19C. Each edge activates or deactivates a level appearance representing the object to which the edge belongs. Compositing stacks for regions are generated by concatenating the active level appearances for a given region. In step 1803, the z-band display list is destroyed. In step 2000, the completed fillmap is submitted, which is explained in more detail with reference to FIG. 20. The process 1800 then ends at step 1804.

FIG. 19: FG Example

Figure 19A:
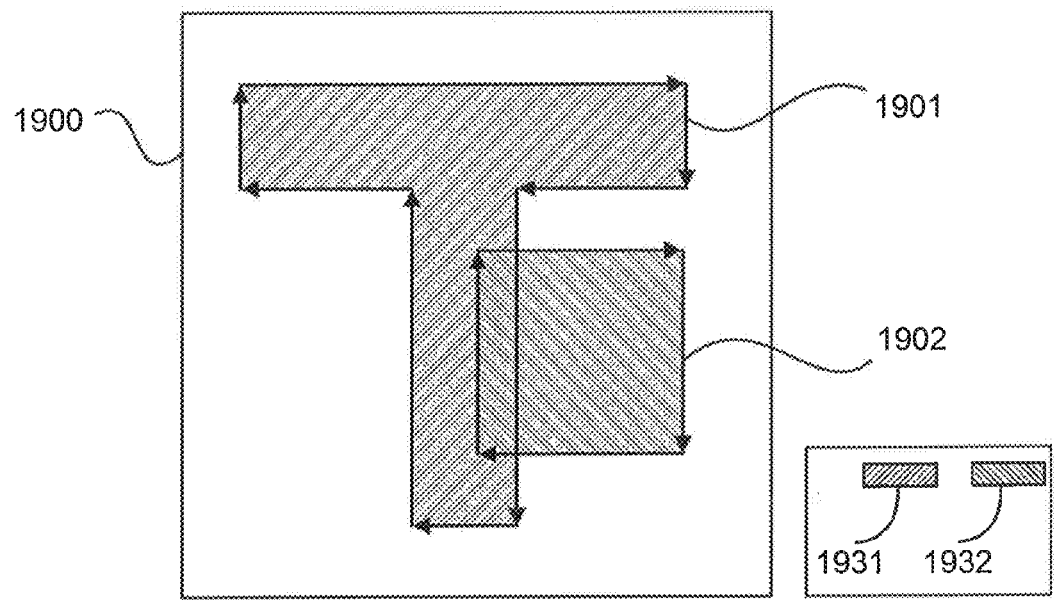
FIGS. 19A-19D are block diagrams depicting an example of the fillmap generation process of a page.

The generation of a z-band fillmap from a z-band display list is described using an example, with reference to FIGS. 19A to 19D. FIG. 19A shows a z-band display list representation 1900 of a page. The z-band display list 1900 contains two graphic objects 1901 and 1902. The edges of each graphic object are described in vector format. Additionally, each graphic object references a level appearance that was previously created by the DL task. The first graphic object 1901 is an opaque "T" shaped object that references a level appearance with a right-leaning hatched fill 1931 (the fill and level appearance have been combined in the diagram in FIG. 19 for simplicity). The second graphic object 1902 is a transparent square that references a level appearance with a left-leaning hatched fill 1932. The second graphic object 1902 partially overlaps the first graphic object 1901.

Figure 19B:
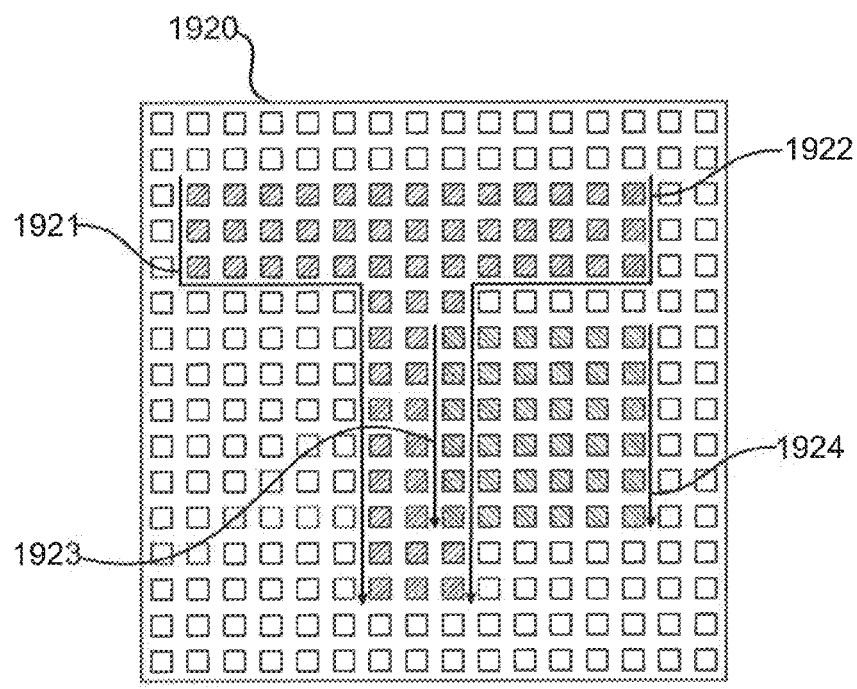

FIG. 19B shows the decomposition of the graphic objects 1901 and 1902 of the z-band display list 1900 of FIG. 19A into pixel-aligned graphic object edges according to a pixel grid 1920. A graphic object is decomposed into two or more pixel-aligned graphic object edges. Pixel-aligned graphic object edges define the activation or deactivation of a level appearance during rasterization. Pixel-aligned graphic object edges therefore refer to the level appearance of the graphic object from which the edges are derived. The first graphic object 1901 is decomposed into two pixel-aligned graphic object edges 1921 and 1922. Pixel-aligned graphic object edges 1921 and 1922 refer to the level appearance 1931 of the first graphic object 501. The second object 1902 is decomposed into two pixel-aligned graphic object edges 1923 and 1924. Pixel-aligned graphic object edges 1923 and 1924 refer to the level appearance 1932 of the second graphic object 1902.

Figure 19C:
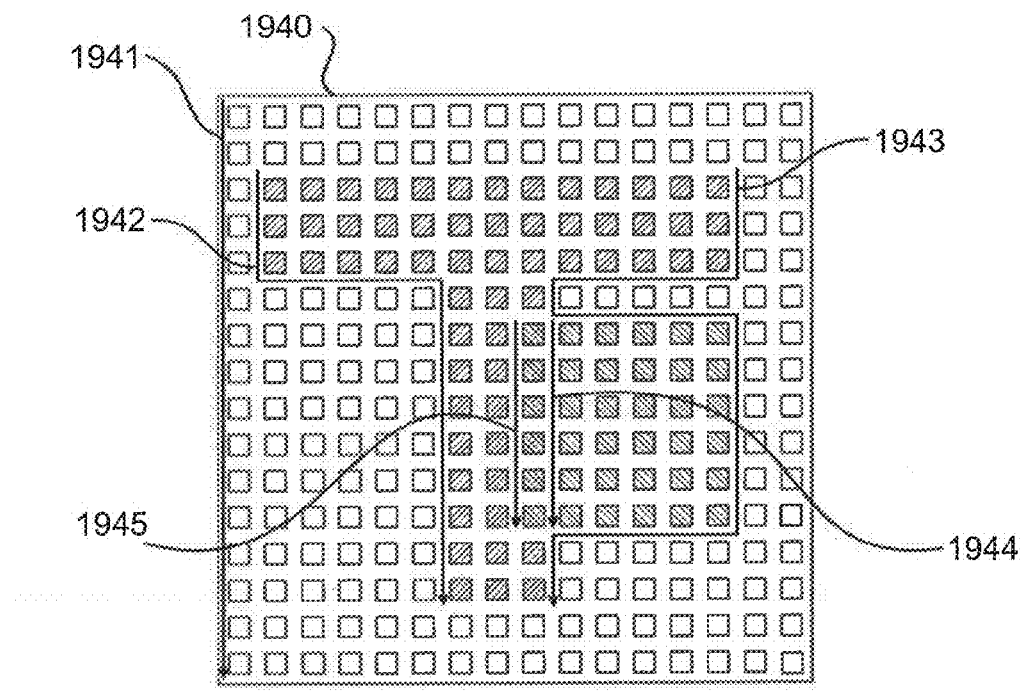

FIG. 19C shows a fillmap representation 1940 of the z-band display list 1900 represented in FIG. 19A. The fillmap representation 1940 is composed of five pixel-aligned fillmap edges, hereafter known simply as edges or fillmap edges. Each edge references a compositing stack which is used to determine the colour of each of the pixels activated by that edge. On any given scan line on which an edge is active, the edge activates those pixels that are immediately to the right of the edge, until the next edge or a page boundary is encountered. The first edge 1941 traces the left hand boundary of the page, and does not reference a compositing stack, since this edge defines a background region. The second edge 1942 traces the left hand boundary of the first graphic object 1901, and references a compositing stack 1951 that references a single level appearance, which is opaque and is to be filled using a right-leaning hatched fill. The third edge 1943 does not reference a compositing stack, since this edge also defines a background region. The fourth edge 1944 traces the left hand boundary of the region where the second graphic object 1902 is active. The fourth edge 1944 references a compositing stack 1953 which contains one level. The level references the level appearance 1932 corresponding to the second object 1902, which references a left-leaning hatched fill. The fifth edge 1945 traces the left hand boundary of the region where the second graphic object 1902 overlaps the first graphic object 1901. The fifth edge 1945 references a compositing stack 1952 which contains two levels. The top most level references the level appearance 1932 for the second object 1902, which references a left-leaning hatched fill. The bottom most level references the level appearance 1931 for the first object 1901, which references a right-leaning hatched fill.

Figure 19D:
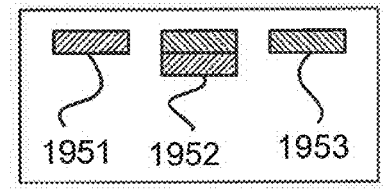
Figure 19D:
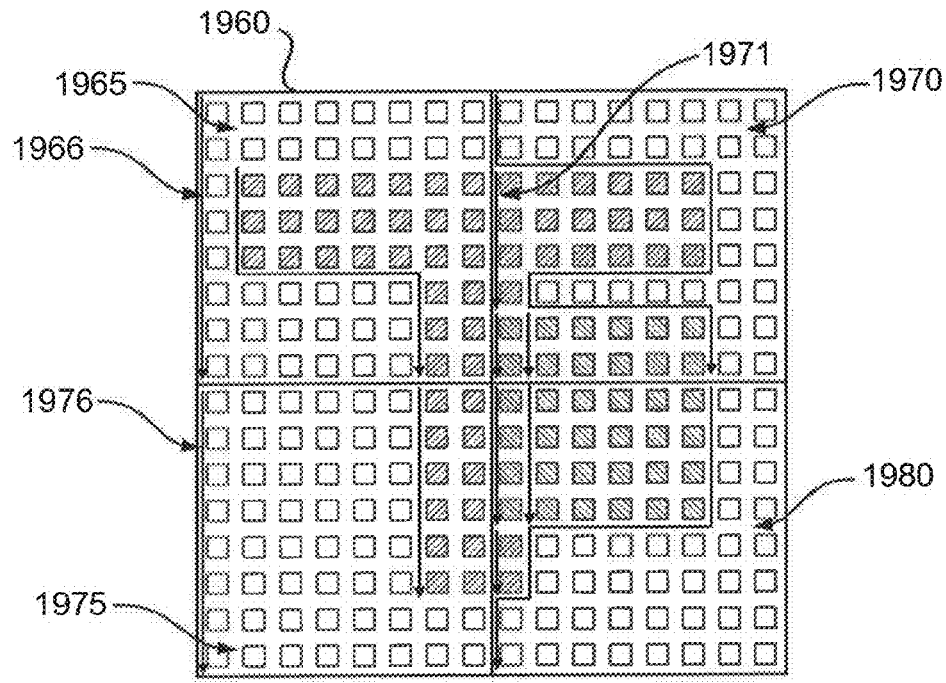

FIG. 19D shows a tiled fillmap representation 1960 of the display list represented in FIG. 19A. The tiled fillmap contains four tiles 1965, 1970, 1975 and 1980. Each tile has a height and width of eight pixels. In order to generate the tiled fillmap representation 1960 of the page, the edges of the original fillmap representation 1940 have been split across fillmap tile boundaries. For example, the edge 1941 which traces the left hand boundary of the page in the unified fillmap representation 1940 shown in FIG. 19C has been divided into two edges 1966 and 1976. The first edge 1966 activates pixels in the top-left hand tile 1965, while the second edge 1976 activates pixels in the bottom-left hand tile 1975. Also, new edges have been inserted on the tile boundaries to activate the left most pixels of each tile which were previously activated by an edge in a tile to the left of the tile in which the pixels reside. For example, in the top-right tile 1970 a new edge 1971 has been inserted to activate pixels which were activated by the edge 1942 which traces the left hand boundary of the first graphic object 1901 in the original fillmap representation 1940 shown in FIG. 19C.

Figure 20:
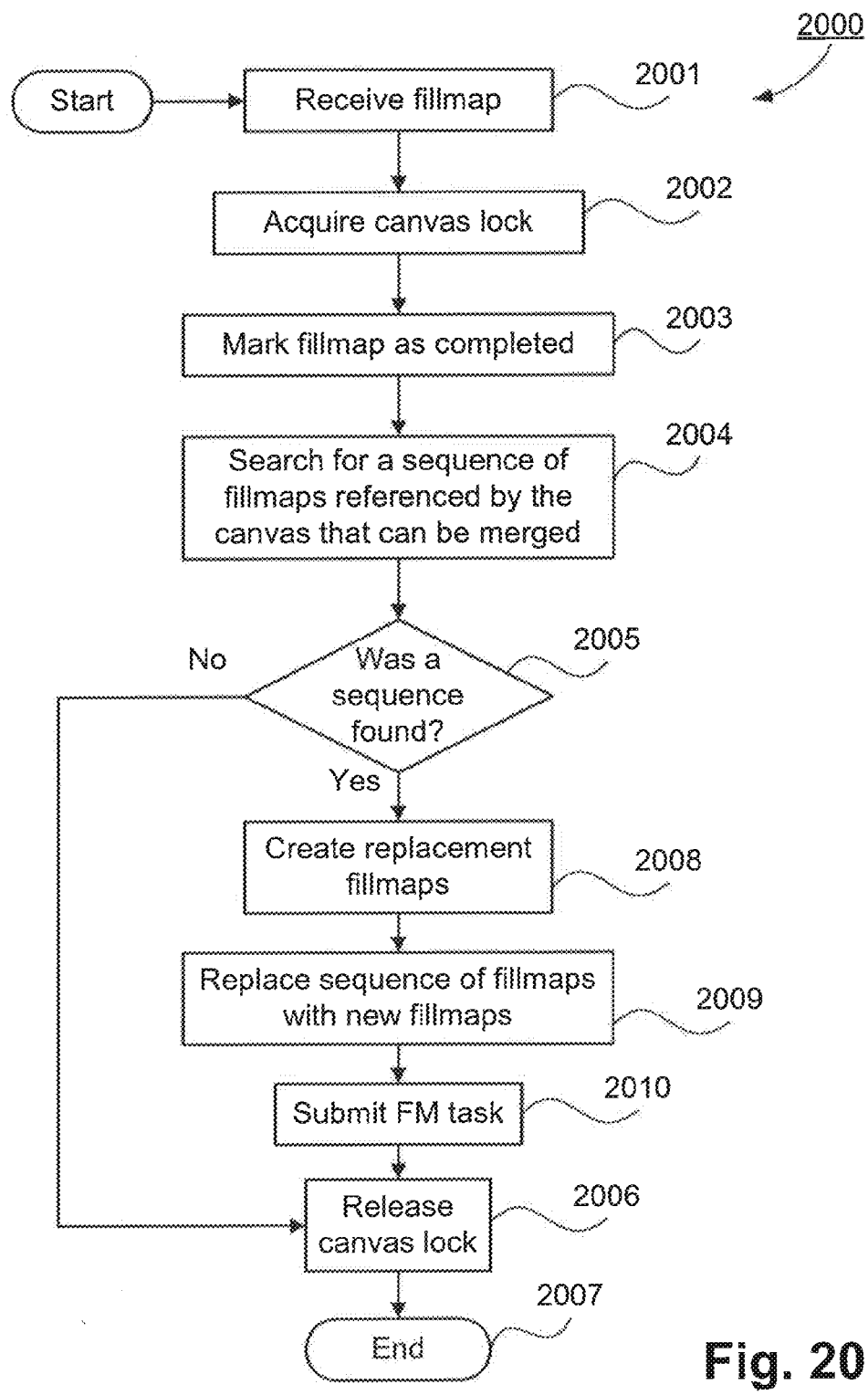
FIG. 20 is a schematic flow diagram illustrating a method used when a fillmap generation or fillmap merge task is complete.

FIG. 20: Fillmap Submission

With reference to FIG. 20, the fillmap submission process 2000 is explained in more detail. The process 2000 commences at step 2001. In step 2001, a completed fillmap is received. Since this process 2000 may be executed asynchronously by many FG or FM tasks, the following steps require a lock 960 on the canvas 900 to ensure mutual exclusion between threads. Once the lock 960 has been acquired in step 2002, the fillmap is marked as completed in step 2003 by setting the IsCompletedFlag 1040 to TRUE. In step 2004, the canvas 900 is searched for a sequence of fillmaps referenced by the canvas that can be merged. As previously explained, the sequence in which fillmaps are to be merged is defined by a pre-order traversal of the fillmap tree, starting with the root fillmap referenced by the canvas, and then visiting the high priority child fillmap prior to the low priority child fillmap. As an optimisation, sequences that involve the fillmap that was just marked 2003 as completed need be checked, since the fillmap submission process 2000 is executed every time a fillmap is completed (i.e. at the end of all FG and FM tasks). In the preferred embodiment, a sequence of eight consecutive completed fillmaps is selected for merging. Additionally, if all remaining fillmaps are completed (i.e. the page has been completed), then all remaining fillmaps are selected for merging. In decision step 2005, a check is made to determine whether or not a sequence of mergeable fillmaps has been found. If no sequence of mergeable fillmaps is found (No), processing continues at step 2006, in which the canvas can be unlocked. The process ends at step 2007. If a mergeable sequence of fillmaps is found (Yes) at step 2005, processing continues at step 2008 in which new empty replacement fillmaps are created. Note that the merged edge data is only stored in the first replacement fillmap; the remaining fillmaps are placeholder fillmaps. The placeholder fillmaps are created solely for the purpose of maintaining the tree structure. Any placeholder fillmaps with no children, or whose children are all placeholder fillmaps, do not need to be created. In step 2009, the new replacement fillmaps that were created in the step 2008 are then inserted into the fillmap tree to replace the fillmaps contained in the sequence of mergeable fillmaps. In step 2010, a new FM task is submitted, to merge the sequence of mergeable fillmaps identified in step 2004 into the first replacement fillmap created in the prior step 2008. The FM task asynchronously executes the process 2100 that is described with reference to FIG. 21. In step 2006, the canvas lock 960 can be released. The process 2000 ends at step 2007.

Figure 21:
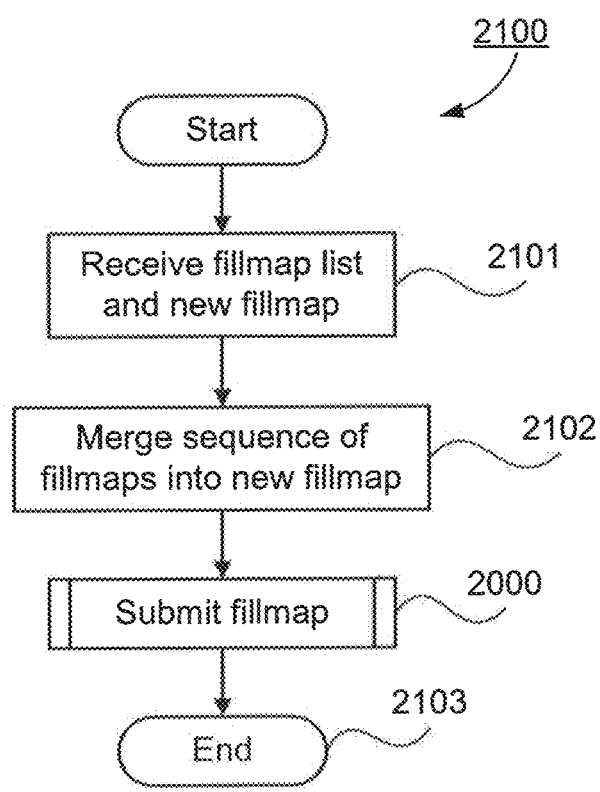
FIG. 21 is a schematic flow diagram illustrating a method of merging a z-ordered sequence of fillmaps into a single fillmap.

FIG. 21: FM Task Process

The process 2100 that is executed by a FM task is explained in more detail with reference to FIG. 21. The process 2100 starts at step 2101. In step 2101, a fillmap list and a new fillmap are received. That is, a sequence of mergeable fillmaps stored in a list and an empty result fillmap are received in step 2101. In step 2102, the sequence of mergeable fillmaps are then merged into a new fillmap, with the new edge data being stored in the resulting fillmap 1809. The process of merging fillmaps is explained using the example depicted in FIGS. 22A and 22B. In step 2000, the resulting merged fillmap is submitted, since the resulting fillmap may give rise to another sequence of mergeable fillmaps that can be merged in combination with other fillmaps that were submitted while this process 2100 was executing. The process 2100 then ends at step 2103.

FIG. 22: FM Example

Figure 22A:
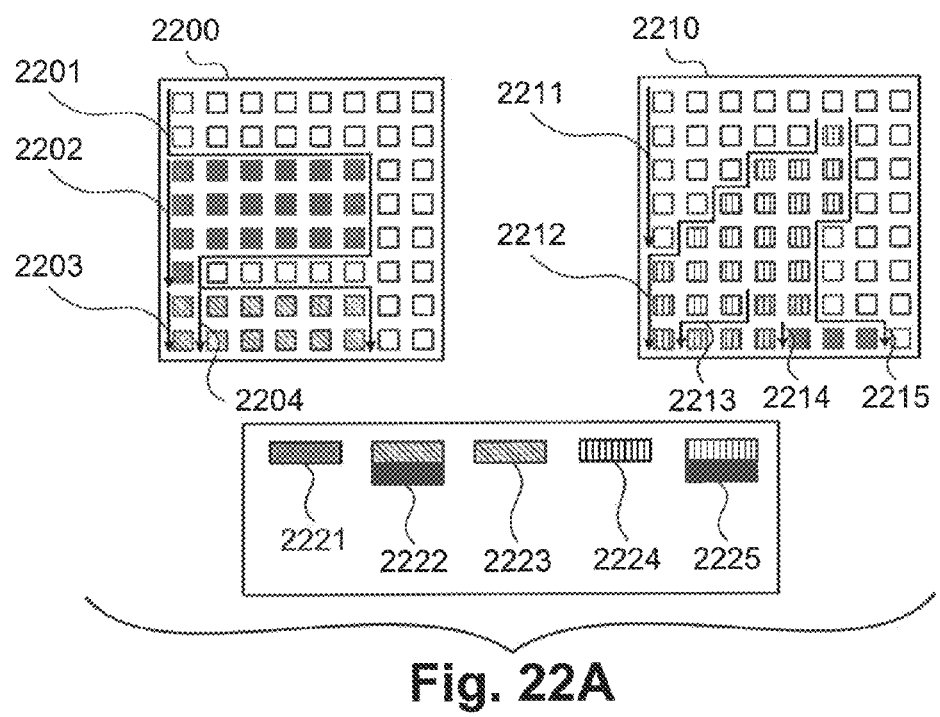
FIGS. 22A+22B are block diagrams used in an example of fillmap merging, in which the fillmaps of FIG. 7B are combined into a single fillmap.

An example of fillmap merging, as executed by an FM task, is described with reference to FIGS. 22A and 22B. Consider the two z-band display lists 720 and 730 as described previously with reference to FIG. 7. The upper-right fillmap tiles 2200 and 2210 of z-band display lists 720 and 730, respectively, are shown in FIG. 22A. These fillmap tiles are produced by the fillmap generation process described hereinbefore with reference to FIG. 19. As fillmap tiles 2200 and 2210 are part of different z-band fillmaps 720 and 730, respectively, the fillmap tiles 2200 and 2210 are generated by different FG tasks.

For fillmap tile 2200 of z-band display list 720, fillmap edge 2201 defines a background region, and so does not reference a compositing stack. Fillmap edge 2202 activates compositing stack 2221, which consists of an opaque grey fill. Fillmap edge 2203 activates compositing stack 2222, which comprises of a transparent diagonally hatched fill and an opaque grey fill. Fillmap edge 2204 activates compositing stack 2223, which comprises a transparent diagonally hatched fill. Similarly for fillmap tile 2210 of z-band display list 730, fillmap edge 2211 defines a background region and therefore does not reference a compositing stack. Fillmap edge 2212 activates compositing stack 2224, which comprises a transparent vertically hatched fill. Fillmap edge 2213 activates compositing stack 2225, which comprises a transparent vertically hatched fill and an opaque grey fill. Fillmap edge 2214 activates compositing stack 2221, which comprises an opaque grey fill. Fillmap edge 2215 also defines background region, and so does not reference a compositing stack. Note that, while the fillmap edges of z-bands 720 and 730 are entirely separate, z-bands 720 and 730 share some compositing stacks. For example, compositing stack 2221 is referenced by fillmap edges in both fillmap tile 2200 and fillmap tile 2210.

Once the fillmaps for z-band display lists 720 and 730 have been generated (by two FG tasks), the fillmaps are merged by a FM task to produce a final fillmap for the page 700. The process of merging two or more z-band fillmaps is similar to the process of fillmap generation. That is, the edges activating spans of identical compositing stacks on consecutive scan lines are joined such that fillmap edges in the resulting fillmap activate regions of identical compositing stacks. The fillmap edges of the z-band fillmaps being merged either remain the same in the final fillmap, are split, joined, extended or deleted according the regions in the merged fillmap. In addition, new edges may be created in the final fillmap that did not exist in any of the z-band fillmaps being merged. In the preferred implementation, z-band fillmaps are merged tile-by-tile.

Figure 22B:
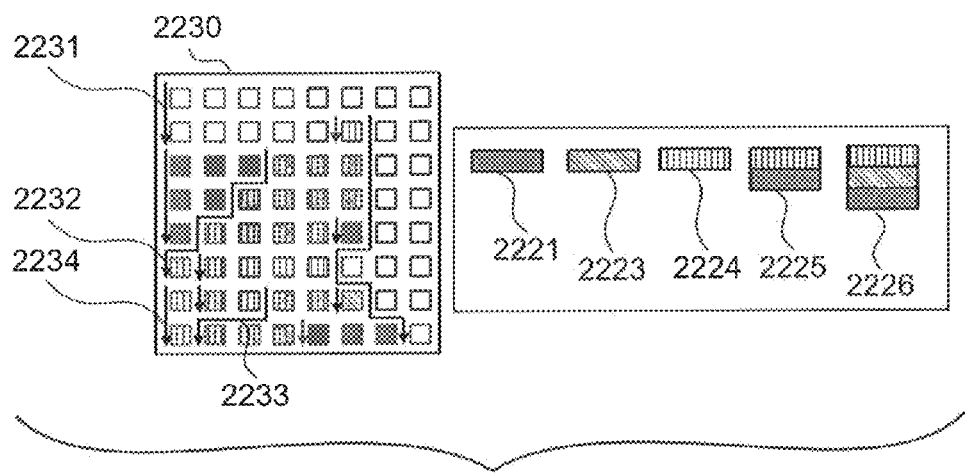

The result of merging the fillmap tiles 2200 and 2210 is fillmap tile 2230, shown in FIG. 22B. Because fillmap tile 2210 represents graphic objects 712 and 713 with the largest z-order, fillmap edges from tile 2210 are treated as having a larger z-order than fillmap edges from fillmap tile 2200 during the fillmap merge process. Fillmap edge 2231 defines a background region, and therefore does not reference a compositing stack. Fillmap edges 2232 and 2233 activate compositing stack 2225, which comprises a transparent vertically hatched fill and an opaque grey fill. Fillmap edge 2234 activates new compositing stack 2226, which comprises a transparent vertically hatched fill, a transparent diagonally hatched fill and an opaque grey fill. Note that compositing stack 2222 of FIG. 22A that was referenced by fillmap edge 2203 in z-band fillmap tile 2200 is not referenced by any fillmap edge in the merged fillmap 2230. The pixels in this region are to be rendered using the new compositing stack 2226, which contains the vertically hatched fill that did not appear in z-band 720. Other fillmap edges in the merged fillmap tile 2230 reference compositing stacks in a similar way.

The final fillmap produced by an FM task represents all graphic objects on the page 700. This fillmap is equivalent to a fillmap produced by a single FG task for all graphic objects on the page (that is, if z-banding has not been done).

Embodiment 2

In an alternative embodiment, the "push" and "pop" graphics state commands in a PDL are considered as another means of processing graphic commands in parallel. When a "push" graphics state command is encountered, a sequence of graphic commands can be identified that can be processed in parallel. The sequence of graphic commands up to the corresponding "pop" graphics state command can be processed in parallel with the graphic commands that appear after the "pop" graphics state command. This is because the graphics state after the "pop" graphics state command is identical to the graphics state when the "push" graphics state command is invoked. That is, the graphics state after the "pop" graphics state command is invariant under the sequence of graphic commands between the "push" and "pop" graphics state commands, so that the sequence of graphic commands between the "push" and "pop" graphics state commands is isolated from other graphic commands in the page description.

In this embodiment, the step of updating the graphics state 1306 as shown in FIG. 13 is replaced with an alternative process 2300 to update the graphics state. The alternative process 2300 is shown in FIG. 23 and is will now be described in detail, hereinafter.

Figure 23:
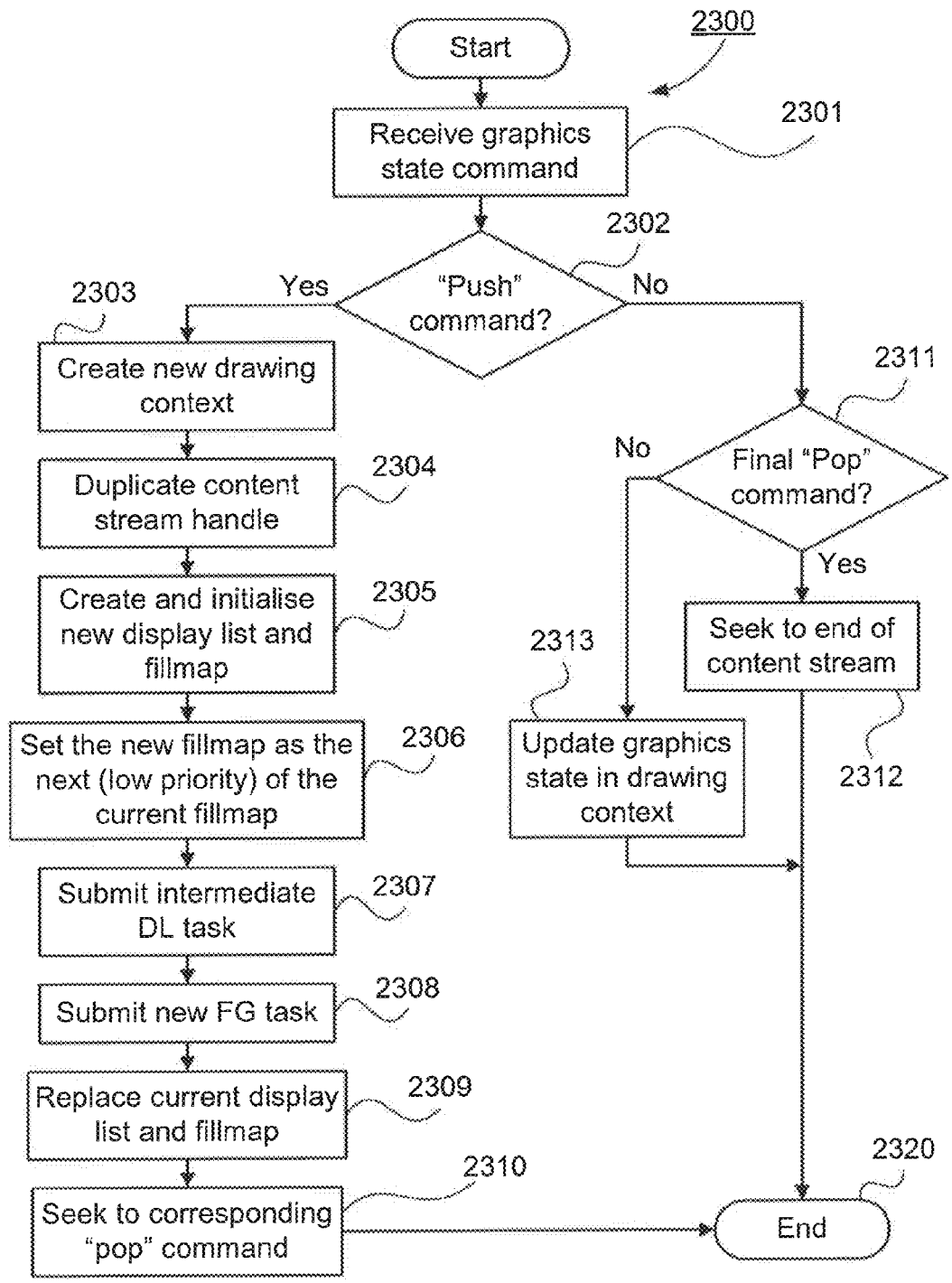
FIG. 23 is a schematic flow diagram illustrating a method of processing graphics state commands that enables parallel processing of page content.

FIG. 23: Update Graphics State Command Processing

The process 2300 starts at step 2301. In step 2301, the graphics state command is received. In decision step 2302, the graphics state command is checked to determine if the command is a "push" command. If the graphics state command is a "push" graphics state command (Yes), then a new intermediate drawing context 800 is created in step 2303. This process is essentially the same as the process 1600 of creating a group drawing context, except that step 1603 is omitted. Then, the file handle for the content stream is duplicated 2304. This step 2304 is necessary because the graphic commands prior to the "pop" graphics state command are processed in parallel with the graphic commands after the "pop" graphics state command, both of which appear in the same content stream. In step 2305, a new post-pop display list and post-pop fillmap are created and initialised. The post-pop display list and post-pop fillmap are used to receive the graphical objects that occur after the "pop" graphics state command. In step 2306, the new post-pop fillmap is set 2306 as the next (low priority pointer) 1020 of the fillmap 830 in the current drawing context 800.

In step 2307, an intermediate DL task is submitted. An intermediate DL task 2307 is used to process the graphic commands prior to the "pop" graphics state command. This task is provided with the duplicated content stream handle created in the step 2304 and the intermediate drawing context created in step 2303. The intermediate DL task 2307 executes a process 2400 that is described hereinafter with reference to FIG. 24. Additionally, in step 2308, an FG task is submitted for the display list 840 and fillmap 830 referenced by the current drawing context 800. In step 2309, the current display list and fillmap are replaced. The current drawing context 800 is updated to refer to the post-pop display list and post-pop fillmap created in step 2305. The current drawing context 800 can now be used to process the graphical commands that occur after the "pop" graphics state command. In step 2310, the corresponding "pop" graphics state command is sought. Note that "push" and "pop" graphics state commands may be nested, so importantly the correct "pop" graphics state command must be found. While seeking to the corresponding "pop" graphics state command, other graphic commands, including graphics state commands, can be skipped. The process of seeking to the corresponding "pop" graphics state command should be faster than if all the graphic commands are processed normally. "Seeking" involves reading commands until the final "pop" command is found. The file pointer is positioned after the "pop", ready to read the next command. The process 2300 ends at step 2320, and the processing of graphic objects after the "pop" graphics state command continues in process 1300.

If the graphics state command is not a "push" graphics state command (No) as determined in step 2302, the graphics state command is checked in decision step 2311 to determine if the graphics state command is a final "pop" graphics state command. Generally, "push" and "pop" graphics state commands are balanced, so that a "pop" graphics state command never removes the last graphics state in the graphics state stack. However, when the intermediate DL task submitted in step 2307 reaches the "pop" graphics state command that corresponds to the "push" graphics state command for which the intermediate DL task has been created, the final graphics state is removed from the graphics state stack. This is how the final "pop" graphics state command can be determined in step 2311. If the graphics state command is a final "pop" graphics state command (Yes) at step 2311, processing continues at step 2312 to seek to the end of the content stream. This causes the process 1300 being executed by the intermediate DL task to terminate at decision 1302 as desired. Processing then ends at step 2320.

If the graphics state command is not a final "pop" 2311 graphics state command (No) at step 2311, processing continues at step 2313, where the graphics state is updated 2313 according to the PDL specification. This is the same as the process 1306 illustrated in FIG. 13. The process 2300 then ends at step 2320.

Figure 24:
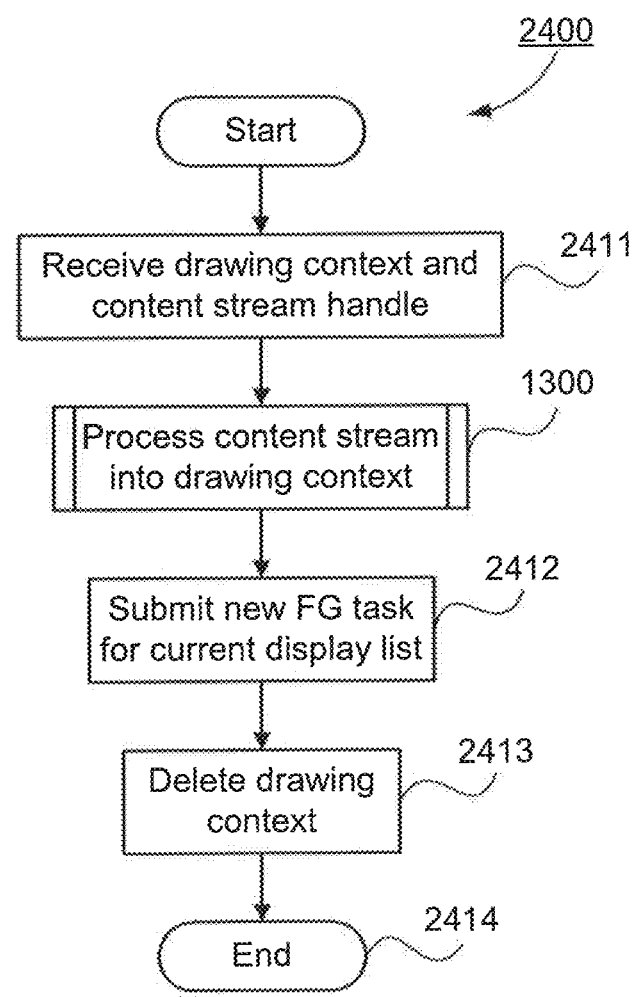
FIG. 24 is a schematic flow diagram illustrating the method executed by the intermediate display list task of FIG. 23.

FIG. 24: Intermediate (Push/Pop) DL Task Process

The process 2400 executed by the intermediate DL task submitted in step 2307 is explained in more detail with reference to FIG. 24.

The process 2400 commences at step 2411. In step 2411, the process receives a drawing context 800 and a content stream handle. In the context of FIG. 23, this was the intermediate drawing context created at step 2303 and the duplicate content stream handle created in step 2304.

In step 1300, the content stream is processed 1300 into the intermediate drawing context as shown in FIG. 13, but using the alternative process 2300 when receiving a graphics state command. This ensures that this process 2400 ends when the correct "pop" graphics state command is reached, as explained hereinbefore with reference to FIG. 23.

In step 2412, a new FG task is submitted for the current display list that is referenced 840 by the intermediate drawing context 800 received in step 2401.

In step 2413, the intermediate drawing context 800 that was created for this intermediate DL task is deleted. The process 2400 then ends in step 2414.

Example(s)/User Case(s)

An example page is now considered, the processing of this page is described, and the execution time is compared to the prior art, in order to demonstrate the advantage of the embodiments of the invention.

Figure 25:
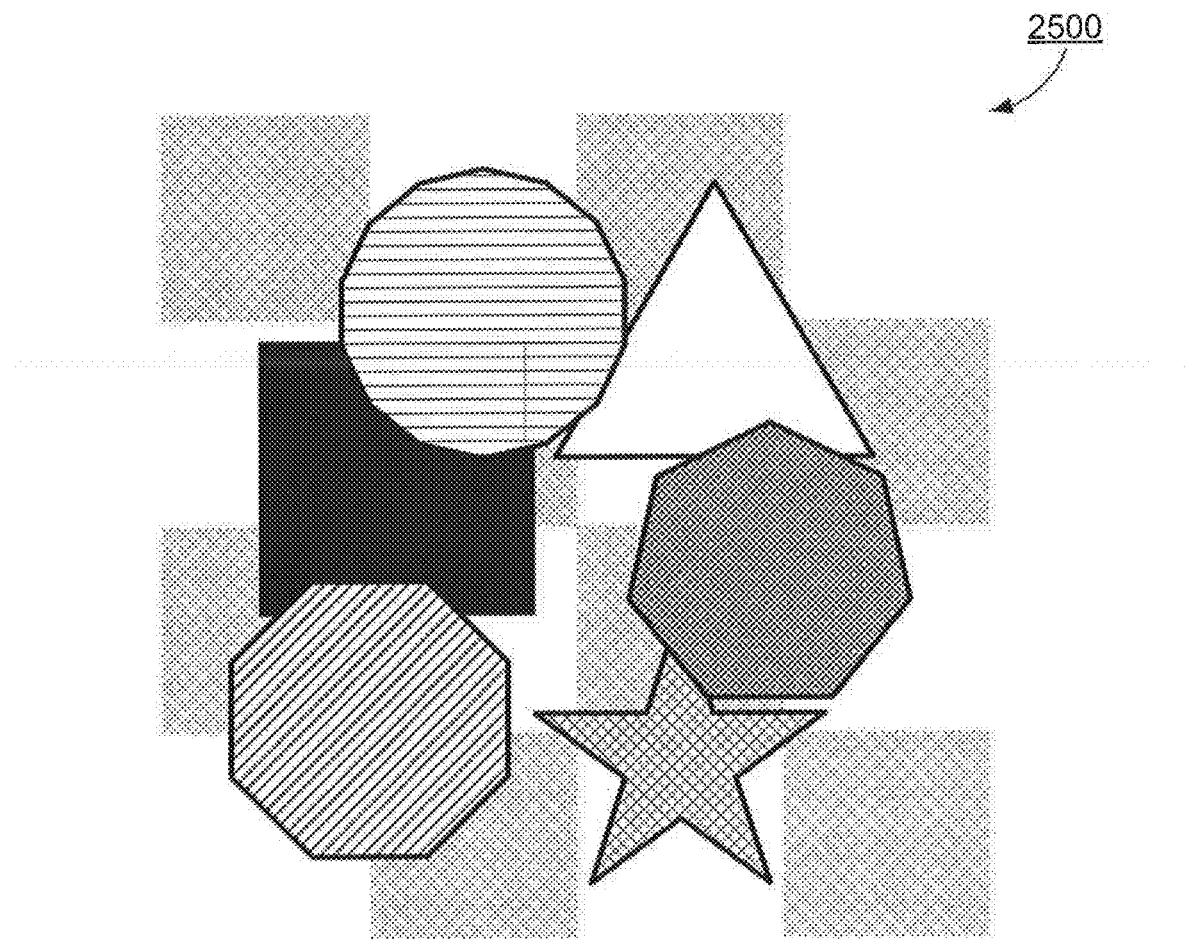
FIG. 25 is a diagram of an example page comprising several objects.
Figure 26:
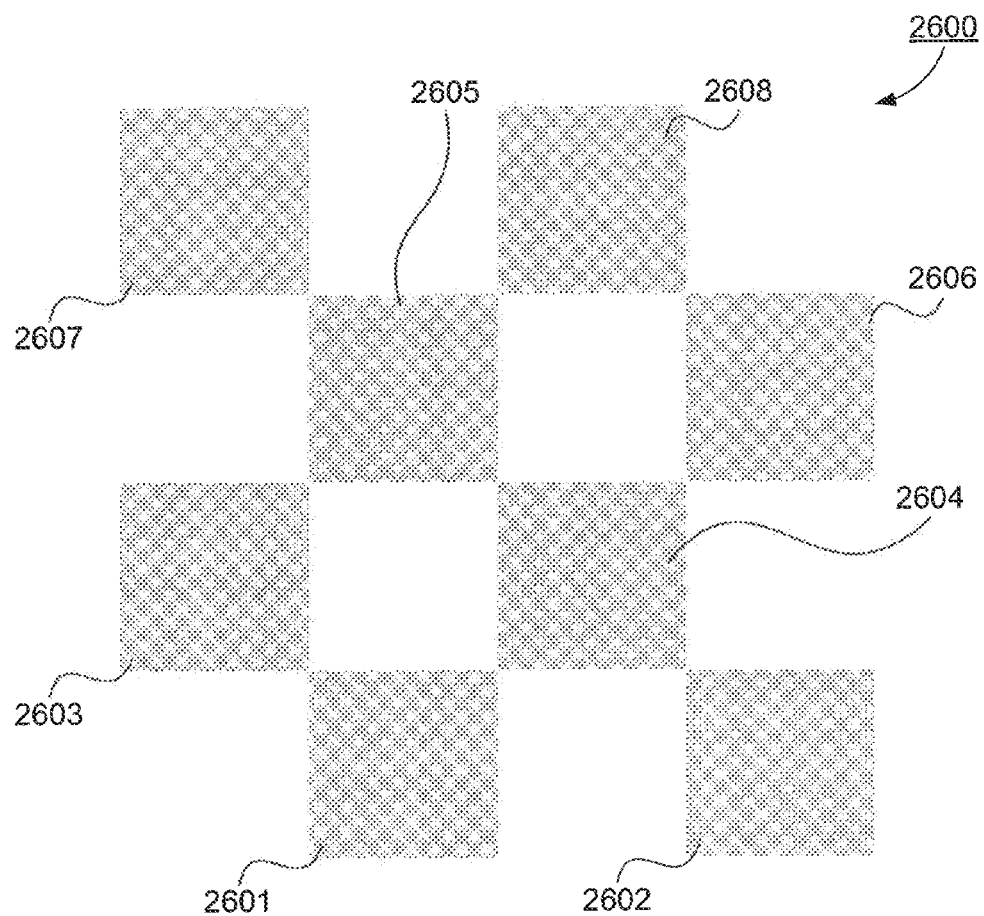
FIG. 26 is a diagram of a group of objects that appear on the page of FIG. 25.
Figure 27:
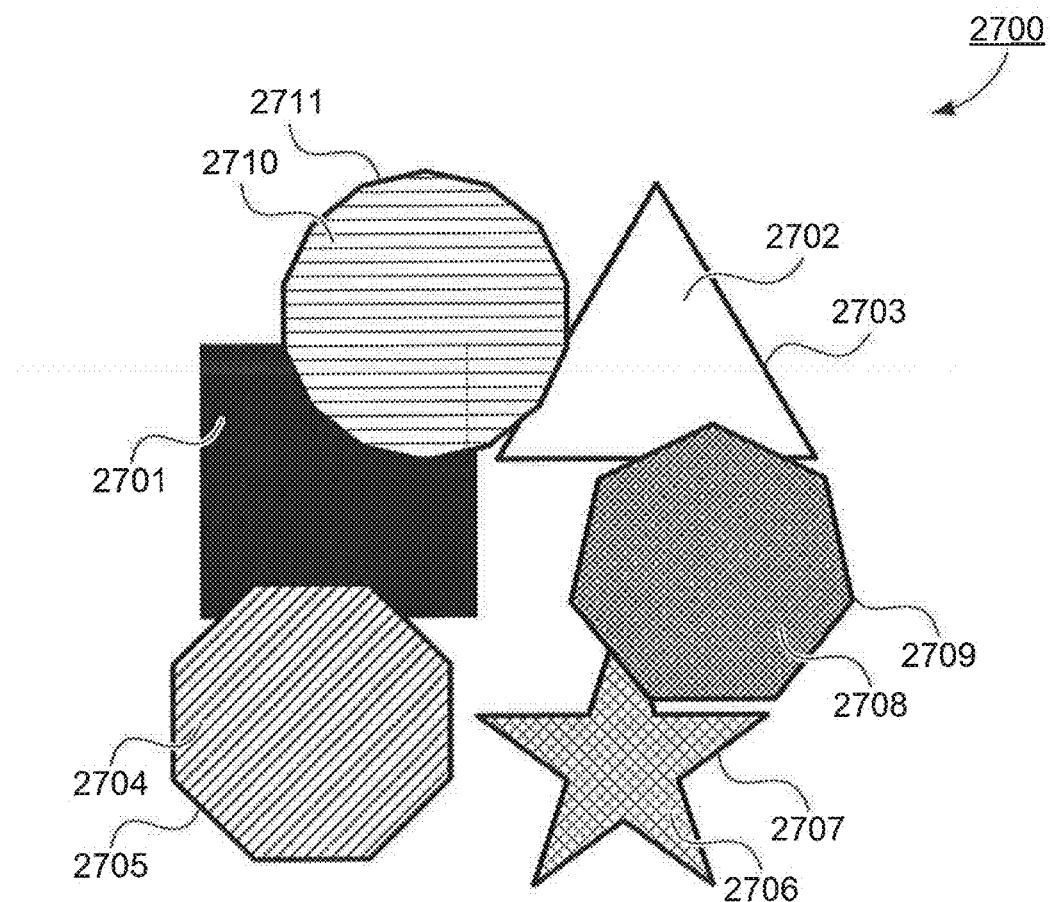
FIG. 27 is a diagram of objects that appear on the page of FIG. 25.

FIG. 25-27: Example Page

An example of a PDF page 2500 is shown in FIG. 25. The page contains a checkerboard, which is contained within a group, and six various coloured shapes in the foreground. The group containing the checkerboard 2600 is shown in more detail in FIG. 26. The checkerboard group 2600 comprises of eight squares 2601-2608 that are coloured 10% black. FIG. 27 shows in detail the shapes 2700 that appear on top of the checkerboard group 2600. The first shape is a square 2701. The next shape is a triangle 2702 with an outline 2703. Note that the triangle 2702 and the outline 2703 are two separate graphical objects. An octagon 2704 is depicted using a diagonal line pattern, an outline [2705], which partially overlaps the square 2701. A star 2706, depicted with a cross hatch and an outline 2707, is positioned next to the octagon 2704. A heptagon 2708, depicted with a dark shading and an outline 2709, partially covers both the triangle 2702 and the star 2706. A tetradecagon 2710, depicted with light horizontal lines and an outline 2711, partially covers both the square 2701 and the triangle 2702.

FIG. 28: PDF File

Figure 28B:
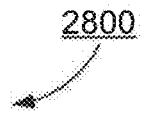
FIGS. 28A+28B is a representation of the example page of FIG. 25 in PDF format.

FIGS. 28A and 28B show the page description 2800 of the example page 2500 in PDF format. Path data has been replaced by "<path data>" for brevity. In the page description 2800, the first two objects, (1, 0) (lines 3-7) and (2, 0) (lines 9-14), are the document catalogue and pages array respectively. The pages array specified by the /Kids key indicates the document contains a single page (line 12), the single page being represented by object (3, 0) (lines 16-25). The single page is A4 in size (line 22), and the page content is found in object (4, 0) (line 23). Also, the page references a single group (line 20), which is named "XO1", of which the content can be found in object (5, 0) (lines 48-65).

FIGS. 29-[33A]: Processing PDF File

Figure 29A:
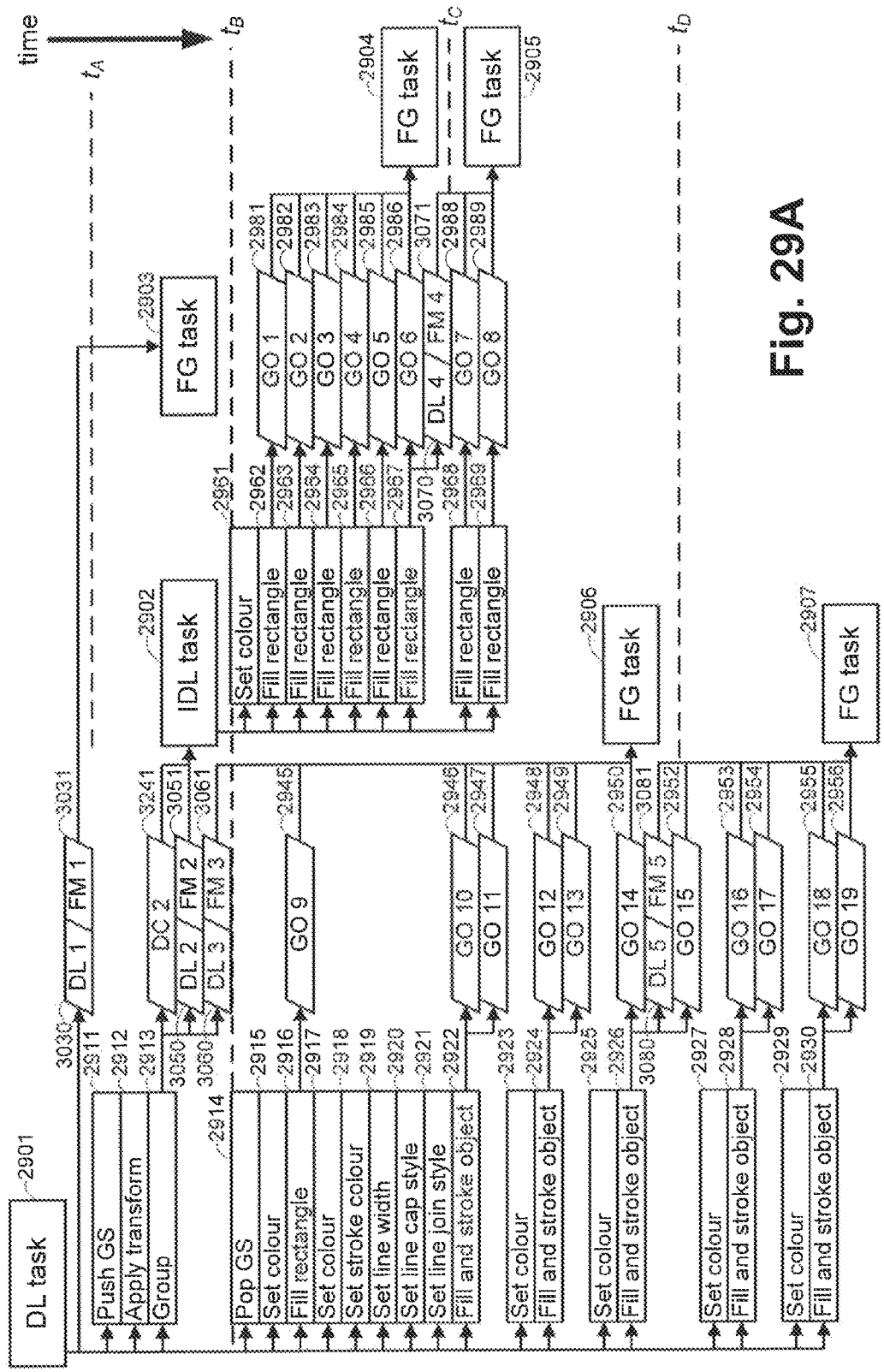
FIGS. 29A+29B are schematic diagrams showing the sequence of operations performed during the processing of the page description of FIGS. 28A-28B.
Figure 29B:
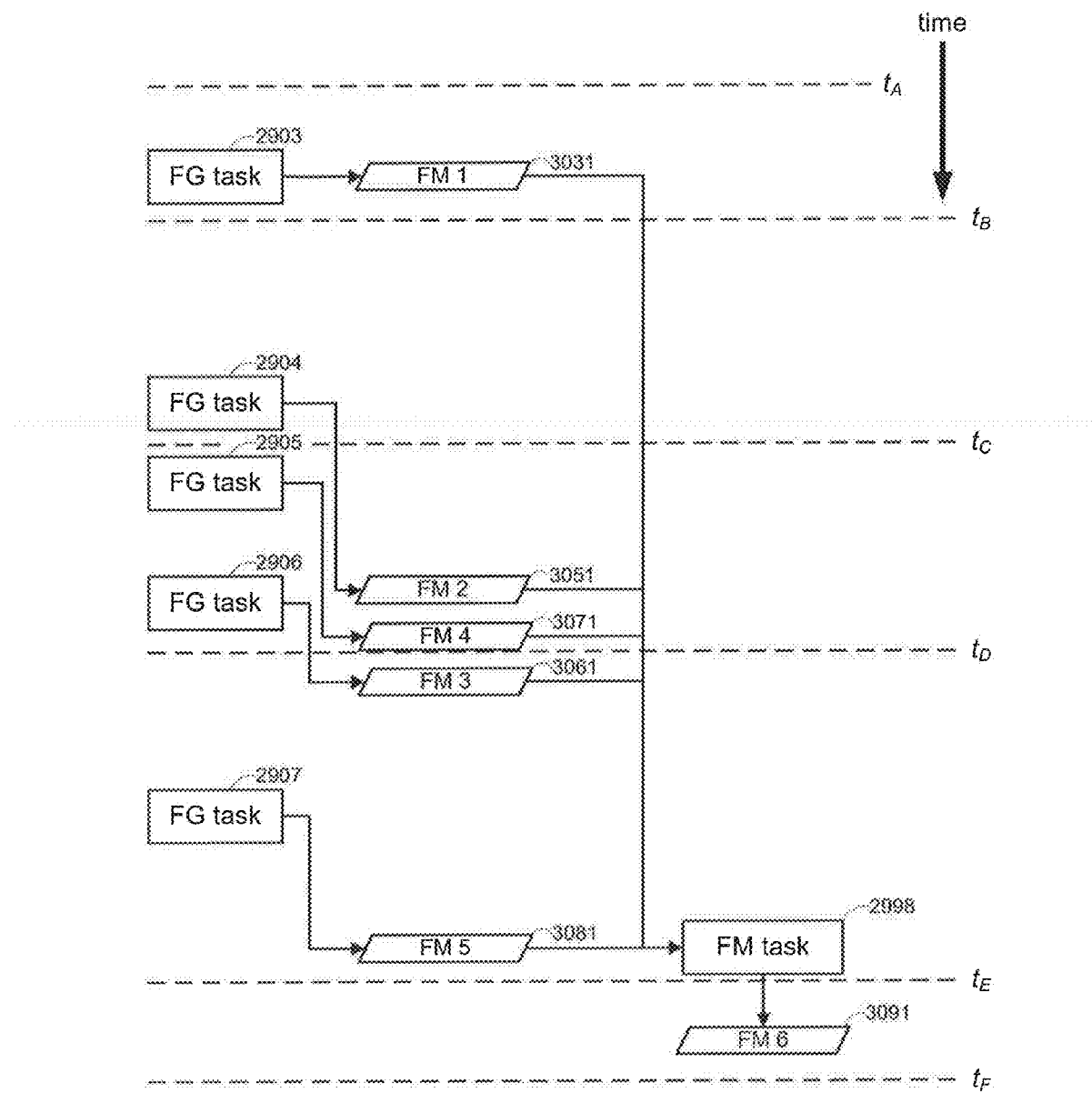

The processing of the page description 2800 according to the embodiments of the invention is described with reference to FIGS. 28B, 29A, 29B, 30A-30F, and 31A. In FIGS. 29A and 29B, the sequence of execution is shown moving down the page. Note that at various times throughout the execution as illustrated in FIGS. 29A and 29B, six times are marked $t_A$ through to $t_F$ using dashed horizontal lines. At each of these times, the state of various data structures is shown in FIGS. 30A-30F respectively. In FIG. 31A, the sequencing of tasks is depicted based on execution on a 4-core processor. The six times $t_A$ to $t_F$ are also shown in FIG. 31A. The processes that execute during six stages, which correspond to the time intervals [0, $t_A$], ($t_A$, $t_B$], ($t_B$, $t_C$], ($t_C$, $t_D$], ($t_D$, $t_E$], and ($t_E$, $t_F$], are described hereinafter.

Stage [0, $t_A$]

The steps leading up to time $t_A$ are described hereinafter.

Firstly, a DL task 2901 in FIG. 29A, such as the DL task 601 previously described with reference to FIG. 6, is started. The DL task 2901 begins to process the page description 2800 according to the method 1100 described with reference to FIG. 11. In step 1101, the content stream for the page (FIG. 29B, line 28) is opened. A new drawing context 3011 (shown in FIG. 30A) is created according to the process 1200 described with reference to FIG. 12. In step 1201, the memory is allocated for the drawing context 3011. In step 1202, the graphics state stack 3012 is initialised with a default graphics state. Next, in step 1203, an empty display list 3030 and empty fillmap 3031 are created and referenced from the drawing context (3015 and 3014 respectively). In step 1204, a new canvas 3021 is created, which references a fill store 3022, a level appearance store 3023, and a compositing stack store 3024. The root fillmap pointer 3025 is initialised to the fillmap 3031 that was created in step 1203. A lock 3026 is initialised, which is used to control access to the fillmap tree 3025. Note that the parent fillmap 3032, next fillmap (low priority) 3033, and next fillmap (high priority) 3034 are all initialised to NULL because there is only a single fillmap in the tree, and the fillmap's IsCompleteFlag 3035 is initialised to FALSE. In step 1206, the object counter 3016 in the drawing context 3011 is set to zero. This ends process 1200.

Figure 30A:
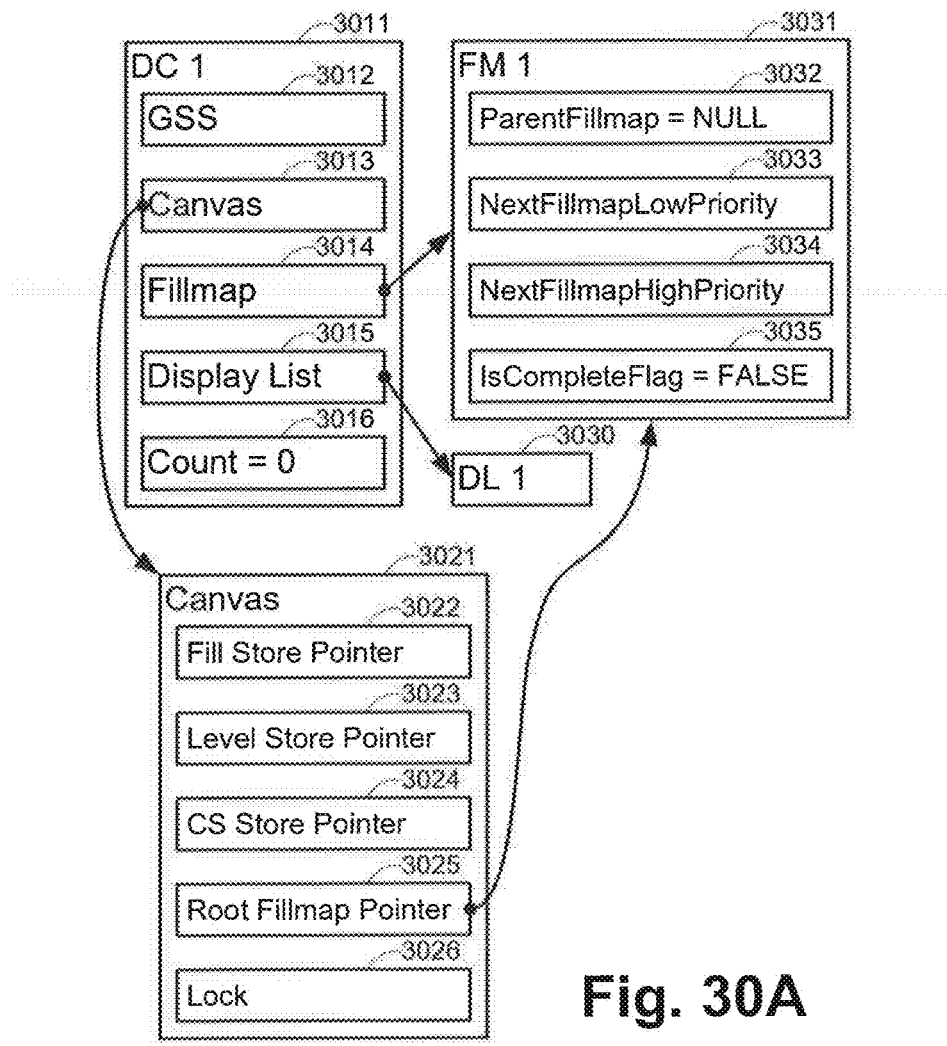
FIG. 30A-30F are schematic diagrams showing the values of various variables at six different times throughout the execution shown in FIGS. 29A-29B.
Figure 31A:
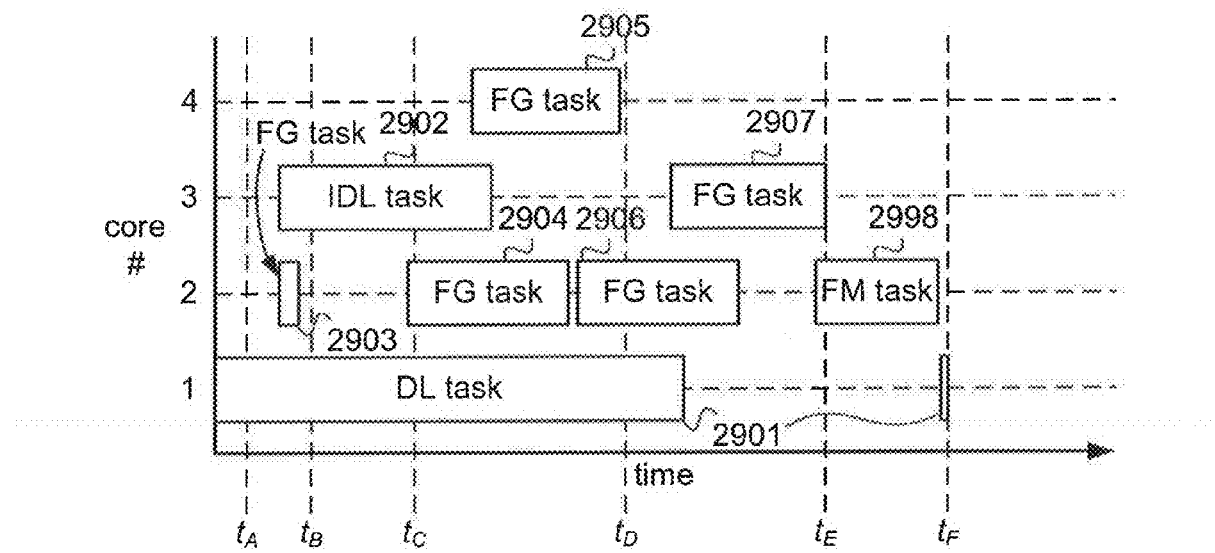
FIG. 31A is a timing diagram showing a graph of the tasks executed in FIG. 29A-29B and on which core the task executes.

Processing has been described up to time $t_A$ and the state of various data structures at this point in time is shown in FIG. 30A. As depicted in FIG. 31A, the only task that is currently executing at time $t_A$ is the DL task 2901, which has just finished processing step 1200 of process 1100.

Stage ($t_A$, $t_B$]

The processing that occurs between $t_A$ and $t_B$ is described hereinafter.

After the DL task 2901 has executed step 1200, the next step in FIG. 11 is step 1300 described hereinbefore with reference to FIG. 13. This step 1300 is described in more detail, referring to the example in FIGS. 28-31.

In step 1301 the content stream (FIG. 28B lines 27-46) and drawing context 3011 are received. As the process has not reached the end of the content stream 1302, a command is read 1304 from the content stream. In this case, the "q" command (line 29) is read, which in PDF describes a "push graphics state" operation. As this is a graphics state command in step 1305, the graphics state is updated in step 1306 by pushing a copy of the graphics state stack 3012, as indicated in FIG. 29A by the Push GS 2911 operation. The next command "cm" (line 30), is a transformation, which is applied to the top-most graphics state on the graphics state stack 3012, and is indicated in FIG. 29A by the Apply transform 2912 operation. The next command is to draw the group XO1 ("Do" command, line 31), which, according to the page resource dictionary (line 20), is object (5, 0) (lines 48-65). In FIG. 13, the group processing is shown in step 1400 which is explained in more detail referring to FIG. 14.

For the purpose of illustrating the embodiments of the invention, the group is assumed to be determined to be complex in steps 1401 and 1402. Therefore, in the next step 1600, a new drawing context 3041 (shown in FIG. 30B) is created for the group. The creation 1600 of the new drawing context 3041 is explained in more detail, with reference to FIG. 16. In step 1601, memory is allocated for the new drawing context structure 3041. In step 1602, the graphics state stack 3042 in the new drawing context 3041 is initialised with a copy of the top-most graphics state in the graphics state stack 3012 in the current drawing context 3011. In step 1603, the graphics state in the graphics state stack 3042 is updated for the new group. As an example, this would include applying the group transformation matrix shown in FIG. 28B on line 52. In step 1604, a new display list 3050 and fillmap 3051 are created and initialised, and referenced (3045 and 3044 respectively) from the new drawing context 3041. The next fillmap (low and high priority) pointers (3053 and 3054 respectively) are set to NULL (not shown), and the IsCompleteFlag 3055 is set to FALSE. In step 1605, the new fillmap 3051 is set as the next fillmap (high priority) 3034 of the fillmap 3031 in the current drawing context 3011. Conversely, the fillmap 3031 in the current drawing context 3031 is set as the parent fillmap 3052 of the newly created fillmap 3051. In the next step 1606, the canvas pointer 3013 in the current drawing context 3011 is copied into the canvas pointer 3043 of the new drawing context 3041. In step 1607, the object counter 3046 in the new drawing context 3041 is initialised to zero. This ends in step 1608 the process 1600 of creating a group drawing context. The description of the group processing 1400 shown in FIG. 14 follows.

In step 1412 after the creating process 1600, a new display list 3060 and fillmap 3061 for the new drawing context 3041 are created and initialised. The next fillmap pointers (3063 and 3064) are initialised to NULL (not shown), and the IsCompleteFlag 3065 is initialised to FALSE. In the next step 1413, the new fillmap 3061 is set as the next fillmap (low priority) 3033 of the fillmap 3031 in the current drawing context 3011, and conversely, the current fillmap 3031 is set as the parent fillmap 3062 of the new fillmap 3061. The next step 1414 is to submit a new intermediate DL task 2902, providing the new group drawing context 3041 and the group identifier ("XO1") as input. The intermediate DL task 2902 is explained hereinafter in more detail. In the next step 1415, a new FG task 2903 is submitted. The final step 1416, is to update the current drawing context 3011 to refer to the new display list 3060 and fillmap 3061 (pointers 3015 and 3014 respectively). This concludes the processing 1400 of the group command ("Do" on line 31), and the DL task 2901 has reached time $t_B$.

Meanwhile, the FG task 2903 that was submitted in step 1415 by the DL task 2901 executes quickly since the display list 2930 is empty (i.e. contains no objects). The FG task 2903 executes the process 1800 as shown in FIG. 18. This process is not described in full detail since many steps have no effect. The key steps that do have an effect are step 1803, which destroys the display list, and step 2003, which updates the IsCompleteFlag 3035 to TRUE. No fillmap merge tasks are spawned.

Figure 30B:
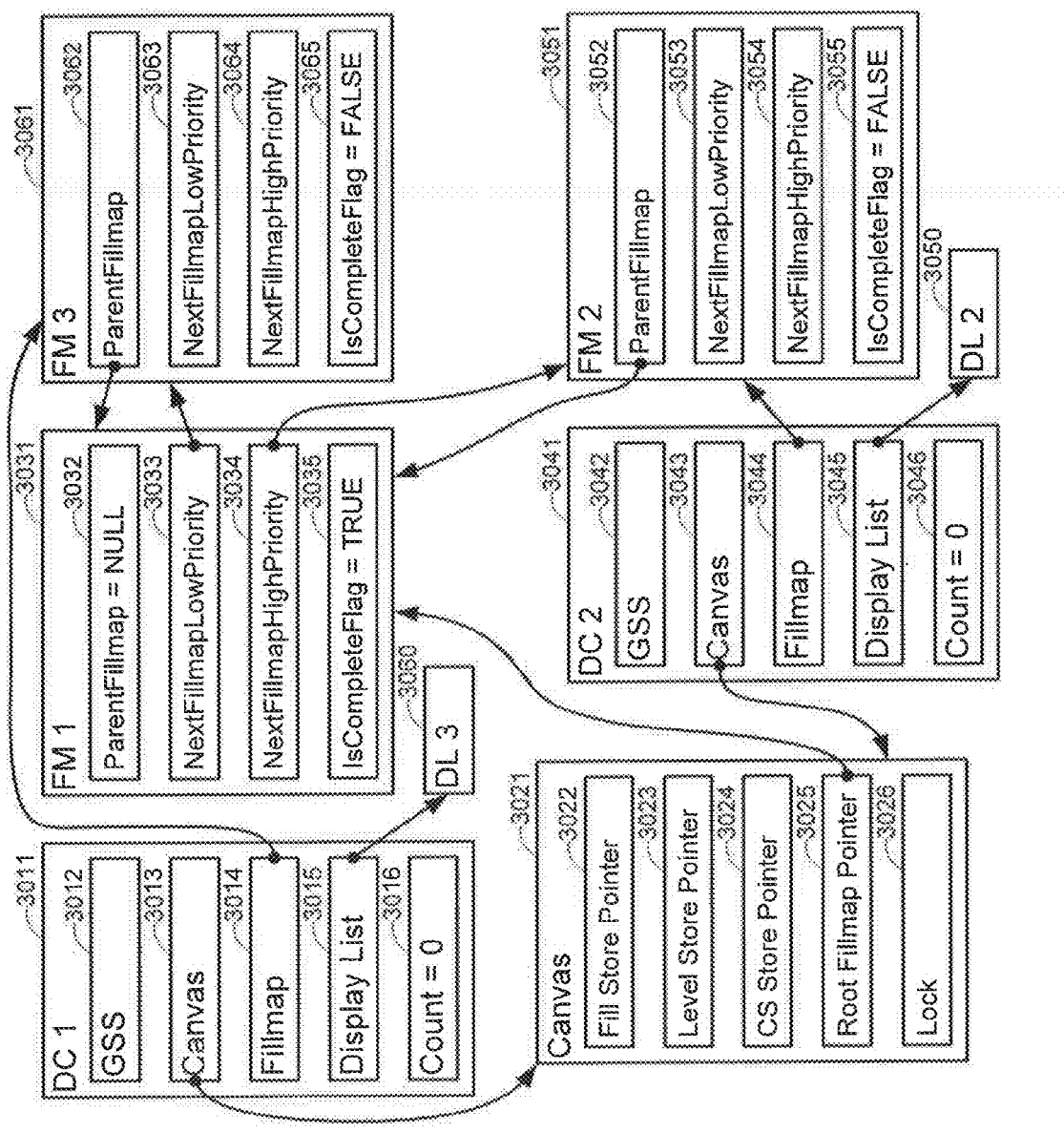

The description up to time $t_B$ is completed. The state of various structures is shown in FIG. 30B. As can be seen in FIG. 31A at time $t_B$, there are two tasks being executed simultaneously. The DL task 2901 has just completed the group processing for XO1, and continues processing graphic commands in the page content stream into a new display list 3060. Also, the intermediate DL task 2902 is about to begin executing process 1500, which processes the graphic commands related to the group into a group display list 3050.

Stage ($t_B$, $t_C$]

The processes that execute up to time $t_C$ are described hereinafter.

Consider the intermediate DL task 2902 which is executing the process 1500 as shown in FIG. 15. The step 1511 receives the group drawing context 3041 and the group identifier ("XO1"). The next step 1512 opens the content stream associated with the group (FIG. 28B, line 54). In step 1300, the content stream is processed using the group drawing context 3041. This is briefly described with reference to FIG. 13. The first command ("g", line 55) sets the current colour to 90% grey. This is illustrated in FIG. 29A as the Set colour command 2961. The next six commands ("f", lines 56-61) draw the first six squares of the checkerboard. These are shown in FIG. 29A as Fill rectangle commands 2962-2967, and produce graphical objects 1 to 6 2981-2986, which are stored in the display list 3050 referenced from the group drawing context 3041. When processing the final object 2986, the object counter 3046 in the group drawing context 2941 is incremented to 6 in step 1704. Assuming for the purposes of illustration that z-banding is performed every six objects, then, in step 1706, a new display list 3070 and fillmap 3071 are created. The next fillmap pointers (3073 and 3074) are initialised to NULL, and the IsCompleteFlag 3075 is initialised to FALSE. In step 1707, the new fillmap 3071 is set as the next fillmap (low priority) 3053 in the fillmap 3051 that is referenced by the group drawing context 3041. Conversely, the fillmap 3051 referenced by the group drawing context 3051 is set as the parent 3072 of the new fillmap 3071. In step 1708, a new FG task 2904 is submitted to convert the current display list 3050 into fillmap format, and the result is stored in the current fillmap 3051. In step 1709, the display list pointer 3045 and fillmap pointer 3044 in the group drawing context 3041 are updated to refer to the new display list 3070 and fillmap 3071 respectively. In step 1710, the object counter 3046 in the group drawing context 3041 is reset to zero. This concludes the description of the intermediate DL task 2902 up to time $t_C$.

Figure 30C:
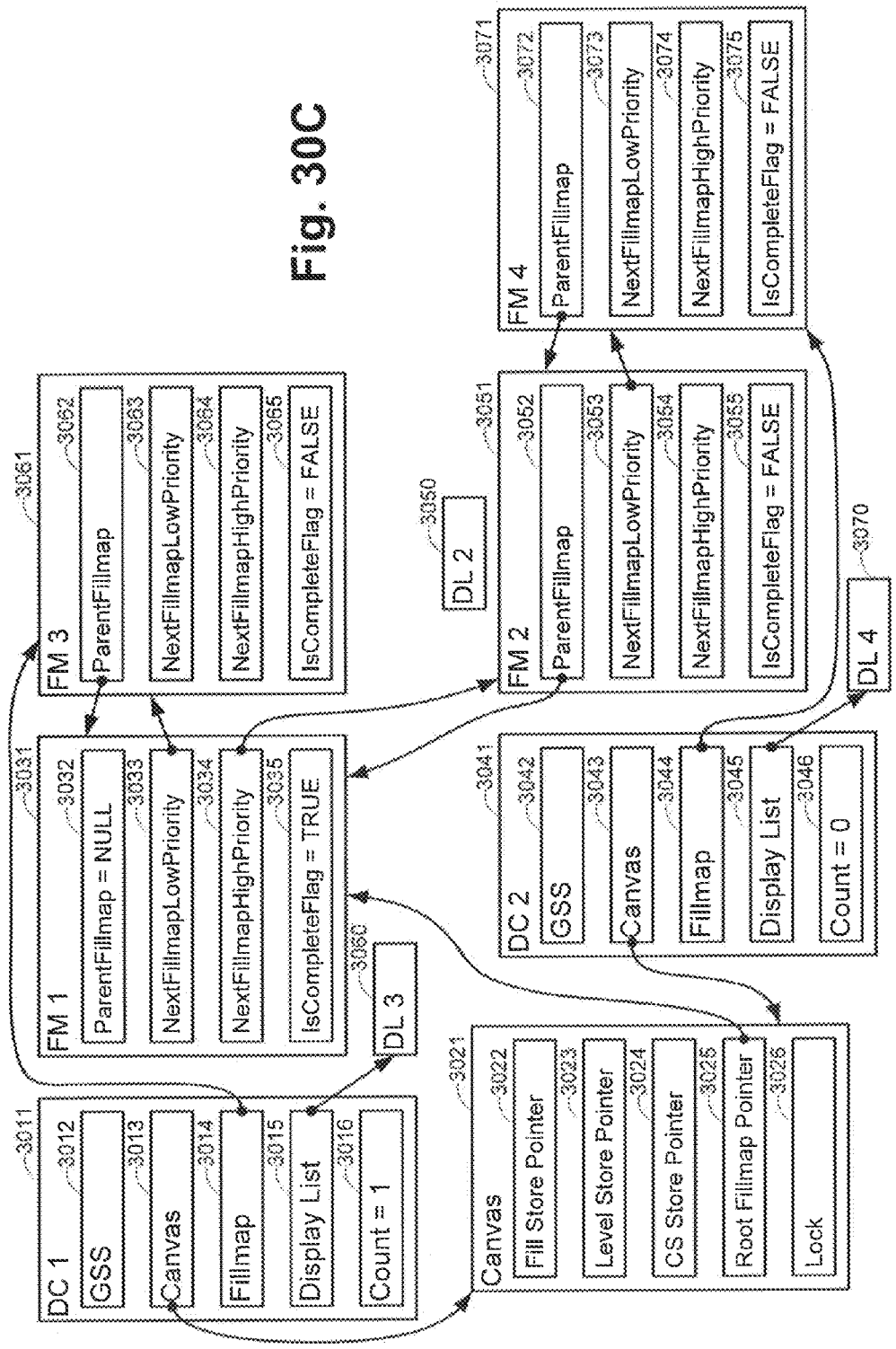

Next, consider the DL task 2901. This task executes the commands on lines 32 to 35 of FIG. 28B. These commands are shown in FIG. 29A as commands 2914-2921 respectively. These are not particularly interesting as the commands mostly update the graphics state stack 3012 in the first drawing context 3011, with the exception of the Fill rectangle command 2916, which produces graphical object 9 2945. This is the black square 2701 described hereinafter. As can be seen in FIG. 30C, the object count 3016 of the drawing context 3011 has been updated to one.

This concludes the description of the stage between time $t_B$ and time $t_C$. The state of various structures is shown in FIG. 30C. As depicted in FIG. 31A, there are currently three tasks executing. The first is the DL task 2901, which has just processed command 2921. The intermediate DL task 2902 has just finished processing command 2967, which spawned the FG task 2904. The FG task 2904 is about to begin processing the z-band produced by the intermediate DL task 2902.

Stage ($t_C$, $t_D$]

The processes that execute up to time $t_D$ are described hereinafter.

Starting with the intermediate DL task 2902, this task processes two more objects (2968 and 2969) to produce graphical objects 9 and 10 (2988 and 2989 respectively). As the end of the group content stream is reached, a new FG task 2905 is spawned in step 1513. In step 1514, the group drawing context 3041 is destroyed. The intermediate DL task 2902 is now completed.

Consider the FG task 2904 that was previously started, and the FG task 2905 that only just started for the final two objects of the group. As depicted in FIG. 29B, both FG tasks finish prior to time $t_D$. This results in the IsCompleteFlags (3055 and 3075) being set to TRUE and both corresponding display lists (3050 and 3070) being destroyed. In both cases, no FM tasks are spawned since there is not a sequence of eight completed fillmaps, and some incomplete fillmaps are still present (i.e. not at the end of the page).

Finally, consider the DL task 2901 processing that occurs up to time $t_D$. The DL task 2901 processes commands 2922 through to 2926 to produce graphical objects 10 to 14 (2946-2950). After graphical object 14 2950 is produced, a z-band occurs, similarly to the case in the intermediate DL task 2902 as described hereinbefore. This results in a new display list 3080 and fillmap 3081. Similarly, the new fillmap 3081 is referenced from the next fillmap (low priority) pointer 3063 and the members 3082-3085 are similarly initialised. The drawing context 3011 is likewise updated (references 3015 and 3014) to refer to the new display list 3080 and fillmap 3081, respectively.

Figure 30D:
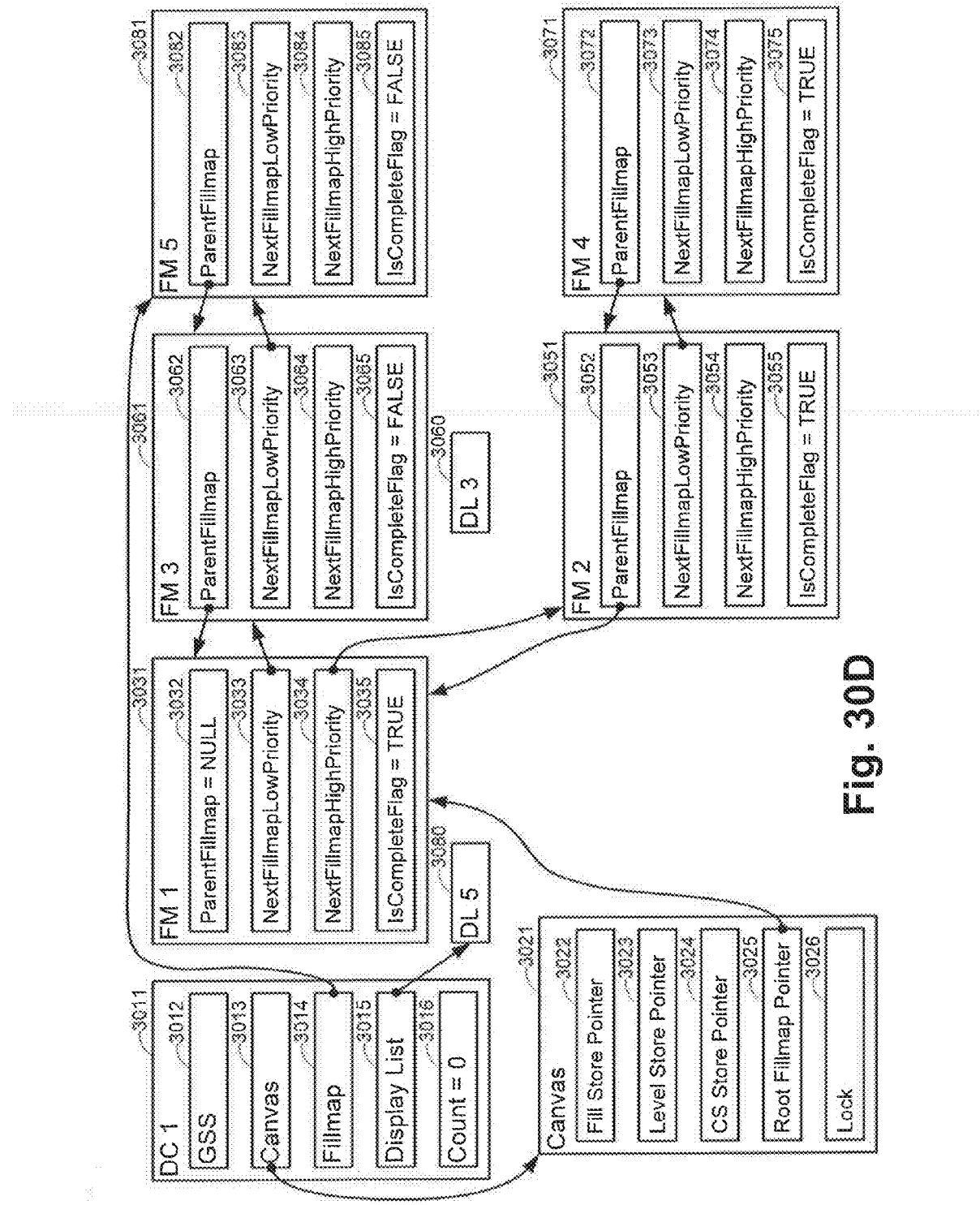

This concludes the description of the stage between time $t_C$ and time $t_D$. The state of various structures is shown in FIG. 30D. As depicted in FIG. 31A, there are currently two tasks executing. The first is the DL task 2901, and the second is the FG task 2906.

Stage ($t_D$, $t_E$)

The processes that execute up to time $t_E$ are described hereinafter.

Staring with the DL task 2901, the DL task 2901 continues executing the loop in process 1300, processing the remaining commands 2927-2930 to produce graphical objects 15 to 19 2952-2956 which are added to the current display list 3080. Once the end of the content stream is reached, decision 1302 ends the process 1300 and the execution returns to FIG. 11 step 1102. A new FG task 2907 is submitted for the current display list 3080 and current fillmap 3081. The process then waits for all outstanding FG and FM tasks. Since there are outstanding FG tasks, it is necessary to wait until a later stage before the DL task 2901 continues.

As depicted in FIG. 29B, both remaining FG tasks 2906 and 2907 complete, resulting in the corresponding display lists 3060 and 3080 being deleted, and the IsCompleteFlag 3065 and 3085 being set to TRUE.

Once the final FG task 2907 completes, the step 2004 of the fillmap submission process determines that a sequence of fillmaps can be merged, because all fillmaps in the tree have the IsCompleteFlag set to TRUE. This results in the creation 2008 of a replacement fillmap 3091 into which the merged edges are stored. In the next step 2009 the canvas 3021 is updated to reference 3025 the new replacement fillmap 3091, and the various pointers 3092-3094 in the new fillmap 3091 are initialised to NULL. The IsCompleteFlag 3095 in the new fillmap 3091 is initialised to FALSE. An FM task 2998 is submitted, with the sequence of completed fillmaps 3031, 3051, 3071, 3061, 3081 as input, and the replacement fillmap 3091 as output.

Figure 30E:
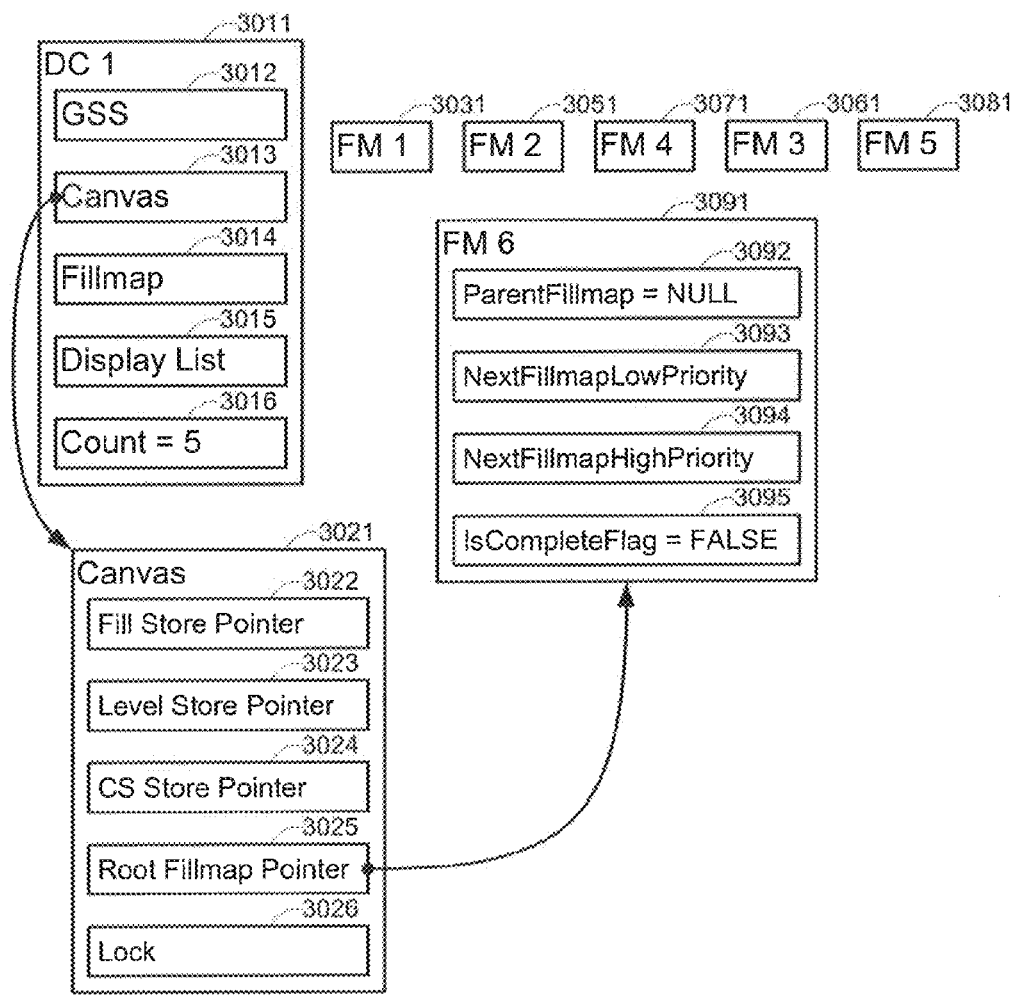

This concludes the description of the stage between time $t_D$ and time $t_E$. The state of various structures is shown in FIG. 30E. As depicted in FIG. 31A, the only task executing is the FM task 3098, while the DL task 2901 is waiting for the FM task 3098 to complete.

Stage ($t_E$, $t_F$)

The final stage up to time $t_F$ is described hereinafter. Once the FM task completes, the remaining fillmap 3091 is updated with an IsCompleteFlag 3095 set to TRUE. The other fillmaps 3031, 3051, 3061, 3071, 3081 are no longer required and are destroyed. This completes the FM task 3098.

Figure 30F:
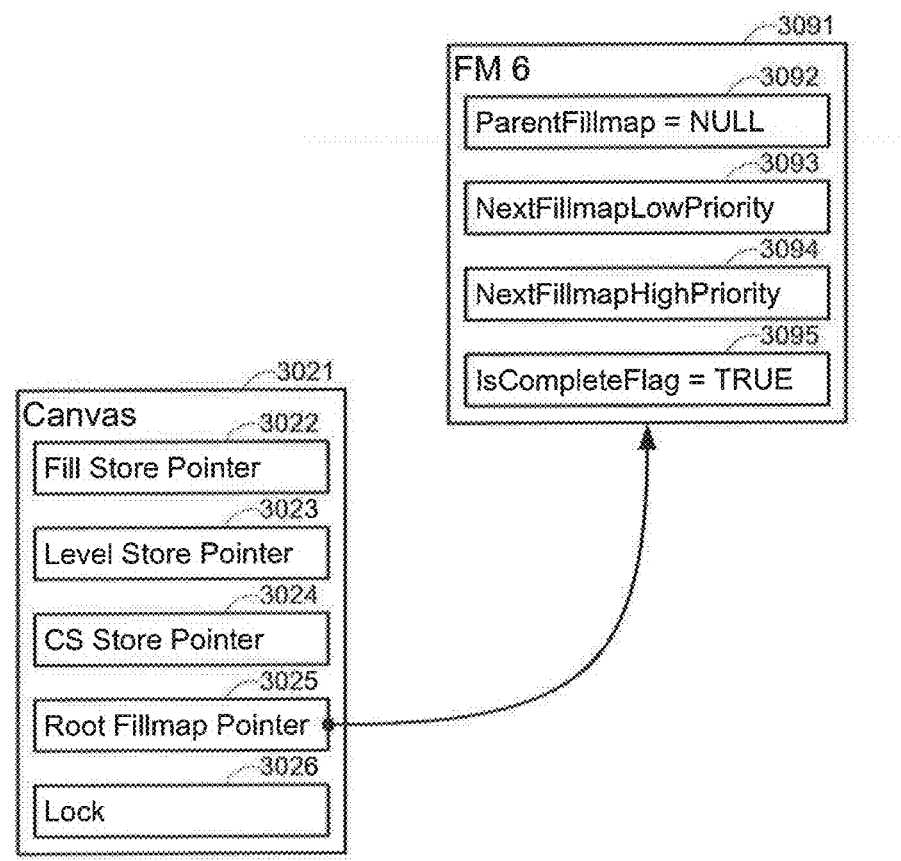

Finally, as all FG and FM tasks are now complete, the DL task 2901 finishes step 1103 of waiting for all remaining tasks. In step 1104, the canvas 3021 is extracted from the drawing context 3011, and the drawing context 3011 is deleted. This completes the DL task 2901 and the overall process of converting a page description 3100 into an intermediate representation 3021 as shown in FIG. 30F.

FIG. 31: Comparison with Prior Art

Figure 31B:
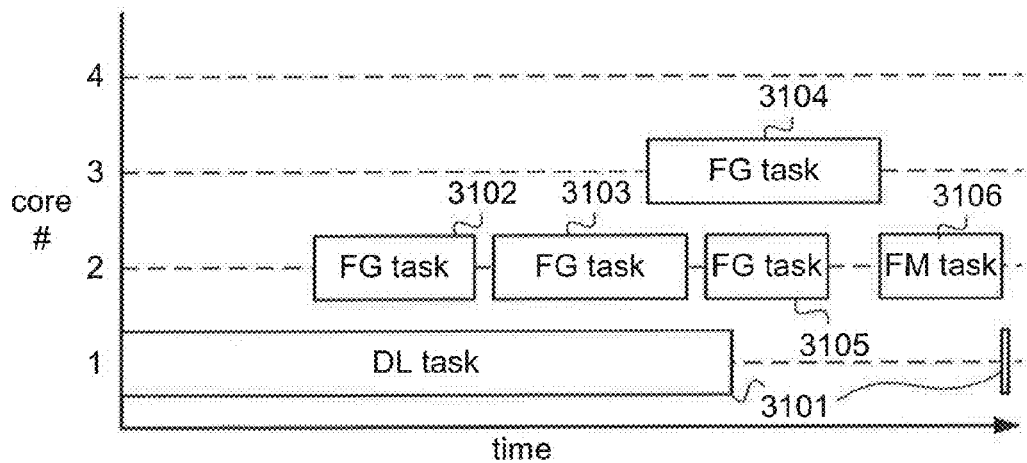
FIG. 31B is a timing diagram showing a graph of tasks that would be executed under the prior art.

FIG. 31B shows the execution profile of the prior art. This can be compared to the execution profile as shown in FIG. 31A in accordance with embodiments of the invention.

The DL task 3101 of the prior art is longer because that DL task combines both the DL task 2901 and the intermediate DL task 2902 per the embodiment of the invention into a single sequential task 3101. Such sequential processing is typically a bottleneck in multi-threaded printing systems. Also, there is less overlap in the FG tasks 3102-3105 in the prior art case compared to the execution that uses the invention in FIG. 31A. The FM task in the prior art 3106 will have a similar execution time. As can be seen by comparing FIG. 31A to FIG. 31B, the embodiments of the invention result in a lower overall execution time of the system.

INDUSTRIAL APPLICABILITY

Methods, apparatuses, systems and computer readable media for generating an intermediate representation of a page description have been disclosed. The embodiments of the invention are applicable to the computer and data processing industries, amongst others. The foregoing describes only some embodiments of the present invention, and modifications and/or changes can be made thereto without departing from the scope and spirit of the invention, the embodiments being illustrative and not restrictive.

The invention claimed is:

1. A method of generating an intermediate representation of a page description, the page description comprising a plurality of graphic commands updating a graphics state, the method comprising:
    identifying a first sequence of graphic commands from the plurality of graphic commands in the page description, so that a graphics state associated with at least one subsequent second graphic command in the page description is invariant under the first sequence of graphic commands;
    generating a first display list representation using the first sequence of graphic commands;
    generating a second display list representation using the second graphic command concurrently with generating the first display list representation, the second display list representation being generated independently from the first sequence of graphic commands; and
    generating the intermediate representation of the page description using the first display list representation and the second display list representation, at least one portion in the intermediate representation being affected by the first sequence of graphic commands and the second graphic command.

2. The method as claimed in claim 1, wherein an object associated with the second graphic command overlays at least one other object associated with a graphic command from the first sequence of graphic commands.

3. The method as claimed in claim 1, wherein generating the intermediate representation comprises combining a first intermediate representation corresponding to the first display list representation and the second intermediate representation corresponding to the second display list representation.

4. The method as claimed in claim 1, wherein the first sequence of graphic commands is classified as a group in the page description.

5. The method as claimed in claim 1, comprising rendering the generated intermediate representation of the page description to form an image.

6. The method as claimed in claim 3, comprising concurrently generating first and second intermediate representations.

7. The method as claimed in claim 1, wherein said first sequence of graphic commands comprises first and second subsequences, wherein:
- a graphics state at the commencement of the second subsequence is independent from graphic commands in the first subsequence,
- display list representations are concurrently derived from first and second subsequences, respectively, and
- intermediate representations generated from the first subsequence, the second subsequence, and the second sequence are combined in order of the corresponding graphic commands in the page description.

8. The method as claimed in claim 3, comprising merging said first and second intermediate representations, the intermediate representation of the page description being generated using said first and second intermediate representations.

9. The method as claimed in claim 1, wherein the method is performed in a multi-threaded computing environment.

10. The method as claimed in claim 1, wherein the method is performed using a computing device having a processor with multiple computing cores.

11. The method as claimed in claim 1, wherein the intermediate representation comprises a fillmap.

12. A method of generating an intermediate representation of a page description, the page description comprising a plurality of graphic commands, the method comprising:
- identifying a graphic command in the page description isolating a plurality of background graphic commands from a plurality of foreground commands, so that a graphics state associated with at least one of the foreground graphic commands is invariant under the isolated background graphic commands, wherein the isolated background graphic commands comprises state commands updating graphic states of objects to be drawn;
- generating a foreground display list representation concurrently with generating a background display list representation, the display list representations being generated using the associated graphic commands, the foreground display list representation being independent from the isolated background sequence of graphic commands; and
- generating the intermediate representation for the page description using the background display list representation and the foreground display list representations.

13. The method as claimed in claim 12, wherein the isolated graphic commands comprise at least one graphic command for a group in the page description.

14. The method as claimed in claim 13, wherein the group is a transparency group.

15. The method as claimed in claim 12, comprising in response to identifying the graphic command, establishing a separate stream for receiving the isolated objects, so that the isolated background objects are processed simultaneously with following foreground objects.

16. The method as claimed in claim 12, wherein generating the foreground display list representation comprises applying a foreground graphic command independently from an isolated background graphic command.

17. The method as claimed in claim 12, wherein generating the intermediate representation for the page description comprises combining a background intermediate representation associated with the background display list representation and a foreground display list representation associated with the foreground display list representation.

18. An apparatus for generating an intermediate representation of a page description, the page description comprising a plurality of graphic commands for updating a graphics state, comprising:
- a memory for storing data and instructions for a central processing unit; and
- a central processing unit coupled to said memory, said central processing unit performing a method dependent upon said instructions and said data to generate said intermediate representation, the method comprising:
  - identifying a first sequence of graphic commands from the plurality of graphic commands in the page description, so that a graphics state associated with at least one subsequent second graphic command in the page description invariant under the first sequence of graphic commands;
  - generating a first display list representation using the first sequence of graphic commands;
  - generating a second display list representation using the second graphic command concurrently with generating the first display list representation, the second display list representation being generated independently from the first sequence of graphic commands; and
  - generating the intermediate representation of the page description using the first display list representation and the second display list representation, at least one portion in the intermediate representation being affected by the first sequence of graphic commands and the second graphic command.

19. A non-transitory computer readable storage medium having a computer program recorded thereon for execution by a computer to generate an intermediate representation of a page description, the page description comprising a plurality of graphic commands updating a graphics state, the program comprising:
- code for identifying a first sequence of graphic commands from the plurality of graphic commands in the page description, so that a graphics state associated with at least one subsequent second graphic command in the page description is invariant under the first sequence of graphic commands;
- code for generating a first display list representation using the first sequence of graphic commands;
- code for generating a second display list representation using the second graphic command concurrently with generating the first display list representation, the second display list representation being generated independently from the first sequence of graphic commands; and
- code for generating the intermediate representation of the page description using the first display list representation and the second display list representation, at least one portion in the intermediate representation being affected by the first sequence of graphic commands and the second graphic command.

20. A method of rendering a document, the method comprising:
- receiving a page description representation of the document, the page description representation comprises a plurality of commands, including drawing commands for drawing objects and state commands updating graphics states of the objects to be drawn;
- interpreting a page of the page description representation using at least two threads operating concurrently, a first thread processing at least a first sequence of commands comprising a state command and a second thread processing a subsequent sequence of commands, wherein a graphics state associated with the subsequent sequence of commands is invariant under the first sequence of graphics commands; and rendering the document using a first display list representation and a second display list representation, the first display list representation and the second display list representation being generated using the first sequence of commands and the subsequent sequence of commands respectively.

21. The method according to claim 20, wherein the second sequence of commands follows, in the page description representation, the first sequence of commands.

* * * * *